(12) United States Patent
Iizuka et al.

(10) Patent No.: US 9,282,017 B2
(45) Date of Patent: Mar. 8, 2016

(54) APPARATUS AND METHOD FOR ANALYZING A PACKET

(71) Applicant: FUJITSU LIMITED, Kawasaki-shi, Kanagawa (JP)

(72) Inventors: Fumiyuki Iizuka, Kawasaki (JP); Yuji Nomura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 14/147,060

(22) Filed: Jan. 3, 2014

(65) Prior Publication Data
US 2014/0286174 A1 Sep. 25, 2014

(30) Foreign Application Priority Data

Mar. 19, 2013 (JP) ................................. 2013-057038

(51) Int. Cl.
*H04L 12/26* (2006.01)
(52) U.S. Cl.
CPC ............ *H04L 43/0847* (2013.01); *H04L 43/04* (2013.01); *H04L 43/0835* (2013.01); *H04L 43/12* (2013.01); *H04L 43/16* (2013.01)
(58) Field of Classification Search
CPC ...................................................... H04L 43/04
See application file for complete search history.

(56) References Cited

U.S. PATENT DOCUMENTS

2009/0190593 A1\* 7/2009 Nomura .............. H04L 43/0829
370/394

FOREIGN PATENT DOCUMENTS

JP 2009-182430 8/2009

\* cited by examiner

*Primary Examiner* — John Blanton
(74) *Attorney, Agent, or Firm* — Staas & Halsey LLP

(57) ABSTRACT

An apparatus captures packets transmitted between first and second devices in accordance with first and second communication protocols, where the first and second protocols each assign a value for identifying a packet transmitted between first and second devices. In a state in which a first packet transmitted from the first device to the second device has not been captured yet at a time point of capturing an acknowledgment packet, responsive to the first packet, including a first value, upon capturing a second packet assigned a second value indicating order earlier than the first value, the apparatus determines whether the second packet is the first packet that is captured later than the acknowledgment packet, based on a difference between third and fourth values respectively assigned to the second packet and a previous packet that is captured latest among packets transmitted from the first device and captured earlier than the acknowledgment packet.

17 Claims, 14 Drawing Sheets

FIG. 1
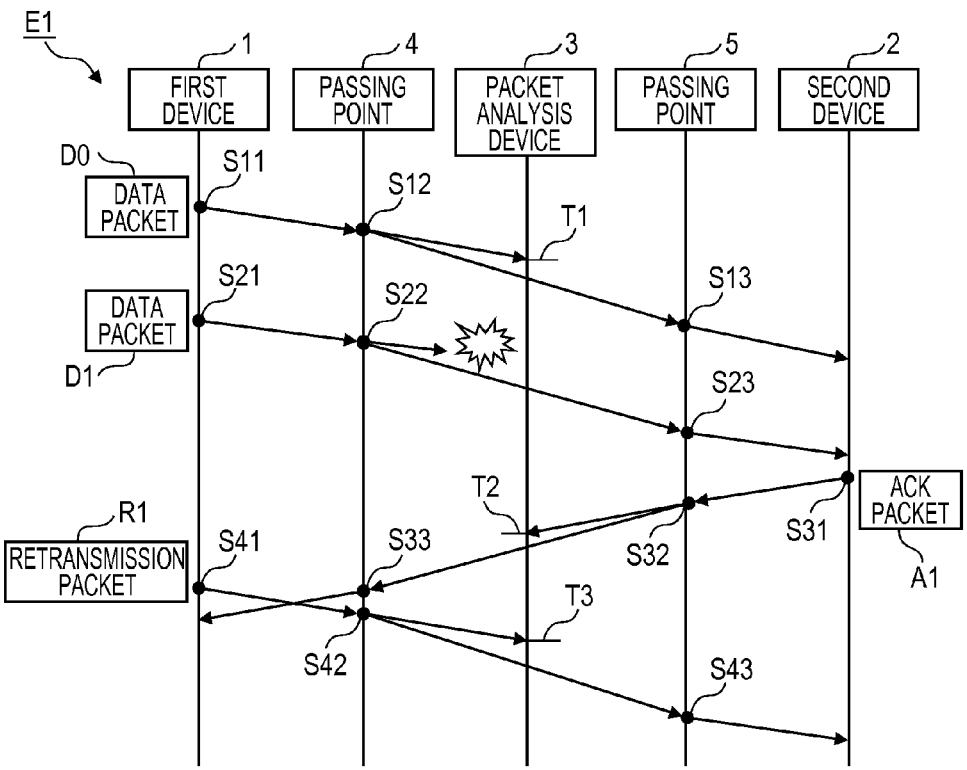
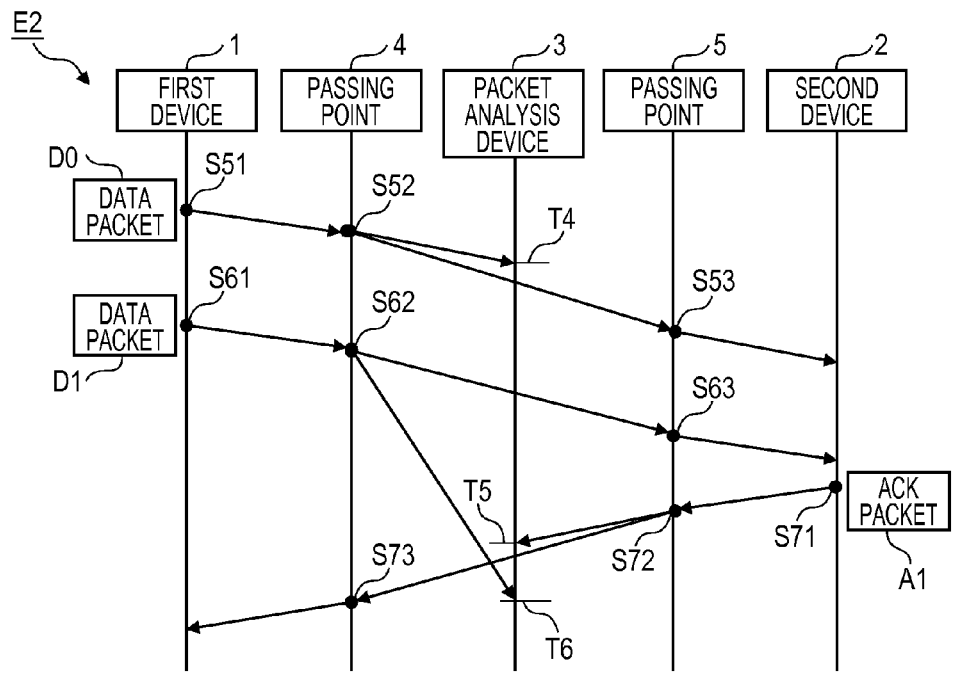

FIG. 2
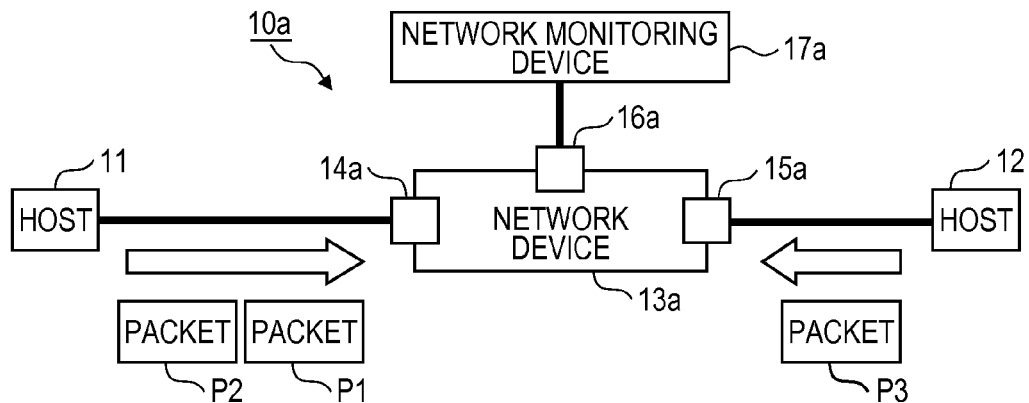
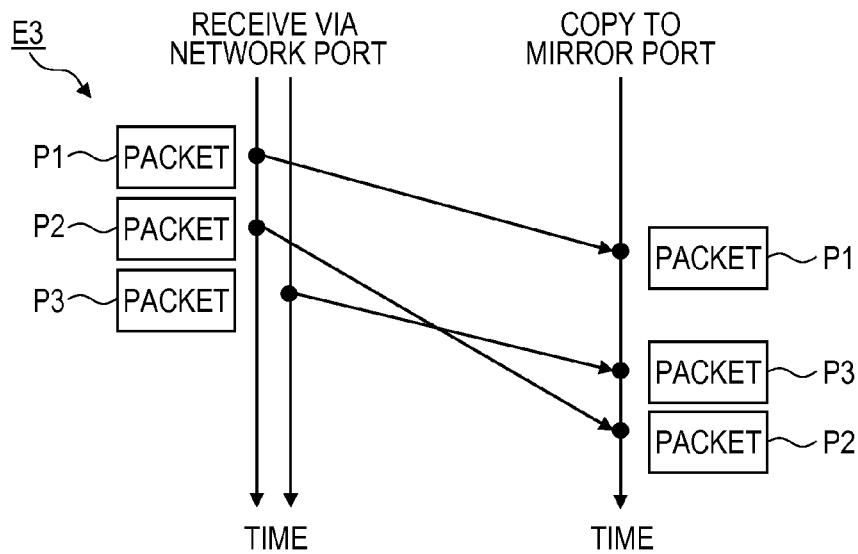
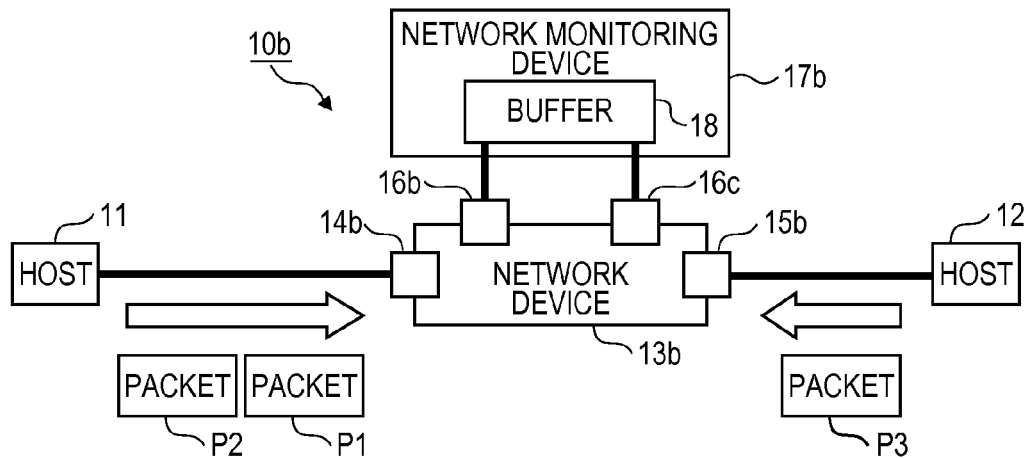

FIG. 9

| Conn. ID | Src. IP Addr. | Src. Port | Dst. IP Addr. | Dst. Port | Max. Seq. | Exp. Ack. | Max. Ack. | Max. Len. | Prov. Loss | Inv. Range | IP-ID |
|---|---|---|---|---|---|---|---|---|---|---|---|
| 1-1 | 10.25.1.3 | 1501 | 10.25.1.200 | 20 | ... | ... | ... | ... | ... | ... | ... |
| 1-2 | 10.25.1.200 | 20 | 10.25.1.3 | 1501 | ... | ... | ... | ... | ... | ... | ... |
| 2-1 | 10.25.1.16 | 300 | 10.25.1.210 | 45 | ... | ... | ... | ... | ... | ... | ... |
| 2-2 | 10.25.1.210 | 45 | 10.25.1.16 | 300 | ... | ... | ... | ... | ... | ... | ... |
| ... | ... | ... | ... | ... | ... | ... | ... | ... | ... | ... | ... |

47

| Conn. ID | Src. IP Addr. | Src. Port | Dst. IP Addr. | Dst. Port | Max. Seq. | Exp. Ack. | Max. Ack. | Max. Len. | Prov. Loss | Inv. Range | IP-ID |
|---|---|---|---|---|---|---|---|---|---|---|---|
| 1-1 | 10.25.1.3 | 1501 | 10.25.1.200 | 20 | 901 | 1001 | 801 | 100 | | | 100 |
| ... | ... | ... | ... | ... | ... | ... | ... | ... | ... | ... | ... |

47a

| 1-1 | 10.25.1.3 | 1501 | 10.25.1.200 | 20 | 901 | 1001 | 1001 | 100 | | | 100 |

47b

| 1-1 | 10.25.1.3 | 1501 | 10.25.1.200 | 20 | 901 | 1001 | 1201 | 100 | 1001-1201 | | 100 |

47c

| 1-1 | 10.25.1.3 | 1501 | 10.25.1.200 | 20 | 1001 | 1101 | 1201 | 100 | | 1101-1201 | 101 |

47d

| 1-1 | 10.25.1.3 | 1501 | 10.25.1.200 | 20 | 1101 | 1201 | 1201 | 100 | | | 102 |

47e

APPARATUS AND METHOD FOR ANALYZING A PACKET

CROSS-REFERENCE TO RELATED APPLICATION(S)

This application is based upon and claims the benefit of priority from the prior Japanese Patent Application No. 2013-057038 filed on Mar. 19, 2013, the entire contents of which are incorporated herein by reference.

FIELD

The embodiments discussed herein are related to apparatus and method for analyzing a packet.

BACKGROUND

A packet may be captured for some purpose, for example, for a purpose of monitoring network quality or recording an audit trail. For example, a network device (for example, a switch, a router, or the like) having two or more network ports and one or more mirror ports may be used. In this case, a packet transmitted from the network port and/or a packet received in the network port is copied so as to be output from the mirror port, and is captured in a device connected to the mirror port. In addition, instead of copying a packet through port mirroring, a method in which a signal of a packet is split in a physical layer by using a network tap may be used to capture a packet.

The captured packet may be appropriately analyzed according to a purpose. For example, through the analysis, the number of packet losses or the number of retransmissions may be detected. In addition, network quality may be judged based on the number of packet losses, the number of packet retransmissions, or the like.

For example, a certain packet analysis method is a method of analyzing communication content which is obtained as a result of monitoring or capturing a packet passing through a network. The packet analysis method is aimed at accurately identifying whether a certain packet is a packet retransmitted after packet loss or is a packet of which arrival order is reversed due to the occurrence of order inversion in the network each time a sequence of a protocol having a retransmission procedure is analyzed. The packet analysis method includes, specifically, the following processes:

(1) acquiring address information of a transmission source or destination from a packet header of a network layer;

acquiring from the packet header of the network layer an identifier in which a monotonously increasing value for each transmission is set in each piece of address information of the transmission source or the destination;

(2) searching for and acquiring an identifier corresponding to address information of a current packet from a storage unit which holds an identifier of a previous packet in correlation with the address information of the transmission source or the destination; and (3) comparing the acquired identifier of the previous packet with the acquired identifier of the current packet and judging that "order inversion has occurred" in a case where the identifier of the current packet is smaller.

Japanese Laid-open Patent Application Publication No. 2009-182430 is an example of the related art.

SUMMARY

According to an aspect of the invention, an apparatus capture packets that are transmitted between first and second devices in accordance with first and second communication protocols, where the second communication protocol is connection-oriented and defined in a layer higher than a layer in which the first communication protocol is defined, the first protocol assigns a numerical value for identifying each of packets that are transmitted between first and second devices according to the first communication protocol, the second communication protocol assigns a numerical value for identifying each of data packets that are transmitted from the first device to the second device according to the second communication protocol, an acknowledgement packet is transmitted from the second device to the first device in response to the data packet, and the acknowledgement packet includes a first numerical value that is assigned by the second communication protocol to a data packet which is expected to be received next by the second device from the first device over a connection established based on the second communication protocol. In a state in which a first data packet transmitted from the first device to the second device has not been captured yet at a time point of capturing a acknowledgment packet responsive to the first data packet, upon capturing a second data packet including a second numerical value indicating order earlier than the first numerical value included in the captured acknowledgment packet, the apparatus determines whether the captured second data packet is the first data packet that is captured later than the acknowledgment packet, based on a difference between a third numerical value that is assigned to the second data packet by the first communication protocol and a fourth numerical value that is assigned by the first communication protocol to a previous data packet that is captured latest among data packets transmitted from the first device and captured earlier than the acknowledgment packet.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating discrimination of retransmission of a data packet from order inversion between a data packet and an ACK packet in a capture process;

FIG. 2 is a diagram exemplifying order inversion between packets in a capture process;

FIG. 9 is a diagram illustrating an example of a connection management table, according to an embodiment;

DESCRIPTION OF EMBODIMENTS

Figure 3:
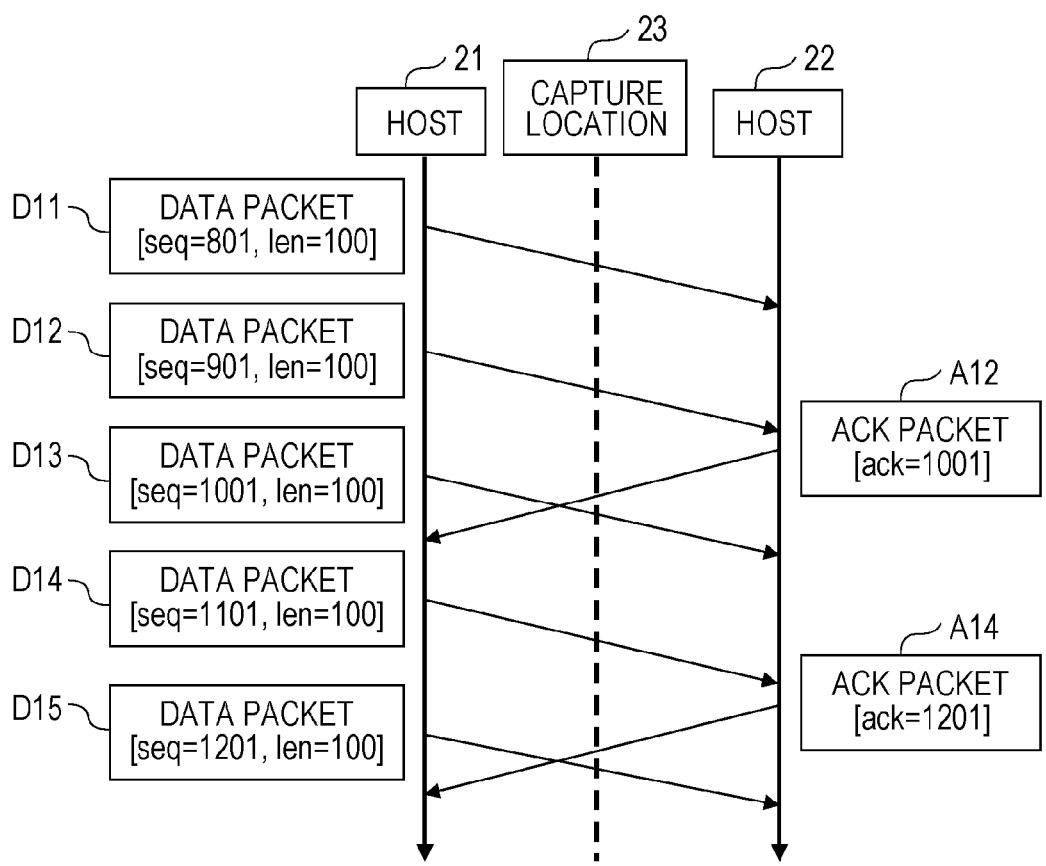
FIG. 3 is a diagram exemplifying a flow of packets.

The present inventor has found that the following misjudgment may occur under some sorts of condition through examination. Misjudgment is a factor deteriorating accuracy of packet analysis.

(1) Although there is actually no packet which fails to be captured, there may be the occurrence of misjudgment that "one or more packets have failed to be captured" as a result of packet analysis.

(2) Although a packet is not actually transmitted on a network, there may be the occurrence of misjudgment that a captured packet is a "retransmission packet" as a result of packet analysis.

Hereinafter, an embodiment will be described in detail with reference to the drawings. First, an outline of the embodiment will be described with reference to FIG. 1. Next, a more specific operation sequence in the embodiment will be described with reference to FIGS. 2 to 6. Successively, a configuration of a device will be described with reference to FIGS. 7 and 8, and a specific example of data will be described with reference to FIGS. 9 and 10. In addition, processes performed by a network monitoring device according to the embodiment will be described with reference to flowcharts of FIGS. 11 to 14. Finally, other embodiments will also be described.

FIG. 1 is a diagram illustrating discrimination of retransmission of a data packet from order inversion between a data packet and an acknowledgment packet in a capture process. FIG. 1 exemplifies operation examples E1 and E2. The operation example E1 is an example in which retransmission of a data packet occurs, and the operation example E2 is an example in which order inversion between a data packet and an acknowledgment packet occurs in a capture process.

There are a data packet which includes, as a payload, data to be transmitted, and an acknowledgment packet which is a packet for acknowledgment of the data packet. Hereinafter, the acknowledgment packet is also referred to as an "ACK packet." In addition, as described later in detail, there are cases where "a certain packet is a data packet and is also an ACK packet of another data packet."

First, an outline of packet capture will be described prior to description of details of the operation examples E1 and E2.

In FIG. 1, a first device 1 is a computer, and a second device 2 is also a computer. Any computer such as a smart phone, a tablet terminal, a personal computer (PC), a workstation, and a server may be used.

Individual packets are transmitted and received between the first device 1 and the second device 2 in accordance with a first communication protocol and a second communication protocol which is defined in a layer whose level is higher than a level of a layer in which the first communication protocol is defined.

In addition, here, a protocol data unit (PDU) of the first communication protocol which includes a PDU of the second communication protocol as a payload is referred to as a "packet." In the following description, the term "packet" is not intended to limit the first and second communication protocols, and also is not intended to limit layers of the first and second communication protocols.

The first communication protocol assigns a numerical value for identification to each packet but is a connectionless communication protocol. More specifically, the numerical value for identification sequentially changes (in other words, monotonously increases or monotonously decreases) in accordance with transmission of a plurality of packets. The second communication protocol is, specifically, a connection-oriented communication protocol and has a retransmission procedure. From a certain viewpoint, the first communication protocol is a stateless communication protocol, and the second communication protocol is a stateful communication protocol.

Hereinafter, for convenience of description, a packet in which a data payload is included in the PDU of the second communication protocol is referred to as a "data packet." In a case where a certain data packet is retransmitted for some reason, order over a connection of an original data packet is the same as order over the connection of a retransmitted data packet for retransmitting the original data packet.

However, a numerical value for identification which is assigned to the retransmitted data packet by the first communication protocol is different from a numerical value for identification which is assigned to the original data packet by the first communication protocol. This is because the first communication protocol is a connectionless protocol defined in a layer lower than the connection-oriented second communication protocol. As described later in detail, the present embodiment uses a property in which "a numerical value for identification assigned by the first communication protocol is independent from order over the connection (that is, order in a data stream over the connection)."

For example, the first communication protocol may be the Internet Protocol (IP), and may be, more specifically, IP version 4. An identification (ID) which is a numerical value for identifying each packet is included in a header of IP version 4.

In addition, the second communication protocol may be, for example, the Transmission Control Protocol (TCP). In other words, each packet which is transmitted and received between the first device 1 and the second device 2 may be an IP packet which includes a TCP segment as a payload.

In a case where a certain data packet is retransmitted, order over the TCP connection (that is, order in a data stream over the TCP connection) is the same in an original data packet and a retransmitted data packet. However, an ID in an IP header of the original data packet is different from an ID in an IP header of the retransmitted data packet.

Here, a packet analysis device 3 captures an individual packet which is transmitted and received between the first device 1 and the second device 2. Specifically, the packet analysis device 3 is provided at a midway point of a communication path between the first device 1 and the second device 2. A packet which is transmitted from the first device 1 toward the second device 2 is extracted in a passing point 4 on the communication path and is captured by the packet analysis device 3. A packet which is transmitted from the second device 2 toward the first device 1 is extracted in a passing point 5 on the communication path and is captured by the packet analysis device 3.

For example, the passing points 4 and 5 may be any two network ports in a network device (for example, a switch, a router, or the like) having two or more network ports and one or more mirror ports.

In this case, the packet transmitted from the first device 1 is received via the network port corresponding to the passing point 4 so as to be copied to the mirror port from the network port, and is output to the packet analysis device 3 from the mirror port so as to be captured by the packet analysis device 3. In addition, the packet transmitted from the first device 1 is received via the network port corresponding to the passing point 4, and is then also output from the network port corresponding to the passing point 5 so as to be transmitted toward the second device 2.

Similarly, the packet transmitted from the second device 2 is received via the network port corresponding to the passing point 5 so as to be copied to the mirror port from the network port, and is output to the packet analysis device 3 from the mirror port so as to be captured by the packet analysis device 3. In addition, the packet transmitted from the second device 2 is received via the network port corresponding to the passing point 5, and is then also output from the network port corresponding to the passing point 4 so as to be transmitted toward the first device 1.

Further, the network device may copy both of a packet received from the first device 1 and a packet received from the second device 2 to a single mirror port. In other words, the network device may aggregate a plurality of traffics received via a plurality of network ports at a single mirror port. In this case, the packet analysis device 3 is connected to the single mirror port.

Alternatively, the network device may copy a packet received from the first device 1 to a first mirror port and may copy a packet received from the second device 2 to a second mirror port. In this case, the packet analysis device 3 is connected to both of the first and second mirror ports. In other words, in this case, the packet analysis device 3 has at least two communication interfaces, and a common buffer which stores packets received via the two communication interfaces.

As another example, a network tap may be used instead of a device such as a switch or router which performs packet mirroring. The network tap splits a signal of a packet (specifically, an electrical signal or an optical signal) in a physical layer. The network tap is one kind of network device.

For example, the passing points 4 and 5 may be input ports of two respective network taps. In addition, the packet analysis device 3 may be connected to monitor ports of the two respective network taps via two communication interfaces. In this case, the packet analysis device 3 has a buffer which stores packets received via the two communication interfaces.

More specifically, in this case, when a packet transmitted from the first device 1 is received via the input port corresponding to the passing point 4, a signal of the packet is split electrically or optically in a physical layer. As a result, one split signal passes through the network tap so as to be transmitted to the second device 2, and the other split signal is output to the packet analysis device 3 from the monitor port of the network tap. Therefore, the packet analysis device 3 may capture the packet which is transmitted from the first device 1 toward the second device 2, via the network tap.

Similarly, when a packet transmitted from the second device 2 is received via the input port corresponding to the passing point 5, a signal of the packet is split. As a result, one split signal passes through the network tap so as to be transmitted to the first device 1, and the other split signal is output to the packet analysis device 3 from the monitor port of the network tap. Therefore, the packet analysis device 3 may capture the packet which is transmitted from the second device 2 toward the first device 1, via the network tap.

In addition, there are various kinds of network taps. For example, the passing points 4 and 5 may be two input ports of a network tap having a plurality of input ports and a plurality of monitor ports. In this case, the packet analysis device 3 has at least two communication interfaces, and the two communication interfaces are connected to two monitor ports corresponding to the two input ports. Further, the packet analysis device 3 has a buffer which stores packets received via the two communication interfaces.

In this case, when a packet transmitted from the first device 1 is received via the first input port corresponding to the passing point 4, a signal of the packet is split. As a result, one signal passes through the network tap so as to be transmitted to the second device 2, and the other signal is output to the packet analysis device 3 from the first monitor port corresponding to the first input port. Therefore, the packet analysis device 3 may capture the packet which is transmitted from the first device 1 toward the second device 2, via the first monitor port of the network tap.

Similarly, when a packet transmitted from the second device 2 is received via the second input port corresponding to the passing point 5, a signal of the packet is split. As a result, one signal passes through the network tap so as to be transmitted to the first device 1, and the other signal is output to the packet analysis device 3 from the second monitor port corresponding to the second input port. Therefore, the packet analysis device 3 may capture the packet which is transmitted from the second device 2 toward the first device 1, via the second monitor port of the network tap.

Alternatively, a type of network tap which aggregates a plurality of traffics received via a plurality of input ports at a single monitor port may be used. In this case, the packet analysis device 3 is connected to the single monitor port.

In this case, when a packet transmitted from the first device 1 is received via the first input port corresponding to the passing point 4, a signal of the packet is split. As a result, one signal passes through the network tap so as to be transmitted to the second device 2, and the other signal is output to the packet analysis device 3 from the single monitor port. Therefore, the packet analysis device 3 may capture the packet which is transmitted from the first device 1 toward the second device 2, via the network tap.

Similarly, when a packet transmitted from the second device 2 is received via the second input port corresponding to the passing point 5, a signal of the packet is split. As a result, one signal passes through the network tap so as to be transmitted to the first device 1, and the other signal is output to the packet analysis device 3 from the single monitor port. Therefore, the packet analysis device 3 may capture the packet which is transmitted from the second device 2 toward the first device 1, via the network tap.

As described above, specific methods in which the packet analysis device 3 captures a packet may be varied according to embodiments. In any case, the packet analysis device 3 may capture an individual packet which is transmitted between the first device 1 and the second device 2 on the communication path.

The packet analysis device 3 appropriately analyzes a captured packet according to a purpose. For example, the packet analysis device 3 may capture and analyze a packet in order to monitor network quality between the first device 1 and the second device 2. In other words, the packet analysis device 3 may be, specifically, a network monitoring device. For example, the packet analysis device 3 may estimate the following variety of the number of times:

(1) The number of times in which a packet has been lost on a network between the first device 1 and the second device 2 (hereinafter, also referred to as the "number of network losses");

(2) The number of times in which a packet has been retransmitted from the first device 1 or the second device 2 (hereinafter, also referred to as the "number of retransmissions"); and (3) The number of times in which the packet analysis device 3 has failed to capture a packet although the packet has been successfully transmitted from the first device 1 to the second device 2, or from the second device 2 to the first device 1 (hereinafter, also referred to as the "number of capture losses").

However, the present inventor has found that "the following misjudgment may occur under some sorts of condition" through examination.

(1) Although there is actually no packet which fails to be captured, there may be the occurrence of misjudgment that "one or more packets have failed to be captured" as a result of packet analysis. In other words, an excessive number of capture losses may be estimated.

(2) Although a packet is not actually transmitted over a network, there may be the occurrence of misjudgment that a captured packet is a "retransmission packet" as a result of packet analysis. In other words, an excessive number of retransmissions may be estimated. In addition, since a loss of a packet is expected as a cause of retransmission, an excessive number of network losses may be estimated, depending on cases.

Specifically, the present inventor has conducted intensive studies on a case where the detected number of network losses and/or the detected number of retransmissions are/is larger than the number of network losses and/or the number of retransmissions which are/is empirically expected by a network manager. As a result, and the present inventor has found that the above-described misjudgment may occur.

In addition, the present inventor has also examined conditions in which the above-described misjudgment may occur. As a result, the present inventor has obtained the following findings:

(1) In a case where at least the following first condition holds true, the above-described misjudgment may occur;

(2) In addition, in a case where at least one of second to fifth conditions holds true, the above-described misjudgment easily occurs; and (3) There is a case where all of the first to fifth conditions hold true depending on environments, and, in this case, the above-described misjudgment notably easily occurs.

Here, the first condition is a condition in which "packets which flow on a communication path between two devices in two directions opposite to each other are aggregated into a single stream in a capture process." More specifically, the first condition is a condition in which "packets which flow in two directions are aggregated into a single stream in a capture process in a manner in which an order relationship between the two directions is not guaranteed to be preserved." For example, the first condition holds true in all the following cases:

(1) A case where packets received in a plurality of network ports of a network device such as a switch or a router are copied (that is, mirrored) to a single mirror port. More specifically, a case where reception order between the network ports is not taken into consideration (that is, order to be output to the mirror port is not adjusted based on the reception order between the network ports);

(2) A case where packets received via a plurality of input ports of a network tap are aggregated at a single monitor port so as to be output. More specifically, a case where reception order between the input ports is not taken into consideration (that is, order to be output to the monitor port is not adjusted based on the reception order between the input ports); and (3) A case where outputs from a plurality of mirror ports of a network device such as a switch or a router, or a plurality of monitor ports of a network tap are enqueued to a single common buffer, and packets are sequentially captured from the buffer. More specifically, a case where order of the packets to be enqueued to the buffer is not adjusted between a plurality of ports.

The second condition is a condition in which a network device such as a switch or a router has a low processing capability. The second condition is a condition which is not related to splitting of a signal by a network tap but is related to a case where port mirroring is used.

An active element is used in a network device having a port mirroring function unlike in a network tap which is a passive device. In other words, in the network device having a port mirroring function, a circuit such as a general purpose processor or an application-specific integrated circuit (ASIC) performs a process of copying a packet in a layer higher than the physical layer. The second condition is, more specifically, a condition in which "a circuit performing a copying process has a low processing capability."

In addition, the lower the processing capability (more specifically, a performance of a circuit performing a copying process) of the network device, the longer the time taken to copy packets received via the network ports to the mirror port. In other words, from another viewpoint, the second condition is a condition in which the time taken to copy packets is long.

The third condition is a condition in which a round-trip time (RU) between the first device 1 and the second device 2 is short. From another viewpoint, the third condition is a condition in which time is short after a data packet is transmitted until an ACK packet is transmitted. When the third condition holds true, time is short after the data packet which is transmitted earlier passes through the passing point 4 until the ACK packet passes through the passing point 5. Therefore, there is a high probability that the data packet and the ACK packet may be captured nearly simultaneously, and thus order inversion may easily occur in a capture process.

The fourth condition is a condition in which the number of data packets which are transmitted and received between the first device 1 and the second device 2 per unit time is large. More specifically, the fourth condition is a condition in which the number of data packets which are transmitted from the first device 1 to the second device 2 per unit time is large, or the number of data packets which are transmitted from the second device 2 to the first device 1 per unit time is large.

The fifth condition is a condition in which a size of an individual data packet is large. For example, when a large amount of data is transmitted in a burst manner, both of the fourth condition and the fifth condition frequently hold true.

In addition, in relation to the second to fifth conditions, the description thereof has been made using relative expressions such as "low processing capability", "long time", "short RTT", "a large number of data packets", and "large size." There are two reasons why the relative expressions are used as above.

The first reason is that the second to fifth conditions are conditions regarding a variable which has influence on easy occurrence of misjudgment. For example, when the second condition is exemplified, as a processing capability of a network device is lower, the misjudgment more easily occurs. Therefore, a desirable processing capability is different depending on an allowable range of a probability that misjudgment may occur.

The second reason is that the second to fifth conditions are related to each other. For example, if RTT and a size of a data packet are fixed, in order to suppress a probability that misjudgment may occur within an allowable range, a desirable processing capability of a network device is different depending on the number of data packets to be transmitted and received per unit time. In addition, a probability that misjudgment may occur is different depending on a combination of duration of RTT and duration of time taken to perform a copying process. Of course, the second to fifth conditions are also related to each other in other combinations.

In any case, if the first case holds true, the above-described misjudgment may occur. In addition, a probability that misjudgment may occur further increases in a case where the second to fifth conditions hold true in addition to the first condition. In one aspect, the packet analysis device 3 according to the present embodiment is aimed at improving accuracy of packet analysis by reducing the above-described misjudgment.

Specifically, the packet analysis device 3 according to the present embodiment reduces the above-described misjudgment by discriminating retransmission as illustrated in the operation example E1 of FIG. 1 and order inversion as illustrated in the operation example E2 of FIG. 1. Hereinafter, the operation examples E1 and E2 will be described, and then a method in which the packet analysis device 3 avoids misjudgment will be described.

In the operation example E1, a data packet D1 is retransmitted. For convenience of the description, the retransmitted data packet D1 is indicated by a "retransmission packet R1" in FIG. 1.

In the operation example E1, a data packet D0 preceding the data packet D1 is transmitted from the first device 1 in step S11, and is copied or is split in step S12 in the passing point 4. Therefore, the data packet D0 arrives at the second device 2 through the passing point 5 as illustrated in step S13, and is also captured by the packet analysis device 3 at the time point T1.

The second device 2 may transmit an ACK packet for notifying of the reception of the data packet D0 in response to the reception of the data packet D0. However, the second device 2 may delay transmission of an ACK packet in order to reduce communication overhead caused by the ACK packet.

For example, IP may be used as the first communication protocol and TCP may be used as the second communication protocol, between the first device 1 and the second device 2, as described above. A structure called a delayed acknowledgment is frequently employed in mounting the TCP. The second device 2 may delay transmission of the ACK packet for the data packet D0 until any of the following conditions hold true in accordance with the delayed acknowledgment structure of the TCP.

(1) The second device 2 receives a data packet subsequent to the data packet D0 from the first device 1.

(2) A new data packet which is transmitted from the second device 2 to the first device 1 is generated.

(3) A predetermined time (for example, 200 milliseconds) elapses.

In the operation example E1 of FIG. 1, it is assumed that the second device 2 receives the data packet D1 before the predetermined time has elapsed from reception of the data packet D0.

Specifically, the data packet D1 is transmitted from the first device 1 in step S21, and is copied or is split in the passing point 4 in step S22. The data packet D1 is transmitted from the passing point 4 toward the second device 2, and arrives at the second device 2 through the passing point 5 as illustrated in step S23. As above, the data packet D1 is successfully received in the second device 2 in the same manner as the data packet D0.

However, in the operation example E1, the packet analysis device 3 succeeds in capturing the data packet D0 but fails to capture the data packet D1.

For example, in a case where the data packet D1 is copied in the passing point 4 through port mirroring, the buffer provided for the mirror port may be overflowed. As a result of the buffer being overflowed, the data packet D1 may not arrive at the packet analysis device 3.

As another possibility, although the data packet D1 which has been copied or split successfully arrives at the packet analysis device 3, the data packet D1 may also be lost in the packet analysis device 3. For example, a reception buffer provided in the communication interface of the packet analysis device 3 may also be overflowed. Alternatively, the packet analysis device 3 may have a single buffer for enqueueing data packets received via two or more communication interfaces as described above, but the buffer may also be overflowed.

In any case, in the operation example E1, a capture loss of the data packet D1 occurs for some reason. On the other hand, the second device 2 successfully receives the data packet D1 as described above. Therefore, the second device 2 transmits an ACK packet A1 in step S31. The ACK packet A1 indicates that the second device 2 has received the data packet D1. In an example of the operation example E1, the ACK packet A1 also indicates that the second device 2 has received the data packet D0.

Of course, the second device 2 may transmit an ACK packet (not illustrated) in response to the reception of the data packet D0 and may transmit the ACK packet A1 in response to the reception of the data packet D1. The following discussion is common to a case where the second device 2 transmits ACK packets for the respective data packets D0 and D1 and a case where the second device 2 waits for the data packet D1 to be received and then transmits a single ACK packet A1 in accordance with the delayed acknowledgment structure.

The ACK packet A1 transmitted from the second device 2 is copied or split in the passing point 5 in step S32. Therefore, the ACK packet A1 arrives at the first device 1 through the passing point 4 and is also captured by the packet analysis device 3 at the time point T2 as illustrated in step S33.

Here, as described above, the second communication protocol (for example, TCP) is a connection-oriented protocol and has a retransmission procedure. In the operation example E1, it is assumed that the first device 1 is timed out before receiving the ACK packet A1. In addition, in the operation example E1, the first device 1 is timed out in the same manner for a case where, although the ACK packet A1 successfully arrives at the first device 1, the ACK packet A1 is lost on the communication path between the passing point 4 and the first device 1.

When the first device 1 is timed out before receiving the ACK packet A1, the first device 1 transmits the retransmission packet R1 as illustrated in step S41. As described above, the retransmission packet R1 is a data packet for retransmission of the data packet D1.

The retransmission packet R1 is copied or split in the passing point 4 in step S42. Therefore, the retransmission packet R1 arrives at the second device 2 through the passing point 5 and is also captured by the packet analysis device 3 at the time point T3 as illustrated in step S43.

On the other hand, in FIG. 1, the ACK packet A1 passes through the passing point 4 earlier than the retransmission packet R1. However, there may be a case where the retransmission packet R1 passes through the passing point 4 earlier than the ACK packet A1. Which one of the ACK packet A1 and the retransmission packet R1 passes through the passing point 4 earlier is irrelevant to the packet analysis device 3. Further, the transmission of the retransmission packet R1 in step S41 may be performed for any reason other than the time-out.

As described above, in the operation example E1, the capture loss and the retransmission of the data packet D1 occur. In addition, in the operation example E1, the packet analysis device 3 captures three packets in the following order:

(1) The data packet D0 is captured at the time point T1;
(2) Next, the ACK packet A1 (that is, an ACK packet for a data packet which has not been captured by the packet analysis device 3 yet) is captured at the time point T2; and
(3) Next, the retransmission packet R1 is captured at the time point T3.

On the other hand, in the operation example E2, retransmission does not occur. Alternatively, in the operation example E2, although the data packet D1 is transmitted earlier than the ACK packet A1, order inversion occurs in which the ACK packet A1 is captured by the packet analysis device 3 earlier than the data packet D1. Details thereof are as follows.

In the operation example E2, the data packet D0 preceding the data packet D1 is transmitted from the first device 1 in step S51, and is copied or split in the passing point 4 in step S52. Therefore, the data packet D0 arrives at the second device 2 through the passing point 5 as illustrated in step S53, and is also captured by the packet analysis device 3 at the time point T4.

The second device 2 may transmit an ACK packet in response to the reception of the data packet D0. However, in the same manner as in the operation example E1, it is assumed that the second device 2 delays transmission of an ACK packet in the operation example E2 as well. The following discussion is common to a case where the second device 2 transmits ACK packets for the respective data packets D0 and D1 and a case where the second device 2 waits for the data packet D1 to be received and then transmits a single ACK packet A1 in accordance with the delayed acknowledgment structure.

In addition, the data packet D1 is transmitted from the first device 1 in step S61, and is copied or split in the passing point 4 in step S62. The data packet D1 is transmitted from the passing point 4 toward the second device 2, and arrives at the second device 2 through the passing point 5 as illustrated in step S63. As above, the data packet D1 is successfully received in the second device 2 in the same manner as the data packet D0.

On the other hand, in the operation example E2, unlike in the operation example E1, it is assumed that a capture loss does not occur, and the packet analysis device 3 also succeeds in capturing the data packet D1. However, there is a case where a relatively long time is taken until the data packet D1 passes through the passing point 4 and is then captured by the packet analysis device 3 for some reasons. As a result, the packet analysis device 3 may capture the ACK packet A1 for the data packet D1 before capturing the data packet D1. Details thereof are as follows.

The second device 2 transmits the ACK packet A1 in response to the reception of the data packet D1 in step S71, and the ACK packet A1 is copied or split in the passing point 5 in step S72. Therefore, the ACK packet A1 arrives at the first device 1 through the passing point 4 and is also captured by the packet analysis device 3 at the time point T5 as illustrated in step S73. In addition, the packet analysis device 3 captures the data packet D1 at the time point T6 barely after the time point T5.

As above, in the operation example E2, inversion of the transmission order and the capture order occur between the data packet D1 and the ACK packet A1. In other words, the data packet D1 which is transmitted earlier is captured later than the ACK packet A1, and the ACK packet A1 which is transmitted later is captured earlier than the data packet D1. In a case where this inversion occurs, the packet analysis device 3 captures the three packets in the following order:

(1) The data packet D0 is captured at the time point T4;
(2) Next, the ACK packet A1 (that is, an ACK packet for a data packet which has not been captured by the packet analysis device 3 yet) is captured at the time point T5; and
(3) Next, the data packet D1 is captured at the time point T6.

Here, when the operation examples E1 and E2 are compared paying attention to the packet analysis device 3, the operation examples E1 and E2 have the following two similarities.

The first similarity is that the packet analysis device 3 captures an ACK packet for a data packet which has not been captured by the packet analysis device 3 yet. Specifically, in the operation example E1, the packet analysis device 3 captures the ACK packet A1 at the time point T2, and, in the operation example E2, the packet analysis device 3 captures the ACK packet A1 at the time point T5.

The second similarity is that the second device 2 transmits the ACK packet A1, and then the packet analysis device 3 captures a data packet, which precedes a data packet which is expected to be received next from the first device 1, after capturing the ACK packet A1. In other words, the packet analysis device 3 captures a data packet which the second device 2 has received before transmitting the ACK packet A1, after capturing the ACK packet A1. Specifically, in the operation example E1, the packet analysis device 3 captures the retransmission packet R1 at the time point T3, and, in the operation example E2, the packet analysis device 3 captures the data packet D1 at the time point T6.

In the above description, "the data packet which is expected to be received next from the first device 1 after the second device 2 transmits the ACK packet A1" is indicated by information included in the ACK packet A1 which is captured by the packet analysis device 3.

Here, it is noted that, in either one of the operation examples E1 and E2, the second device 2 has already received the data packet D1 before transmitting the ACK packet A1. This being noted, a data packet which is expected to be received next by the second device 2 from the first device 1 is a data packet following the data packet D1 in the order over the connection. In other words, the data packet D1 itself or the retransmission packet R1 which is a packet for retransmission of the data packet D1 is a data packet preceding a data packet which is expected to be received next by the second device 2 from the first device 1 in the order over the connection.

As above, in a case where a data packet is received after the packet analysis device 3 captures an ACK packet for a data packet which has not been captured yet, the data packet which is received later may be a retransmission packet. In other words, in a case where the data packet which is captured later than the ACK packet by the packet analysis device 3 is a data packet preceding a data packet which is expected to be received next by the second device 2 from the first device 1, a capture loss and retransmission may occur as in the operation example E1.

However, as can be seen from the operation example E2, a capture loss and retransmission do not necessarily occur at all times. There may be a case where order inversion occurs between a data packet and an ACK packet in a capture process.

Therefore, the packet analysis device 3 preferably accurately discriminates a case where a capture loss and retransmission occur as in the operation example E1 from a case where order inversion occurs as in the operation example E2. Misjudgment is reduced through accurate discrimination. In addition, if misjudgment is reduced, accuracy of estimated values of indexes regarding network quality such as, for example, a retransmission rate or a network loss rate improves.

Here, the order inversion as in the operation example E2 may occur in a case where the first condition holds true. In addition, in a case where one or more conditions among the second to fifth conditions further hold true in addition to the first condition, the order inversion as in the operation example E2 may notably frequently occur.

For example, when RTT is short between the first device 1 and the second device 2, the data packet D1 may arrive at the second device 2 before copying of the data packet D1 from the network port corresponding to the passing point 4 to the mirror port is completed. In addition, although the ACK packet A1 is transmitted from the second device 2 and is copied to the mirror port from the network port corresponding to the passing point 5, copying of the data packet D1 may not be completed yet.

For example, a third device (not illustrated) other than the first device 1 and the second device 2 may be present, and a traffic between the first device 1 and the third device may pass through the passing point 4. In a case where there is a very large amount of traffic from the first device 1 to the third device, a large number of packets which are targets copied to the mirror port from the network port corresponding to the passing point 4 may be accumulated in the buffer. As a result, it may take a relatively long time for copying to the mirror port from the network port corresponding to the passing point 4. On the other hand, copying to the mirror port from the network port corresponding to the passing point 5 may finish in a short time. As a result, as in the operation example E2, the ACK packet A1 may be captured by the packet analysis device 3 earlier than the data packet D1.

For example, also in a case where a number of data packets with a large size are transmitted from the first device 1 to the second device 2 per unit time, in the same manner as in the above-described examples, a processing load on a circuit which copies the data packets to the mirror port from the network port corresponding to the passing point 4 is heavy. Therefore, in this case, copying of the data packets to the mirror port from the network port corresponding to the passing point 4 tends to be delayed. In addition, especially in a case where a circuit performing the copying process has a low processing capability, copying of the data packets to the mirror port tends to be considerably delayed. This delay is one of factors causing inversion of a capture order of the data packet D1 and the ACK packet A1.

As can be seen from the above-described examples, in a case where one or more conditions among the second to fifth conditions further hold true in addition to the first condition, the order inversion as in the operation example E2 may notably frequently occur.

Here, if discrimination between a case where a capture loss and retransmission occur as in the operation example E1 and a case where order inversion occurs as in the operation example E2 is not performed, the order inversion as in the operation example E2 will be erroneously judged as "the occurrence of a capture loss and retransmission." In other words, if a type of packet analysis device which does not discriminate two cases from each other is used, a probability of misjudgment increases in circumstances in which the first condition holds true (particularly, when one or more conditions further hold true among the second to fifth conditions).

The packet analysis device 3 according to the present embodiment is devised so as to reduce such misjudgment. According to the packet analysis device 3 of the present embodiment, a case where a capture loss and retransmission occur as in the operation example E1 and a case where order inversion occurs as in the operation example E2 may be discriminated from each other with satisfactory accuracy. In addition, the packet analysis device 3 may be implemented using a dedicated hardware circuit such as an ASIC, or may be implemented using a general purpose computer executing a program.

Specifically, the packet analysis device 3 discriminates a case where a capture loss and retransmission occur as in the operation example E1 and a case where order inversion occurs as in the operation example E2 from each other, by performing the following processes.

It is assumed that a certain ACK packet indicates that the second device 2 has received a first data packet transmitted from the first device 1, and is transmitted from the second device 2. When the packet analysis device 3 captures this ACK packet, the packet analysis device 3 judges "whether or not the packet analysis device 3 has already captured the first data packet." The packet analysis device 3 includes a first judgment unit making this judgment, and, for example, a detection unit 44 described later is an example of the first judgment unit.

For example, in both of the operation examples E1 and E2, the ACK packet A1 indicates that the second device 2 has received the data packet D1, and is transmitted from the second device 2.

Therefore, when the ACK packet A1 is captured at the time point T2 of the operation example E1, the packet analysis device 3 judges "whether or not the packet analysis device 3 has already captured the data packet D1." As a result, the packet analysis device 3 judges that "the packet analysis device 3 has not yet captured the data packet D1."

Similarly, when the ACK packet A1 is captured at the time point T5 of the operation example E2, the packet analysis device 3 judges "whether or not the packet analysis device 3 has already captured the data packet D1." As a result, the packet analysis device 3 judges that "the packet analysis device 3 has not yet captured the data packet D1."

Of course, as a result of the above judgment, there may be a case where the packet analysis device 3 judges that "the packet analysis device 3 has already captured the first data packet." In this case, the packet analysis device 3 simply normally captures the ACK packet for the first data packet which has been captured. In other words, in this case, the first data packet and the ACK packet therefor normally flow over the network and are sequentially captured by the packet analysis device 3.

Conversely, as a result of the above judgment, there may be a case where the packet analysis device 3 judges that "the packet analysis device 3 has not yet captured the first data packet." Here, that "the ACK packet is captured" is evidence that "the first data packet is not lost on the communication path between the first device 1 and the second device 2." This is because the ACK packet captured by the packet analysis device 3 indicates that "the first data packet transmitted from the first device 1 has been received by the second device 2" as described above. Therefore, in this case, the following two possibilities (1) and (2) are considered.

(1) For example, as in the operation example E1, a possibility that the first data packet has arrived successfully at the second device 2, but the packet analysis device 3 has failed to capture the first data packet (that is, a possibility that a capture loss of the first data packet occurs).

(2) For example, as in the operation example E2, a possibility that order inversion between the first data packet and the ACK packet has occurred in the capture process, and thus the first data packet has not yet been captured by the packet analysis device 3.

Therefore, the packet analysis device 3 performs a process for discriminating the above two possibilities from each other. Specifically, as a result of the judgment based on the reception of the ACK packet, the packet analysis device 3 judges that "the packet analysis device 3 has not yet captured the first data packet", and, in this case, the packet analysis device 3 is operated as follows.

When the packet analysis device 3 further captures a second data packet transmitted from the first device 1 after capturing the ACK packet which is the trigger of the judgment, the following first numerical value and second numerical value are compared with each other. The packet analysis device 3 includes a comparison unit which performs the comparison, and, for example, the detection unit 44 described later is an example of the comparison unit.

The first numerical value is a numerical value for identifying a data packet which is expected to be received next by the second device 2 from the first device 1 over a connection based on the second communication protocol, and is indicated by the ACK packet. In addition, the second numerical value is included in the second data packet itself in order to identify the second data packet over the connection.

For example, in the operation example E1, the packet analysis device 3 captures the retransmission packet R1 at the time point T3 after capturing the ACK packet A1 at the time point T2. Therefore, in the operation example E1, the second data packet is, specifically, the retransmission packet R1.

In addition, in the operation example E1, the first numerical value is indicated by the ACK packet A1. More specifically, in the operation example E1, the first numerical value is a numerical value for identifying a data packet which is expected to be received next after the data packet D1 by the second device 2 from the first device 1. For example, in a case where the second communication protocol is TCP, the first numerical value may be an ACK number (acknowledgment number) in a TCP header of the ACK packet A1.

In addition, in the operation example E1, the second numerical value is included in the retransmission packet R1 itself in order to identify the retransmission packet R1 over the connection. Here, as described above, the second communication protocol is connection-oriented and has a retransmission procedure. In addition, the retransmission packet R1 is a packet retransmitted in accordance with the retransmission procedure, and thus payloads of the retransmission packet R1 and the data packet D1 are the same as each other. Further, the retransmission packet R1 is a packet retransmitted in accordance with the retransmission procedure, and thus the second numerical value for identifying the retransmission packet R1 over the connection is the same as a numerical value for identifying the data packet D1 over the connection. For example, in a case where the second communication protocol is TCP, the second numerical value may be a sequence number in a TCP header of the retransmission packet R1.

As above, in the operation example E1, the second numerical value included in the retransmission packet R1 is the same as the numerical value for identifying the data packet D1 over the connection. For this reason, order over the connection indicated by the second numerical value is earlier than order indicated by the first numerical value included in the ACK packet A1.

On the other hand, in the operation example E2, the packet analysis device 3 captures the data packet D1 at the time point T6 after capturing the ACK packet A1 at the time point T5. Therefore, in the operation example E2, the second data packet is, specifically, the data packet D1.

Also in the operation example E2, in the same manner as in the operation example E1, the first numerical value is a numerical value for identifying a data packet which is expected to be received next after the data packet D1 by the second device 2 from the first device 1. For example, as described above, the first numerical value may be an ACK number in a TCP header of the ACK packet A1.

In addition, in the operation example E2, the second numerical value is a numerical value included in the data packet D1 itself in order to identify the data packet D1 over the connection. For example, in a case where the second communication protocol is TCP, the second numerical value may be a sequence number in a TCP header of the data packet D1.

From the above description, also in the operation example E2, in the same manner as in the operation example E1, order over the connection indicated by the second numerical value is earlier than order indicated by the first numerical value.

Here, as described in the operation example E1, a numerical value for identifying the data packet D1 over the connection is the same as a numerical value for identifying the retransmission packet R1 over the connection. Therefore, a case where a capture loss and retransmission occur as in the operation example E1 and a case where order inversion occurs in a capture process as in the operation example E2 are not discriminated from each other through mere comparison between the above-described first numerical value and second numerical value.

From another viewpoint, since the same numerical value as a numerical value of the data packet D1 is assigned to the retransmission packet R1 in accordance with the second communication protocol (for example, TCP), it is represented that "the retransmission packet R1 is retransmission of the data packet D1." As a result, connection-oriented communication is realized. For this reason, merely using control information (for example, the first numerical value or the second numerical value) used in the connection-oriented second communication protocol is insufficient to discriminate a case where a capture loss and retransmission occur from a case where order inversion occurs.

In addition, as a result of the comparison, there may be a case where it is judged that "order over the connection indicated by the second numerical value is the same as order over the connection indicated by the first numerical value." In this case, a subsequent data packet is transmitted toward the second device 2 as expected, and thus communication circumstances are normal.

In addition, there may be a case where order over the connection indicated by the second numerical value is later than order over the connection indicated by the first numerical value. In this case, for example, there is a possibility that "a network loss or a capture loss of the expected next data packet has occurred, and thus a data packet which is later than the next data packet has been captured." The packet analysis device 3 may detect this kind of network loss or capture loss on the basis of, for example, a well-known method.

However, as described above, merely using information used in the connection-oriented second communication protocol is insufficient to discriminate a case where a capture loss and retransmission occur from a case where order inversion occurs. Therefore, the packet analysis device 3 uses control information used in the first communication protocol in order to discriminate the two cases from each other.

As described above, the first communication protocol is a connectionless protocol defined in a layer lower than the second communication protocol. Therefore, even the data packet D1 and the retransmission packet R1 which are not differentiated from each other in numerical values assigned by the second communication protocol may be differentiated in control information used in the first communication protocol.

Accordingly, in a case where order over the connection indicated by the second numerical value is earlier than order over the connection indicated by the first numerical value, the packet analysis device 3 makes judgment based on a difference between the following third numerical value and fourth numerical value. The packet analysis device 3 also includes a second judgment unit which makes this judgment, and, for example, the detection unit 44 described later is an example of the second judgment unit.

The third numerical value is a numerical value which is assigned to the second data packet by the first device 1 in order to identify the second data packet in accordance with the first communication protocol. For example, in a case where the first communication protocol is IP version 4, the third numerical value may be an ID in an IP header of the captured second data packet.

In addition, for convenience of description, a data packet which is captured latest by the packet analysis device 3 among data packets which are transmitted from the first device 1 and are captured before the ACK packet by the packet analysis device 3 is referred to as a "previous data packet." The fourth numerical value is a numerical value which is assigned to the previous data packet in accordance with the first communication protocol by the first device 1 in order to identify the previous data packet. For example, in a case where the first communication protocol is IP version 4, the fourth numerical value may be an ID in an IP header of the previous data packet.

In other words, both of the third numerical value and the fourth numerical value are identification numbers assigned in accordance with the connectionless first communication protocol. In other words, the third numerical value and the fourth numerical value are assigned independently from order between packets over the connection.

For example, in the operation example E1, the third numerical value is an identification number assigned, in accordance with the first communication protocol, to the retransmission packet R1 (that is, the data packet captured at the time point T3) corresponding to the second data packet. In addition, in the operation example E1, the previous data packet is the last one among data packets captured before the ACK packet A1 is captured at the time point T2. In other words, the previous data packet in the operation example E1 is the data packet D0. Therefore, in the operation example E1, the fourth numerical value is an identification number which is assigned to the data packet D0 in accordance with the first communication protocol.

On the other hand, in the operation example E2, the third numerical value is an identification number assigned, in accordance with the first communication protocol, to the data packet D1 (that is, the data packet captured at the time point T6) corresponding to the second data packet. In addition, in the operation example E2, the previous data packet is the last one among data packets captured before the ACK packet A1 is captured at the time point T5. In other words, the previous data packet in the operation example E2 is the data packet D0. Therefore, in the operation example E2, the fourth numerical value is an identification number which is assigned to the data packet D0 in accordance with the first communication protocol.

Here, in the operation example E1, a data packet which is captured next after the data packet D0 by the packet analysis device 3 is the retransmission packet R1, but, actually, the data packet D1 is transmitted from the first device 1 between the data packet D0 and the retransmission packet R1. In other words, in the operation example E1, before the first device 1 assigns an identification number to the retransmission packet R1 in accordance with the first communication protocol, at least one identification number is used for the data packet D1.

For this reason, in the operation example E1, among the captured data packets, the data packet D0 and the retransmission packet R1 are adjacent to each other in a capture order, but identification numbers of the data packet D0 and the retransmission packet R1 are not adjacent to each other. In other words, in a case where a capture loss and retransmission occur as in the operation example E1, a difference between the third numerical value and the fourth numerical value is larger than the number of capture losses of data packets, occurring between capture of the previous data packet and capture of the ACK packet.

In contrast, in the operation example E2, a data packet which is captured next after the data packet D0 by the packet analysis device 3 is the data packet D1, and a data packet which is transmitted next after the data packet D0 from the first device 1 is also the data packet D1. Therefore, if the first device 1 does not transmit a packet between transmission of the data packet D0 and transmission of the data packet D1, identification numbers of the data packets D0 and D1 are adjacent to each other.

Of course, the first device 1 may transmit, for example, one or more certain packets as exemplified below between the transmission of the data packet D0 and the transmission of the data packet D1.

(1) A packet directed to the second device 2, over another connection between the first device 1 and the second device 2 in accordance with the second communication protocol (2) A packet directed to the second device 2 in accordance with protocols other than the second communication protocol (3) A packet directed to a different device other than the second device 2

As above, in a case where the first device 1 transmits one or more certain packets between the data packets D0 and D1, the third numerical value and the fourth numerical value are not adjacent to each other. In other words, in this case, a difference between the third numerical value and the fourth numerical value is a value corresponding to the number of packets which are transmitted between the data packet D0 and D1.

However, if a difference between the third numerical value and the fourth numerical value is large, a probability that a capture loss and retransmission may have occurred as in the operation example E1 is higher than a probability that order inversion may have occurred as in the operation example E2. Conversely, if a difference between the third numerical value and the fourth numerical value is small, a probability that order inversion may have occurred is higher than a probability that a capture loss and retransmission may have occurred.

Therefore, the packet analysis device 3 makes judgment based on a difference between the third numerical value and the fourth numerical value and thus can discriminate the two cases from each other with high reliability to some extent.

In other words, the packet analysis device 3 judges "whether or not the captured second data packet is the first data packet which is captured by the packet analysis device 3 later than the ACK packet" based on a difference between the third numerical value and the fourth numerical value.

For example, the operation example E2 is an example in which "the data packet D1 which is captured as the second data packet at the time point T6 is actually the first data packet which is captured by the packet analysis device 3 later than the ACK packet A1 for the first data packet." The packet analysis device 3 may judge that "the second data packet is the first data packet captured later" based on a difference between the third numerical value and the fourth numerical value. In other words, the packet analysis device 3 may judge that "the second data packet is the first data packet captured later" since a difference between the identification numbers of the data packets D1 and D0 is small.

On the other hand, in the operation example E1, the retransmission packet R1 which is captured as the second data packet at the time point T3 is not the first data packet (that is, the data packet D1 of which reception has been performed in the second device 2, indicated by the ACK packet A1). The packet analysis device 3 may judge that "the second data packet is not the first data packet which is captured later" based on a difference between the third numerical value and the fourth numerical value. In other words, the packet analysis device 3 may judge that "the second data packet is not the first data packet which is captured later" since a difference between the identification number of the retransmission packet R1 and the identification number of the data packet D0 is large.

In addition, in the above description, relative expressions such as "large" and "small" are used in relation to a difference between the third numerical value and the fourth numerical value. However, judgment based on the difference is preferably, specifically, judgment based on a variable threshold value.

More specifically, if a difference between the third numerical value and the fourth numerical value is equal to or less than a threshold value, the packet analysis device 3 may judge that "the captured second data packet is actually the first data packet which is captured later than the ACK packet." The threshold value is a value defined in accordance with the first numerical value and a fifth numerical value which is included in the previous data packet in order to identify the previous data packet over the connection.

For example, in a case where the second communication protocol is TCP, as described above, the first numerical value is an ACK number in the TCP header. In addition, the fifth numerical value is a sequence number in a TCP header of the previous data packet. The threshold value may be determined based on the ACK number which is the first numerical value and the sequence number which is the fifth numerical value.

More preferably, the threshold value may be determined based not only the first numerical value and the fifth numerical value but also the following two values:

(1) A size of the previous data packet (more specifically, a size of a payload of the previous data packet in the second communication protocol); and (2) A size value concerning sizes (more specifically, sizes of payloads of data packets in the second communication protocol) of a plurality of data packets transmitted from the first device 1 to the second device 2 over the connection.

For example, in a case where the second communication protocol is TCP, a range regarding "capturing up to which an octet in a data stream flowing over the connection is completed" turns out from a sum of the fifth numerical value and a size of the previous data packet. In addition, in a case where the second communication protocol is TCP, the first numerical value is an ACK number indicated by an ACK packet, and indicates a position of an octet which is expected to be received next by the second device 2. Therefore, a range of uncaptured octets turns out, and the number of uncaptured octets may be calculated, from the first numerical value, the fifth numerical value, and the size of the previous data packet.

The above-described threshold value may be the quotient obtained by dividing the number of uncaptured octets by a size value, or may be an integer obtained by rounding up the quotient. For example, the size value may be a statistical value obtained from sizes of a plurality of data packets which are transmitted from the first device 1 to the second device 2 over the connection. More specifically, the size value may be a payload length which is equal to or larger than a predetermined reference in relative comparison among a plurality of data packets which are transmitted from the first device 1 to the second device 2 over the connection.

The predetermined reference may be a reference such as, for example, "a length within top X1% in order of a long payload" or "a length within top X2 in order of a long payload" (where X1 and X2 are predefined values). For example, in a case where X2=1, a size value is the largest payload length among a plurality of data packets which are transmitted from the first device 1 to the second device 2 over the connection.

The packet analysis device 3 may obtain a size value from a plurality of data packets which are actually captured. Alternatively, in a case where the largest payload length of a data packet is predefined by negotiation (or by a specification) when a connection is established, the packet analysis device 3 may use the predefined size value.

For example, in TCP, a maximum segment size (MSS) is often determined when a connection is established. The packet analysis device 3 may recognize the MSS by capturing a SYN packet or a SYN/ACK packet which includes designation of the MSS in an option field of a TCP header. The packet analysis device 3 may use the recognized MSS as a size value.

In addition, the above-described "plurality of data packets" related to a size value may be appropriately determined according to embodiments. For example, "a plurality of data packets" may be either one in the following:

(1) All data packets which have been transmitted from the first device 1 to the second device 2 over a connection and have been successfully captured by the packet analysis device 3 after the connection was established; and (2) All data packets which have been transmitted from the first device 1 to the second device 2 over a connection and have been successfully captured by the packet analysis device 3 within the most recent predetermined period (for example, within the most recent X3 minutes) (where X3 is a predefined value)

For example, in a case where the second communication protocol is TCP, the first numerical value is an ACK number and indicates a leading octet of a TCP payload of a data packet which is expected to be received next by the second device 2. In addition, in a case where the second communication protocol is TCP, the fifth numerical value is a sequence number and indicates a leading octet of a TCP payload of a previous data packet. The size value may be, for example, the largest TCP payload length among all data packets which are transmitted from the first device 1 to the second device 2 over a connection and are successfully captured by the packet analysis device 3.

For example, the packet analysis device 3 may estimate a total size of one or more data packets which are estimated to have failed to be captured by the packet analysis device 3 by subtracting a sum of the fifth numerical value and a size of a previous data packet from the first numerical value. The packet analysis device 3 may estimate the number of data packets which are estimated to have failed to be captured by the packet analysis device 3 by dividing the estimated total size by the size value.

In other words, the number of data packets estimated in this way is an estimated value of the number of capture losses of data packets, occurring between capture of a previous data packet and capture of an ACK packet. In addition, in the operation example E1 of FIG. 1, the number of capture losses of data packets is one, but, for example, the packet analysis device 3 may fail to capture two or more consecutive data packets. Therefore, an estimated value of the number of capture losses is 2 or more in some cases.

The above-described estimated value of the number of capture losses is appropriate as the threshold value for comparison with a difference between the third numerical value and the fourth numerical value. This is because, in a case where the number of capture losses which actually occur between capture of a previous data packet and capture of an ACK packet is one or more, a difference between the third numerical value and the fourth numerical value is larger than the number of actual capture losses. The number of actual capture losses is unknown to the packet analysis device 3, but the packet analysis device 3 may use an estimated value of the number of capture losses as the threshold value instead of the number of actual capture losses.

In addition, in a case where the largest payload length is used as the size value as above, the number of capture losses which is estimated based on division using the size value in the above-described way is a minimum value which can be estimated. As above, when the minimum value which can be estimated is used as an estimated value of the number of capture losses, there is an advantage of reducing side effects. The reason thereof is as follows.

As described above, in a case where a difference between the third numerical value and the fourth numerical value is equal to or less than the threshold value, the packet analysis device 3 may judge that "the captured second data packet is the first data packet captured later than the ACK packet." In other words, the packet analysis device 3 may judge that "order inversion occurred in the capture process" in a case where the difference between the third numerical value and the fourth numerical value is equal to or less than the threshold value.

Conversely, in a case where the difference between the third numerical value and the fourth numerical value is larger than the threshold value, the packet analysis device 3 may judge that "a capture loss and retransmission has occurred." In other words, in this case, the packet analysis device 3 may judge that "the packet analysis device 3 has captured a data packet including the same numerical value as the numerical value of the first data packet and retransmitted from the first device 1 in accordance with the retransmission procedure of the second communication protocol, as the second data packet."

Here, as the threshold value is more appropriately defined, accuracy of judgment by the packet analysis device 3 is higher. However, if the threshold value is defined so as to be excessively large, although a capture loss and retransmission has actually occurred, there is concern that the packet analysis device 3 may misjudge that "inversion has occurred in the capture process." In addition, if the threshold value is defined so as to be excessively small, although inversion has actually occurred in the capture process, there is concern that the packet analysis device 3 may misjudge that "a capture loss and retransmission have occurred."

Upon comparison between the former misjudgment and the latter misjudgment, it is considered that the latter misjudgment has a reduced harmful effect. This is because, according to the findings obtained by the present inventor, a capture loss and retransmission occur more frequently than order inversion in a capture process.

Therefore, in order to improve accuracy of judgment as a whole, the packet analysis device 3 preferably detects only a case where order inversion has obviously occurred in a capture process as order inversion. In other words, the packet analysis device 3 preferably judges that "a capture loss and retransmission have occurred" in a case where it is difficult to clearly judge whether "order inversion has occurred in a capture process or a capture loss and retransmission have occurred." In other words, it is expected that, if the packet analysis device 3 avoids the former misjudgment even slightly by making the latter misjudgment, it is possible to improve accuracy of overall judgment.

The former misjudgment may occur in a case where a threshold value is excessively large. Therefore, if the former misjudgment is to be avoided, it is useful to suppress the threshold value to a small value in an appropriate range. Thus, the packet analysis device 3 employs the minimum value which can be estimated as an estimated value of the number of capture losses as described above, and uses the estimated value as the threshold value, so as to reliably avoid the former misjudgment, thereby improving accuracy of overall judgment.

As described above, according to the packet analysis device 3 of the present embodiment, a case where a capture loss and retransmission occur and a case where order inversion occurs in a capture process are discriminated from each other with relatively high accuracy. In other words, according to the packet analysis device 3, misjudgment concerning retransmission is reduced. Therefore, for example, in a case where the packet analysis device 3 is used for an application or the like of estimating network quality from the number of retransmissions so as to monitor the network quality, accuracy of the estimation is improved.

In recent years, since there has come to be many opportunities for a server to provide services to clients via a network, importance of monitoring of network quality has also increased. Therefore, improvement in estimation accuracy of network quality by the packet analysis device 3 is very useful to service providers or network providers.

Hereinafter, the present embodiment will be described in more detail by exemplifying a case where the first communication protocol is IP (more specifically, IP version 4) and the second communication protocol is TCP. In addition, in the following description, the packet analysis device 3 is assumed to be a network monitoring device which performs packet analysis in order to monitor network quality.

FIG. 2 is a diagram exemplifying inversion of order between packets in a capture process. FIG. 2 exemplifies inversion as in the operation example E2 of FIG. 1.

FIG. 2 exemplifies hosts 11 and 12. Both of the hosts 11 and 12 are computers. For example, the host 11 corresponds to the first device 1 of FIG. 1, and the host 12 corresponds to the second device 2 of FIG. 1. In addition, in FIG. 2 and the like, the term "host" is used, but "host" may be replaced with the term "node."

A packet analysis system 10a or 10b is provided over a network between the hosts 11 and 12. The packet analysis system 10a includes a network device 13a and a network monitoring device 17a, and the packet analysis system 10b includes a network device 13b and a network monitoring device 17b.

The network device 13a has at least three ports 14a, 15b and 16b, and the network device 13b has at least four ports 14b, 15b, 16b and 16c. The ports 14a and 14b correspond to the passing point 4 of FIG. 1, and the ports 15a and 15b correspond to the passing point 5 of FIG. 1.

The port 14a is directly connected to the host 11, or is indirectly connected to the host 11 via one or more other network devices (for example, switches, routers, or the like). The port 15a is directly connected to the host 12, or is indirectly connected to the host 12 via one or more other network devices (for example, switches, routers, or the like).

The port 16a is connected to the network monitoring device 17a. The port 16a is preferably directly connected to the network monitoring device 17a via a cable. The network monitoring device 17a may capture an output from the port 16a so as to capture packets which are transmitted and received between the host 11 and the host 12.

The port 14b is directly connected to the host 11, or is indirectly connected to the host 11 via one or more other network devices (for example, switches, routers, or the like). The port 15b is directly connected to the host 12, or is indirectly connected to the host 12 via one or more other network devices (for example, switches, routers, or the like).

The ports 16b and 16c are connected to the network monitoring device 17b. The ports 16b and 16c are preferably directly connected to the network monitoring device 17b via cables. The network monitoring device 17b receives a packet which is output from the port 16b, and also receives a packet which is output from the port 16c.

The network monitoring device 17b includes a buffer 18 which stores packets received from the port 16b and packets received from the port 16c together. The buffer 18 is, specifically, a First-In First Out (FIFO) queue.

The network device 13a may be a switch or a router having a port mirroring function. In this case, both of the ports 14a and 15a are network ports, and the port 16a is an aggregation mirror port which mirrors both a packet received in the port 14a and a packet received in the port 15a. In this case, when a packet which is transmitted from the host 11 toward the host 12 is received in the port 14a, the network device 13a performs the following processes:

(1) The received packet is transmitted from the port 15a toward the host 12; and (2) The received packet is copied so as to be output to the port 16a, and the copied packet is transmitted from the port 16a to the network monitoring device 17a.

In addition, in a case where the network device 13a is a switch or a router having a port mirroring function, when a packet which is transmitted from the host 12 toward the host 11 is received in the port 15a, the network device 13a performs the following processes:

(1) The received packet is transmitted from the port 14a toward the host 11; and (2) The received packet is copied so as to be output to the port 16a, and the copied packet is transmitted from the port 16a to the network monitoring device 17a.

Similarly, the network device 13b may also be a switch or a router having a port mirroring function. In this case, both of the ports 14b and 15b are network ports. In addition, in this case, the port 16b is a mirror port which mirrors a packet received in the port 14b, and the port 16c is a mirror port which mirrors a packet received in the port 15b. In this case, when a packet which is transmitted from the host 11 toward the host 12 is received via the port 14b, the network device 13b performs the following processes:

(1) The received packet is transmitted from the port 15b toward the host 12; and (2) The received packet is copied so as to be output to the port 16b, and the copied packet is transmitted from the port 16b to the network monitoring device 17b.

In addition, in a case where the network device 13b is a switch or a router having a port mirroring function, when a packet which is transmitted from the host 12 toward the host 11 is received in the port 15b, the network device 13b performs the following processes:

(1) The received packet is transmitted from the port 14b toward the host 11; and (2) The received packet is copied so as to be output to the port 16c, and the copied packet is transmitted from the port 16c to the network monitoring device 17b.

Alternatively, the network device 13a may be a network tap. In this case, the port 16a is an aggregation monitor port. In this case, when a signal of a packet which is transmitted from the host 11 toward the host 12 is received via the port 14a, the signal is split into two in a physical layer. One split signal passes through the network device 13a (specifically, the signal is output toward the host 12 from the port 15a). The other split signal is output to the network monitoring device 17a from the port 16a.

In addition, in a case where the network device 13a is a network tap, when a signal of a packet which is transmitted from the host 12 to the host 11 is received via the port 15a, the signal is split into two in a physical layer. One split signal passes through the network device 13a (specifically, the signal is output toward the host 11 from the port 14a). The other split signal is output to the network monitoring device 17a from the port 16a.

Similarly, the network device 13b may be a network tap. In this case, both of the ports 16b and 16c are monitor ports. In this case, when a signal of a packet which is transmitted from the host 11 toward the host 12 is received via the port 14b, the signal is split into two in a physical layer. One split signal passes through the network device 13b (specifically, the signal is output toward the host 12 from the port 15b). The other split signal is output to the network monitoring device 17b from the port 16b.

In addition, in a case where the network device 13b is a network tap, when a signal of a packet which is transmitted from the host 12 to the host 11 is received via the port 15b, the signal is split into two in a physical layer. One split signal passes through the network device 13b (specifically, the signal is output toward the host 11 from the port 14b). The other split signal is output to the network monitoring device 17b from the port 16c.

In any case, the network monitoring device 17a may capture a packet which is transmitted and received between the host 11 and the host 12 via the port 16a. However, in a case where adjustment for maintaining an order relationship between packets is not performed between the path from the port 14a to the port 16a and the path from the port 15a to the port 16a, order inversion may occur in a capture process as exemplified in the operation example E2 of FIG. 1.

Similarly, the network monitoring device 17b may capture a packet which is transmitted and received between the host 11 and the host 12 via the ports 16b and 16c. However, in a case where adjustment for maintaining an order relationship between packets is not performed between the path from the port 14b to the buffer 18 via the port 16b and the path from the port 15b to the buffer 18 via the port 16c, order inversion may occur in a capture process.

For example, in a case where the network device 13a is a switch or a router having a port mirroring function, order inversion may occur as in an operation example E3. First, it is assumed that the host 11 transmits a packet P1, then the host 11 transmits a packet P2, and then the host 12 transmits a packet P3. Therefore, the network device 13a receives the packet P1 via the port 14a first, receives the packet P2 via the port 14a next, and then receives the packet P3 via the port 15a.

However, for some reason, there may be a case where the packet P3 which arrives at the network device 13a later than the packet P2 is copied to the port 16a from the port 15a before the packet P2 is copied to the port 16a from the port 14a. As a result, from the port 16a, the packet P1 is output first, the packet P3 is output next, and then the packet P2 is output. Therefore, the network monitoring device 17a captures the packet P1 first, captures the packet P3 next, and then captures the packet P2. In other words, in the operation example E3, order inversion occurs between the packets P2 and P3 in the capture process (more specifically, inside the network device 13a).

For example, the packets P1 and P2 may be data packets which are transmitted from the host 11 to the host 12 together. The packet P3 may be an ACK packet which is returned after the host 12 waits for the packet P2 to be received, in accordance with the delayed acknowledgment structure. In this case, the host 11 is notified by the packet P3 that both of the packets P1 and P2 have been received.

Hereinafter, for convenience of description, a payload length of a TCP segment is referred to as a "TCP data length."

Here, a length of an IP packet is a sum of an IP header length, a TCP header length, and a payload length of the TCP segment. In addition, a length of an IP packet is represented in the octet unit by a "total length" field of an IP header (specifically, a header of IP version 4). Further, an IP header length is represented in the 32-bit unit by an "Internet header length (IHL)" field of an IP header. Furthermore, a TCP header length is represented in the 32-bit unit by a "data offset" field of a TCP header. Therefore, the TCP data length can be calculated from values of the total length field, the IHL field and the data offset field.

For example, it is assumed that a sequence number in a TCP header of the packet P1 is 1, and a TCP data length of the packet P1 is 1514. In this case, a sequence number in a TCP header of the packet P2 which is transmitted immediately after the packet P1 by the host 11 is 1515 (=1+1514). In addition, it is assumed that the TCP data length of the packet P2 is also 1514. As described above, in a case where the packet P3 is an ACK packet which is transmitted for the packets P1 and P2, an ACK number in a TCP header of the packet P3 is 3029 (=1515+1514).

When long packets such as the packets P1 and P2 are consecutively received in the port 14a, a processing load on a circuit which performs a copying process from the port 14a to the port 16a increases. As a result, the copying process from the port 14a to the port 16a tends to be delayed. On the other hand, in a case where the packet P3 is an ACK packet as described above, since a size of the packet P3 is small, a copying process from the port 15a to the port 16a will be immediately completed. For this reason, order inversion as illustrated in the operation example E3 occurs, and thus the network monitoring device 17a may capture the packets in the order of the packet P1, the packet P3, and the packet P2.

In both a case where the network device 13a is a network tap and a case where the network device 13b is used, order inversion as in the operation example E3 may occur. The order inversion between the packets P2 and P3 in the operation example E3 is the same as the order inversion between the data packet D1 and the ACK packet A1 in the operation example E2 of FIG. 1.

Both of the network devices 13a and 13b appropriately detect order inversion in the same method as in the packet analysis device 3 of FIG. 1. In other words, both of the network devices 13a and 13b appropriately discriminate a case where order inversion has occurred from a case where a capture loss and retransmission have occurred. Therefore, reliability of network quality (for example, quality indicated by a retransmission rate or a network loss rate) estimated by the network device 13a or 13b is high.

Next, with reference to FIGS. 3 to 6, avoiding order inversion in a capture process and misjudgment will be described using a more specific example of a plurality of packets.

FIG. 3 is a diagram exemplifying a flow of packets. In a timing chart of FIG. 3, time lines of a host 21 and a host 22 are illustrated. Both of the hosts 21 and 22 are computers. In addition, a packet analysis device which captures a packet transmitted and received between the hosts 21 and 22 and performs analysis using the captured packet is provided at a capture location 23. The packet analysis device may be, specifically, a computer. A network device which is not illustrated in FIG. 3 is provided on a communication path between the hosts 21 and 22, and the packet analysis device captures a packet via the network device.

For example, the host 21 may be the first device 1 of FIG. 1, and the host 22 may be the second device 2 of FIG. 1. In this case, the packet analysis device which captures a packet at the capture location 23 is the packet analysis device 3. In addition, in this case, the passing points 4 and 5 of FIG. 1 are ports of the network device which are not illustrated in FIG. 3.

Alternatively, the host 21 may be the host 11 of FIG. 2, and the host 22 may be the host 12 of FIG. 2. In this case, the packet analysis device which captures a packet at the capture location 23 is the network monitoring device 17a or 17b.

In the example of FIG. 3, the host 21 sequentially transmits data packets D11 to D15 to the host 22. In addition, since a sliding window is used in TCP, the host 21 may transmit the data packets one by one in a range of a window size, without waiting for arrival of an ACK packet from the host 22.

Further, the host 22 does not immediately transmit an ACK packet even if the data packet D11 is received, in accordance with the delayed acknowledgment structure of TCP. The host 22 transmits an ACK packet A12 after receiving the data packet D1. Similarly, the host 22 does not immediately transmit an ACK packet even if the data packet D13 is received, and transmits an ACK packet A14 after receiving the data packet D14.

In FIGS. 3 to 6, for convenience of reference, a sequence number in a TCP header of the packet is indicated such as "seq=801", and a TCP data length of the packet is indicated such as "len=100". In addition, in FIGS. 3 to 6, an ACK number in the TCP header of the packet is indicated such as "ack=1001". Details thereof are as follows:

(1) A sequence number of the data packet D11 is 801, and a TCP data length of the data packet D11 is 100 octets;

(2) A sequence number of the data packet D12 is 901 (=801+100), and a TCP data length of the data packet D12 is 100 octets;

(3) The ACK packet A12 indicates a state in which the host 22 has received data packets up to the data packet D12. Therefore, an ACK number of the ACK packet A12 is 1001

(=901+100). In other words, the ACK packet A12 indicates that a sequence number of a data packet which is expected to be received next by the host 22 is 1001;

(4) A sequence number of the data packet D13 is 1001 (=901+100), and a TCP data length of the data packet D13 is 100 octets;

(5) A sequence number of the data packet D14 is 1101 (=1001+100), and a TCP data length of the data packet D14 is 100 octets;

(6) The ACK packet A14 indicates a state in which the host 22 has received data packets up to the data packet D14. Therefore, an ACK number of the ACK packet A14 is 1201 (=1101+100). In other words, the ACK packet A14 indicates that a sequence number of a data packet which is expected to be received next by the host 22 is 1201; and (7) A sequence number of the data packet D15 is 1201 (=1001+100), and a TCP data length of the data packet D15 is 100 octets.

Figure 4:
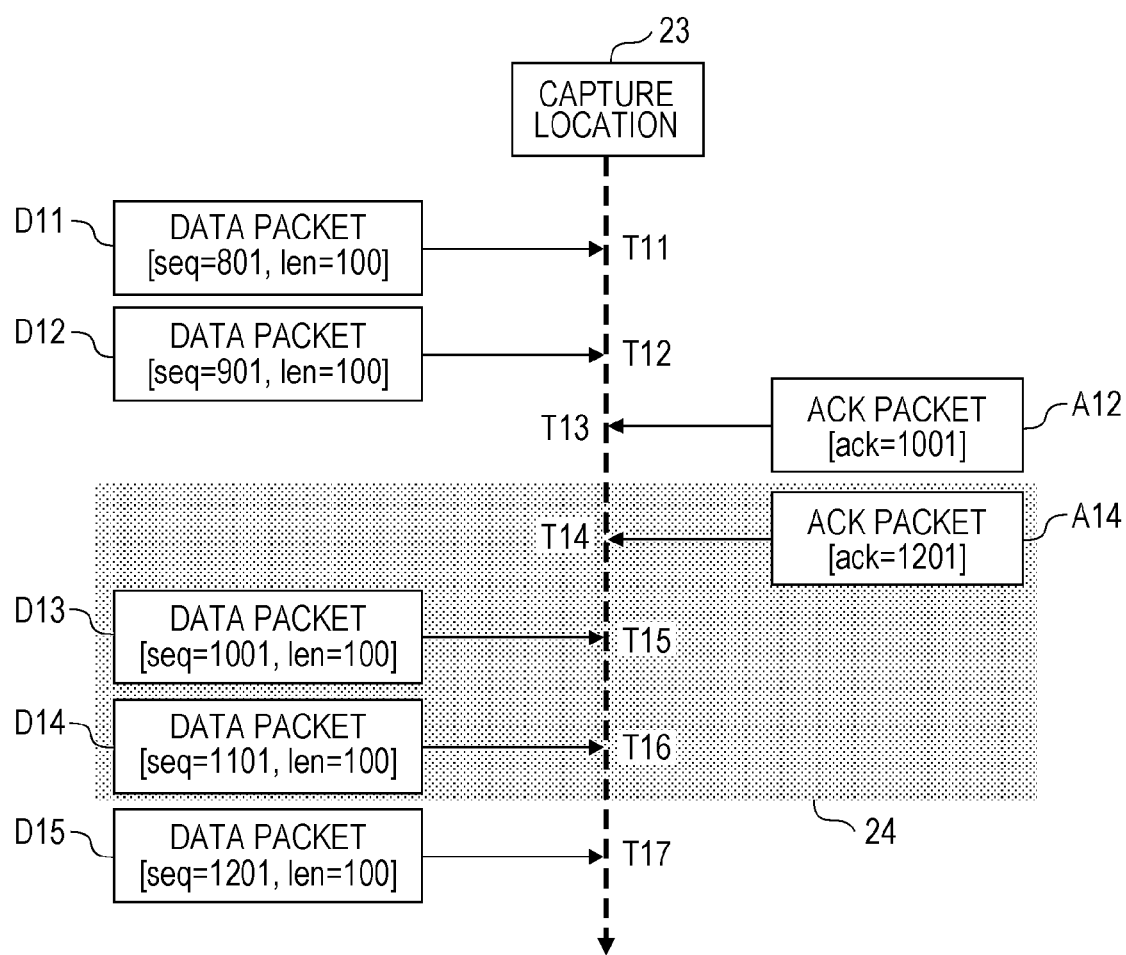
FIG. 4 is a diagram illustrating an example of order inversion between packets in a capture process.

Although details of order of packets which are captured at the capture location 23 are not illustrated in FIG. 3, specifically, the seven packets illustrated in FIG. 3 may be captured in order as in FIG. 4 in some cases. FIG. 4 is a diagram illustrating an example in which order between packets in a capture process is reversed.

For example, order inversion may occur, for example, in a case where time taken to copy a packet to a mirror port from a certain network port is much longer than time taken to copy a packet to the mirror port from another network port, or a case where RTT between the hosts 21 and 22 is short. A condition in which order inversion easily occurs is the same as described with reference to FIG. 1. In the example of FIG. 4, it is assumed that the seven packets of FIG. 3 are captured at the capture location 23, specifically, in the following order due to order inversion in a capture process:

(1) First, the data packet D11 is captured at the capture location 23 at the time point T11;

(2) Next, the data packet D12 is captured at the capture location 23 at the time point T12;

(3) Next, the ACK packet A12 is captured at the capture location 23 at the time point T13;

(4) Next, the ACK packet A14 is captured at the capture location 23 at the time point T14;

(5) Next, the data packet D13 is captured at the capture location 23 at the time point T15;

(6) Next, the data packet D14 is captured at the capture location 23 at the time point T16; and (7) Next, the data packet D15 is captured at the capture location 23 at the time point T17.

As can be seen from comparison between FIGS. 3 and 4, order inversion occurs in a range indicated as an inversion range 24 in FIG. 4. In other words, the data packets D13 and D14 are transmitted earlier than the ACK packet A14 as in FIG. 3, but the data packets D13 and D14 arrive at the capture location 23 later than the ACK packet A14.

More specifically, for example, in a case where a switch or a router having a port mirroring function is used, the data packets D13 and D14 are received in the network port of the switch or the router earlier than the ACK packet A14. Alternatively, in a case where a network tap is used, signals of the data packets D13 and D14 are input to an input port of the network tap earlier than a signal of the ACK packet A14. Notwithstanding, in FIG. 4, the ACK packet A14 is captured earlier than the data packets D13 and D14.

The order inversion as described in FIG. 4 is similar to the order inversion in the operation example E2 of FIG. 1. In other words, the following two order inversions are similar to each other:

(1) In the operation example E2 of FIG. 1, order inversion in which the ACK packet A1 is captured at the time point T5, and then the data packet D1 is captured at the time point T6; and (2) In FIG. 4, order inversion in which the ACK packet A14 is captured at the time point T14, and then the data packets D13 and D14 are captured at the time points T15 and T16.

In addition, the number of data packets which are captured later than the ACK packet due to the order inversion is one in the operation example E2 but is two in FIG. 4. However, the operation example E2 of FIG. 1 is similar to the example of FIG. 4 in that "one or more data packets which are transmitted earlier are captured later than an ACK packet which notifies of reception of the one or more data packets." In addition, a previous data packet in the operation example E2 is the data packet D0, and a previous data packet in FIG. 4 is the data packet D12.

However, as described with reference to FIG. 1, only using meta information regarding PDU of a protocol of a connection-oriented higher layer is insufficient to discriminate a case where a capture loss and retransmission occur as in the operation example E1 from a case where order inversion occurs as in the operation example E2. In other words, misjudgment may occur just by using meta information (for example, a sequence number in a TCP header, an ACK number in the TCP header, and a TCP data length) regarding a TCP segment. Therefore, in the present embodiment, as described with reference to FIG. 1, in order to avoid misjudgment, meta information (specifically, an ID in an IP header) regarding PDU of a protocol of a connectionless lower layer is used.

Figure 5:
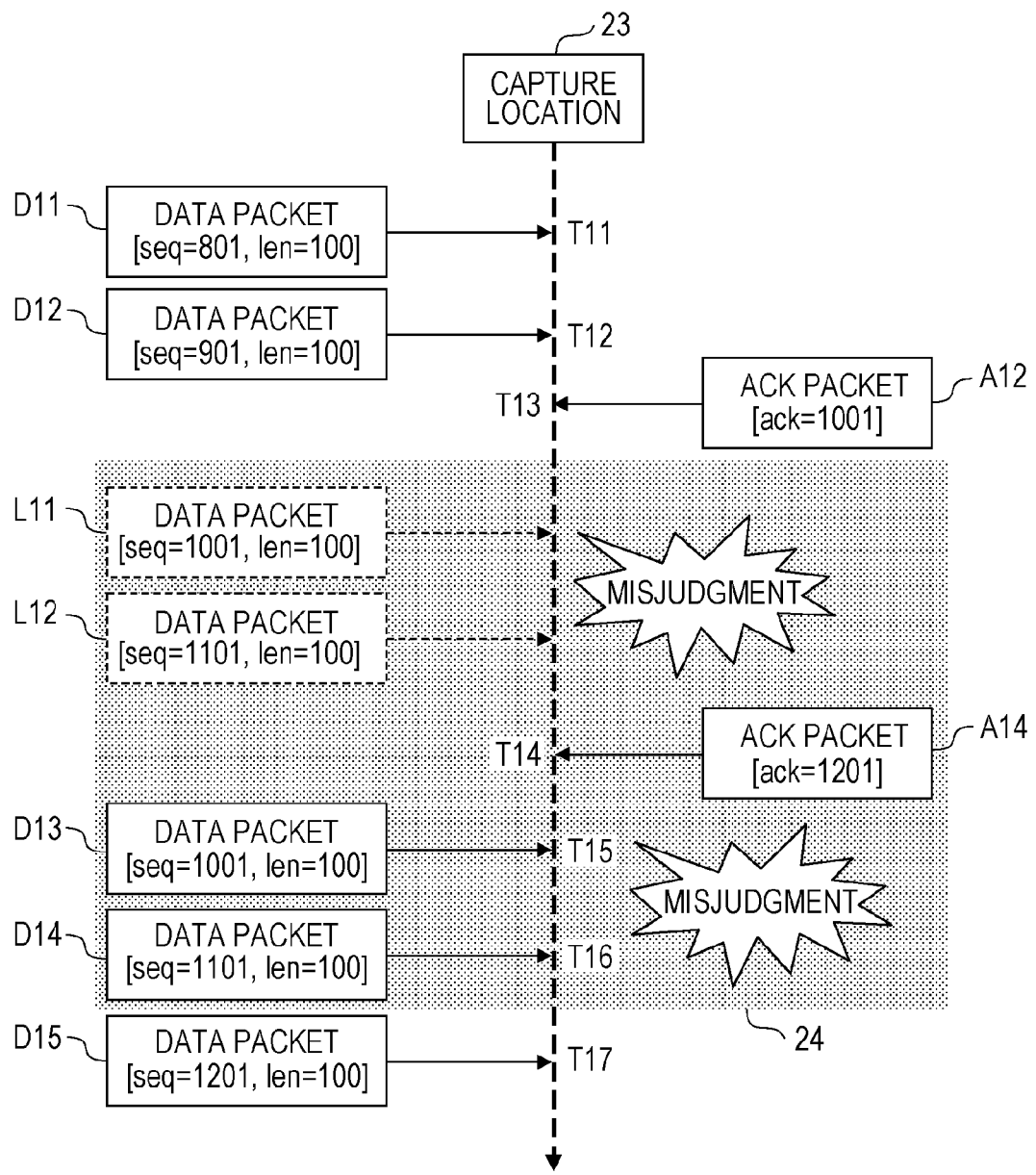
FIG. 5 is a diagram illustrating misjudgment which may occur due to order inversion in a comparative example.

Hereinafter, an example in which the packet analysis device which captures a packet at the capture location 23 performs analysis by using only meta information regarding the TCP segment will be described as a comparative example. FIG. 5 is a diagram illustrating misjudgment which may occur due to order inversion in the comparative example. Specifically, FIG. 5 exemplifies misjudgment which may occur in a case where seven packets are captured in the same order as in FIG. 4.

In the comparative example of FIG. 5, the packet analysis device which captures a packet at the capture location 23 captures the data packet D11 at the time point T11, captures the data packet D12 at the time point T12, and captures the ACK packet A12 at the time point T13. The packet analysis device recognizes that "the data packets D11 and D12 which were captured at the time points T11 and T12 had been successfully received by the host 22" based on an ACK number of the captured ACK packet A12. In other words, the packet analysis device recognizes that network losses of the data packets D11 and D12 do not occur. The above recognition is correct.

Next, the packet analysis device captures the ACK packet A14 at the time point T14. An ACK number of the ACK packet A14 is 1201. Therefore, the packet analysis device recognizes that "the host 22 has successfully received all data up to octets indicated by the numerical value 1200 over a connection (more specifically, over a data stream from the host 21 toward the host 22) between the hosts 21 and 22." This recognition itself is correct.

However, a last data packet which is captured by the packet analysis device before the time point T14 is the data packet D12. In addition, a sequence number of the data packet D12 is 901, and a TCP data length of the data packet D12 is 100. In other words, the packet analysis device just captures only data up to octets indicated by the numerical value 1000 (=901+100−1) over the data stream from the host 21 toward the host 22.

Therefore, the packet analysis device misjudges that "although one or more data packets corresponding to octets in a range indicated by the numerical values 1001 and 1200 were present, the one or more data packets have failed to be captured." In other words, the packet analysis device misjudges that "capture losses occurred between the time points T12 and T14."

In addition, a length of the range indicated by the numerical values 1001 and 1200 is 200 octets. In addition, a length of both of the data packets D11 and D12 which have been captured by the packet analysis device until now is 100 octets. Therefore, the packet analysis device estimates that, for example, "capture losses of two (=200/100) data packets have occurred."

This estimation is incorrect. Two data packets L11 and L12 which are erroneously estimated in this way are illustrated in FIG. 5.

In other words, the packet analysis device of the comparative example misjudges that "the data packets L11 and L12 would have been captured between the time points T12 and T14 without the occurrence of the capture losses." The packet analysis device does not have to estimate details (for example, a sequence number and a TCP data length of each packet) of the data packets L11 and L12, but the data packets L11 and L12 as in the following are illustrated as an example in FIG. 5:

(1) The data packet L11 of which a sequence number is 1001 and a TCP data length is 100; and (2) The data packet L12 of which a sequence number is 1101 and a TCP data length is 100.

Next, the packet analysis device captures the data packet D13 at the time point T15, and captures the data packet D14 at the time point T16. A sequence number of the data packet D13 is 1001 in the same manner as in the data packet L11. In addition, a sequence number of the data packet D14 is 1101 in the same manner as in the data packet L12. Therefore, the packet analysis device misjudges that "the data packets L11 and L12 have been retransmitted as the data packets D13 and D14, respectively."

Of course, the packet analysis device may simply judge that "both of the sequence numbers of the data packets D13 and D14 are included in the range indicated by the numerical values 1001 and 1200, and thus the data packets D13 and D14 are retransmission packets." However, in either case, the packet analysis device makes misjudgment.

The above-described misjudgment concerning capture losses or misjudgment concerning retransmission is one of the factors reducing analysis accuracy. There are various packet analysis algorithms, and, among them, there is an algorithm in which it is judged that "network losses have occurred" if retransmission of a data packet is detected. For example, the packet analysis device of the comparative example may make judgment as follows depending on a packet analysis algorithm:

(1) The data packets D13 and D14 with sequence numbers which are equal to or less than 1200 have been retransmitted after the ACK packet A14 indicating that "all data up to octets indicated by the numerical value 1200 had been successfully received by the host 22" was transmitted; and (2) The reason why the retransmission occurred is that the ACK packet A14 has been lost over the network after being captured by the packet analysis device before arriving at the host 21.

For example, as described above, in a case where a type of algorithm is used in which network losses are detected in response to detection of retransmission, misjudgment concerning retransmission as in FIG. 5 causes overestimation of the number of network losses. In addition, the overestimation of the number of network losses causes overestimation of the number of packets which are actually transmitted from a transmission side host over a connection, or overestimation of an amount of traffic which is actually transmitted from a transmission side host over a connection.

Therefore, the misjudgment concerning retransmission as in FIG. 5 causes deterioration in accuracy of an estimated value of a network loss rate or a traffic amount. As a result, for example, in a case where packet analysis is performed in order to monitor network quality, accuracy of an estimated value of the network quality also deteriorates. Therefore, in order to improve analysis accuracy of packet analysis, the misjudgment which may occur as in the comparative example of FIG. 5 is preferably avoided.

Meanwhile, there are various packet analysis algorithms. Among simple algorithms, there is also a type of algorithm in which traffic in a direction from the host 21 to the host 22 and traffic in a direction from the host 22 to the host 21 are observed and analyzed independently.

Here, with reference to FIG. 4, inversion of capture order has not occurred among the five data packets D11 to D15 which are transmitted from the host 21 to the host 22. In addition, inversion of capture order has not occurred between the two ACK packets A12 and A14 which are transmitted from the host 22 to the host 21.

Therefore, in a type of simple algorithm in which traffics in two directions are observed and analyzed independently, there is no influence of order inversion among the data packets and the ACK packets in the capture process. However, in such a simple algorithm, a network loss and a capture loss are not differentiated from each other, and even a behavior of the network is just roughly estimated.

For example, retransmission of a data packet may occur since an original data packet is lost over a network. Alternatively, retransmission of a data packet may occur since an ACK packet transmitted after successful reception of an original data packet in a host of a destination is lost over a network.

In addition, there are various specific triggers of retransmission. For example, if a host which is a transmission source of a data packet consecutively receives a predetermined number (for example, three) of ACK packets with the same ACK number, the host which is a transmission source retransmits a data packet including the ACK number as a sequence number in some cases. This is because, if a leading or a middle data packet among the plurality of consecutive data packets is lost over a network, a host on a reception side notifies of the same ACK number each time the host successfully receives subsequent data packets among a plurality of data packets. Therefore, the reception of duplicate acknowledgment packets may be a trigger of retransmission.

In addition, there are cases where, when an ACK packet has not been received yet even if time called retransmission timeout (RTO) has elapsed from transmission of a data packet, a host which is a transmission source retransmits a data packet.

Therefore, for example, if a behavior of a network regarding retransmission is to be more accurately estimated, it is preferable to take into consideration relevance between a traffic in a direction in which a data packet will be sent and a traffic in a direction in which an ACK packet will be sent. For example, in order to more accurately estimate a behavior of a network, it is preferable to take into consideration a relationship or the like between an ACK number and a sequence number. In other words, a simple algorithm of analyzing two directions independently is insufficient depending on a purpose of packet analysis.

On the other hand, there is concern that misjudgment as exemplified in FIG. 5 may be caused just by taking into consideration relevance between packets which flow in two directions opposite to each other. As described above, the misjudgment in FIG. 5 is not preferable.

Therefore, in order to obtain more accurate analysis result (in other words, in order to obtain an analysis result with higher reliability), as described with reference to FIG. 1, order inversion in a capture process is preferably detected. This is because misjudgment as in FIG. 5 is reduced by detecting order inversion in a capture process.

Figure 6:
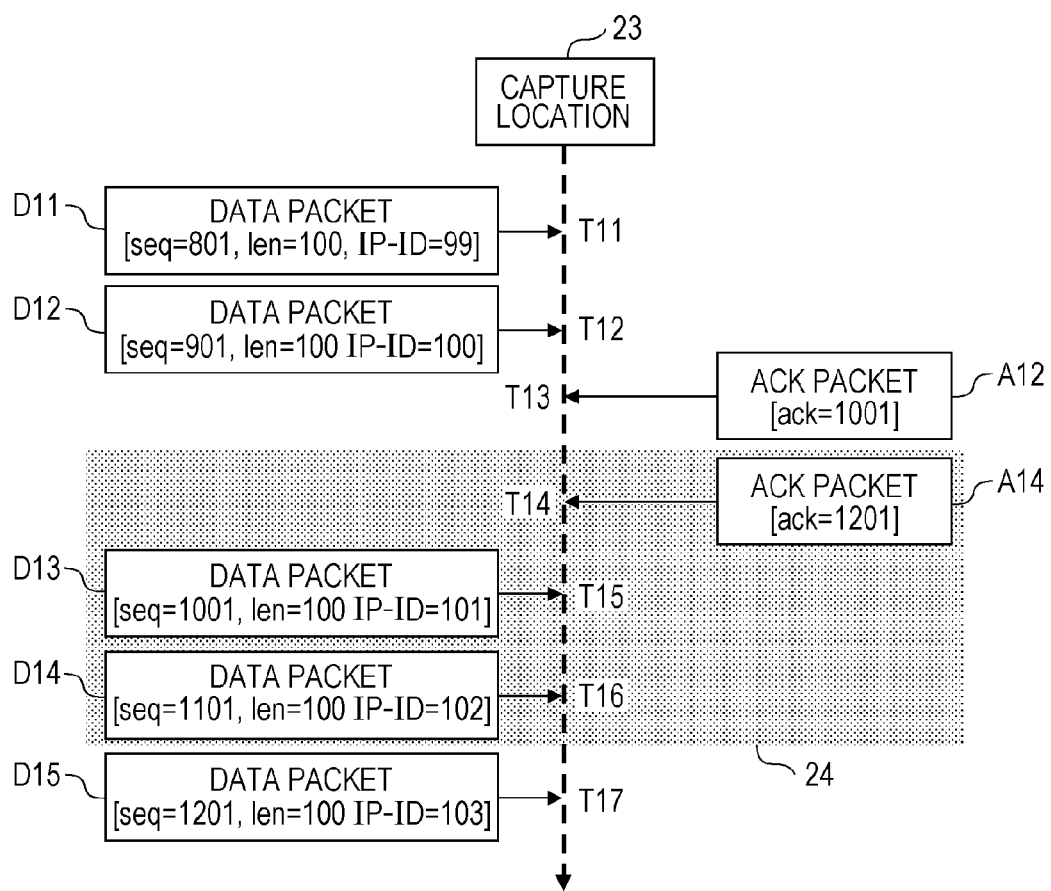
FIG. 6 is a diagram illustrating an example of avoiding misjudgment, according to an embodiment.

Specifically, in a case where seven packets are captured in order as in FIG. 4, in the present embodiment, order inversion in the capture process is detected such that misjudgment is avoided as in FIG. 6. In addition, for convenience of reference in FIG. 6, an ID in an IP header of the packet is indicated such as "IP-ID=99." Further, in the following description, the ID in the IP header of the packet is simply denoted by "IP-ID" in some cases.

In the present embodiment, a packet analysis device which captures a packet at the capture location 23 may be any one of the packet analysis device 3, the network monitoring device 17a, and the network monitoring device 17b, or may be a network monitoring device 40 described later. In relation to FIG. 6, for convenience of description, the packet analysis device 3 is assumed to capture a packet at the capture location 23.

The packet analysis device 3 captures the data packet D11 at the time point T11, captures the data packet D12 at the time point T12, and captures the ACK packet A12 at the time point T13. The packet analysis device 3 recognizes that "the data packets D11 and D12 captured at the time points T11 and T12 had been successfully received by the host 22" based on an ACK number of the captured ACK packet A12. In other words, the packet analysis device 3 recognizes that network losses of the data packets D11 and D12 do not occur. The above recognition is correct.

Next, the packet analysis device 3 captures the ACK packet A14 at the time point T14. An ACK number of the ACK packet A14 is 1201. Therefore, the packet analysis device 3 recognizes that "the host 22 has successfully received all data up to octets indicated by the numerical value 1200 over a connection (more specifically, over a data stream from the host 21 toward the host 22) between the hosts 21 and 22." This recognition is also correct.

However, a last data packet which is captured by the packet analysis device 3 before the time point T14 is the data packet D12. In addition, a sequence number of the data packet D12 is 901, and a TCP data length of the data packet D12 is 100. In other words, the packet analysis device 3 just captures only data up to octets indicated by the numerical value 1000 (=901+100−1) over the data stream from the host 21 toward the host 22.

In other words, as a result of capturing the ACK packet A14 at the time point T14, the packet analysis device 3 recognizes that "the ACK packet A14 for one or more uncaptured data packets has been captured." In a case where an ACK packet for one or more uncaptured data packets is captured, as can be seen from FIG. 1, there is a possibility of the occurrence of capture losses and a possibility of the occurrence of order inversion in a capture process.

Therefore, when the packet analysis device 3 further captures the data packet D13 at the time point T15 after capturing the ACK packet A14, the ACK number of the ACK packet A14 is compared with the sequence number of the data packet D13.

If the sequence number of the data packet D13 is equal to or more than the ACK number of the ACK packet A14, the packet analysis device 3 judges that "a data packet subsequent to a data packet of which a notification of reception was sent by the ACK packet A14 has been captured." The subsequent data packet may be actually captured as above depending on a condition such as a window size.

Conversely, if the sequence number of the data packet D13 is smaller than the ACK number of the ACK packet A14, there is a possibility that retransmission has occurred or a possibility that order inversion in a capture process has occurred. In the example of FIG. 6, the sequence number of the data packet D13 is 1001, and the ACK number of the ACK packet A12 is 1201. In other words, in the example of FIG. 6, the data packet D13 is earlier in the order over the connection than a data packet which is expected to be received next by the host 22.

Therefore, when the packet analysis device 3 captures the data packet D13 after the ACK packet A14, the packet analysis device performs a process for discriminating a possibility that retransmission has occurred from a possibility that order inversion in the capture process has occurred. Specifically, the packet analysis device 3 calculates a difference between an IP-ID of the data packet D13 and an IP-ID of the data packet D12 which was captured last among data packets captured by the packet analysis device 3 before the ACK packet A14.

In the example of FIG. 6, IP-IDs of the data packets D11, D12, D13, D14 and D15 are respectively 99, 100, 101, 102 and 103. Therefore, a difference between the IP-ID of the data packet D13 captured at the time point T15 and the IP-ID of the data packet D12 captured at the time point T12 is 1 (=101−100).

The packet analysis device 3 judges "whether or not the data packet D13 captured at the time point T15 is a data packet which is a target of which a notification of reception in the host 22 is sent by the ACK packet A14 " on the basis of the difference calculated in this way. In other words, the packet analysis device 3 judges "whether or not the data packet D13 captured at the time point T15 is a data packet which is captured later than the ACK packet A14 due to order inversion in the capture process" on the basis of the calculated difference.

As can be seen from the description concerning FIG. 1, as a difference between the IP-IDs is larger, a probability that the data packet D13 may be a retransmitted data packet is higher. Therefore, specifically, the packet analysis device 3 compares the calculated IP-ID difference with a threshold value. The threshold value is, specifically, the number of capture losses which is estimated in a case where retransmission is assumed to have occurred. This threshold value may be determined, for example, in the following way.

Before the time point T14, the packet analysis device 3 captures only data up to octets indicated by the numerical value 1000 (=901+100−1) over the data stream from the host 21 toward the host 22. However, the ACK number of the ACK packet A14 is 1201. In other words, 200 octets in a range indicated by the numerical values 1001 and 1200 are not captured at the time point T14.

In addition, the packet analysis device 3 is in a state of completing capture of two data packets (that is, the data packets D11 and D12) up to the time point T14. A maximum value of the TCP data length of the two data packets is 100.

Therefore, the packet analysis device 3 estimates that the number of data packets used to transmit the uncaptured 200 (=1201−(901+100)) octets at the time point T14 is at least two (=ceil(200/100)). In other words, the packet analysis device 3 estimates the number of capture losses which is estimated in a case where retransmission is assumed to have occurred, as two. In addition, ceil(x) is an integer which is equal to or more than the argument x and is the closest to the argument x.

If the data packet D13 captured at the time point T15 is really a retransmitted data packet, a difference between the IP-IDs of the data packets D13 and D12 calculated as above is expected to be larger than an estimated value of the number of capture losses. This is because, if the data packet D13 is really a retransmitted data packet, it is expected that capture losses of at least two data packets have occurred. The host 21 consumes two IP-IDs for use in the two data packets. Therefore, if the data packet D13 is really a retransmitted data packet, an IP-ID difference calculated as above is expected to be larger than 2.

In addition, the reason why the term "expected" in the above paragraph is used is that not an actual number of capture losses but an estimated value of the number of capture losses is used as a threshold value. If an estimated value of the number of capture losses is correct, the expectation is also correct. In addition, as described with reference to FIG. 1, a minimum value which can be estimated as the number of capture losses is used as a threshold value in the example of FIG. 6 in order to reduce side effects. In other words, (for example, not an arithmetic average value of the TCP data lengths but) a maximum value of the TCP data lengths is used in calculating an estimated value of the number of capture losses in order to reduce side effects.

In the example of FIG. 6, as described above, an estimated value of the number of capture losses is 2, and this value 2 is used as a threshold value. In addition, in the example of FIG. 6, as described above, a difference between the IP-IDs is 1. Since 1≤2, the packet analysis device 3 judges that "the data packet D13 is a data packet which is captured later than the ACK packet A14 due to order inversion in the capture process." In other words, the packet analysis device 3 judges that "the data packet D13 is not a retransmitted data packet."

The packet analysis device 3 further captures the data packet D14 at the subsequent time point T16. A sequence number of the data packet D14 is 1101, an ACK number of the ACK packet A14 is 1201, and 1101 is smaller than 1201. Therefore, also at the time of capture of the data packet D14 at the time point T16, the packet analysis device 3 performs a process for discriminating a possibility that retransmission has occurred from a possibility that order inversion has occurred.

Also in this case, the packet analysis device 3 judges that "the data packet D14 is a data packet which is captured later than the ACK packet A14 due to order inversion in the capture process." For example, the packet analysis device 3 may make the judgment on the basis of the following two matters:

(1) Order inversion has already been detected due to the capture of the data packet D13 at the time point T15; and (2) The sequence number of the data packet D14 is included in the above-described uncaptured octet range.

In addition, a difference between the IP-ID of the data packet D14 captured at the time point T16 and the IP-ID of the data packet D12 captured last among the data packets captured before the ACK packet A14 is 2 (=102-100). Therefore, since the difference between the IP-IDs is 2, and the threshold value is also 2, the difference between the IP-IDs is equal to or less than the threshold value. The packet analysis device 3 may judge that "the data packet D14 is a data packet which is captured later than the ACK packet A14 due to order inversion in the capture process" on the basis of comparison with the above-described threshold value in relation to the data packet D14 as well.

As can be seen from the specific example of FIG. 6 described above, according to the present embodiment, order inversion in the capture process is detected with satisfactory reliability, and thus misjudgment concerning retransmission is reduced. As a result, according to the present embodiment, accuracy of packet analysis (for example, analysis for monitoring network quality) is improved.

Figure 7:
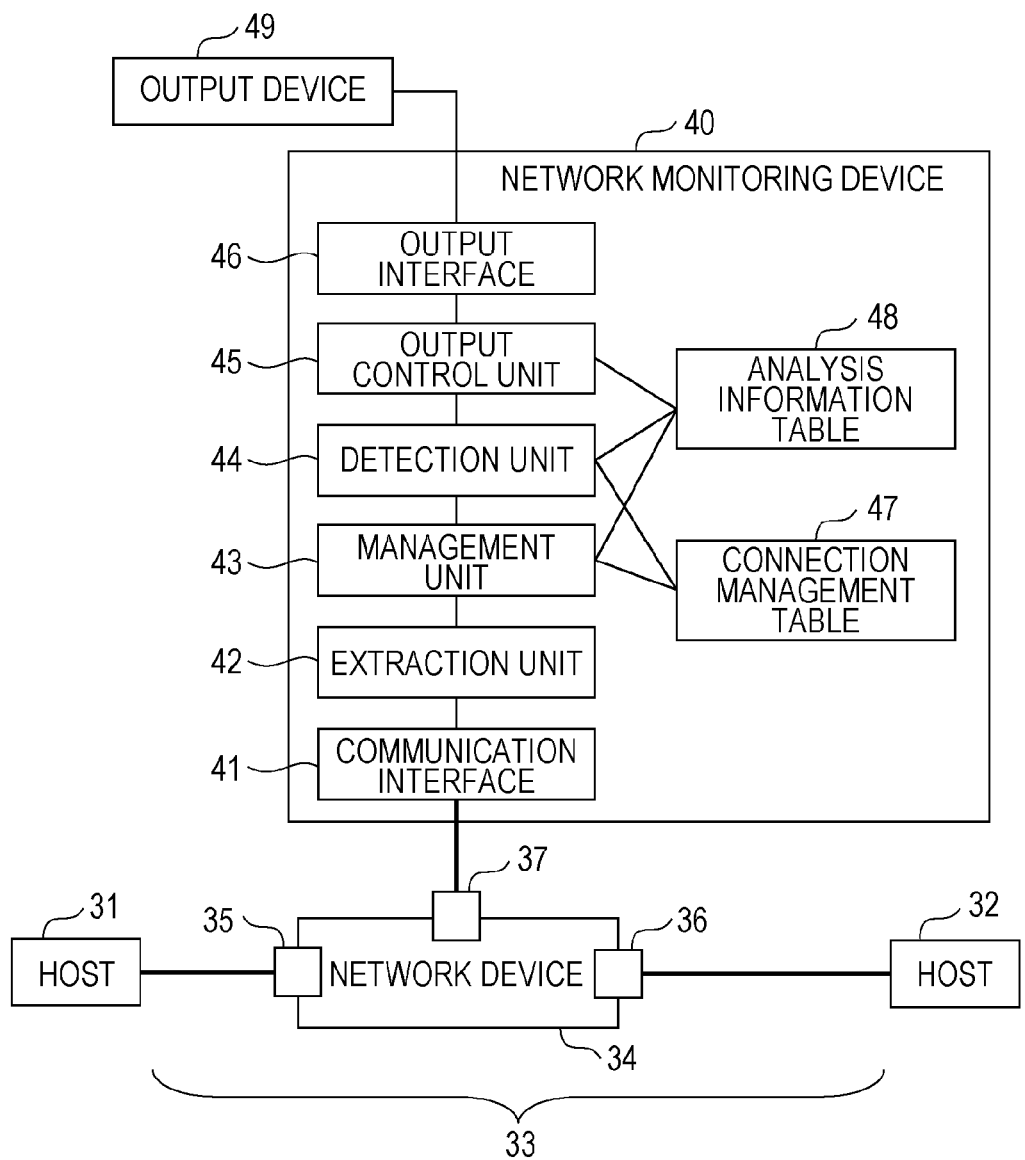
FIG. 7 is a diagram illustrating an example of a system configuration, according to an embodiment.

Successively, details of a device detecting order inversion as described with reference to FIGS. 1 to 6 will be described with reference to FIG. 7. FIG. 7 is a diagram illustrating an example of a system configuration, according to an embodiment. FIG. 7 exemplifies hosts 31 and 32. Both of the hosts 31 and 32 are computers. The hosts 31 and 32 are connected to each other via a network 33. A network device 34 is provided over the network 33. The network device 34 may be a switch or a router having a port mirroring function, or may be a network tap. The network device 34 has at least three ports 35 to 37.

The host 31 is the same as the host 21 of FIG. 2, and the host 32 is the same as the host 22 of FIG. 2. In addition, the network device 34 is the same as the network device 13a of FIG. 2. In other words, the ports 35, 36 and 37 are the same as ports 14a, 15a and 16a of FIG. 2, respectively. Therefore, detailed description of the host 31, the host 32, and the network device 34 will be omitted.

In addition, from another viewpoint, the host 31 corresponds to the first device 1 of FIG. 1, the host 32 corresponds to the second device 2, the port 35 corresponds to the passing point 4, and the port 36 corresponds to the passing point 5.

A network monitoring device 40 is connected to the port 37. The network monitoring device 40 corresponds to the packet analysis device 3 of FIG. 1, and also corresponds to the network monitoring device 17a of FIG. 2.

The network monitoring device 40 includes a communication interface 41, an extraction unit 42, a management unit 43, a detection unit 44, an output control unit 45, an output interface 46, a connection management table 47, and an analysis information table 48. In addition, the network monitoring device 40 is connected to an output device 49 externally provided via the output interface 46. Of course, the network monitoring device 40 may have the output device 49 built therein.

Specifically, the communication interface 41 is connected to the port 37 of the network device 34. The communication interface 41 receives a packet via the port 37. In addition, in the example of FIG. 7, a packet which is transmitted from the host 31 to the host 32 and a packet which is transmitted from the host 32 to the host 31 are aggregated at the inside of the network device 34 so as to be output from the port 37. The aggregation at the inside of the network device 34 is the same as the aggregation at the inside of the network device 13a of FIG. 2.

On the other hand, as can be seen from the example of the network device 13b and the network monitoring device 17b of FIG. 2, packets may be aggregated not at the inside of the network device 13b but at the inside of the network monitoring device 17b. In other words, there may be a configuration in which packets are aggregated at the inside of the network monitoring device 40 of FIG. 7. Specifically, the network monitoring device 40 may have two communication interfaces 41 receiving packets from two ports of the network device and a common buffer storing the packets received by the two communication interfaces 41. The common buffer is the same as the buffer 18 of FIG. 2.

Here, the extraction unit 42 extracts header information from a packet received by the communication interface 41. Specifically, the extraction unit 42 extracts values of the following respective fields:

(1) An IHL, a total length, an ID, a transmission source IP address, and a transmission destination IP address of an IP header; and (2) A transmission source port number, a transmission destination port number, a sequence number, an ACK number, an ACK flag, a SYN flag, and a FIN flag of a TCP header.

The extraction unit 42 outputs the extracted header information to the management unit 43.

The management unit 43 manages information regarding a connection. In the present embodiment, the information regarding a connection is stored in the connection management table 47. In other words, the management unit 43 updates the connection management table 47 on the basis of the header information output from the extraction unit 42. Details of the connection management table 47 will be described later with reference to FIG. 9.

The detection unit 44 detects order inversion in a capture process. Specifically, the detection unit 44 performs a process for discriminating a case where a capture loss and retransmission occur from a case where order inversion occurs. The detection unit 44 performs the process by using the connection management table 47 and the header information extracted by the extraction unit 42.

In addition, the detection unit 44 appropriately updates the analysis information table 48 in accordance with a process result. Details of the analysis information table 48 will be described later with reference to FIG. 10.

In addition, the extraction unit 42 may output header information to the detection unit 44 as well as the management unit 43. Alternatively, the management unit 43 may output header information received from the extraction unit 42 to the detection unit 44. Detailed operations of the management unit 43 and the detection unit 44 will be described later with reference to flowcharts of FIGS. 11 to 14.

The output control unit 45 acquires information from the analysis information table 48. In addition, the output control unit 45 performs a process for outputting a result of packet analysis to the output device 49, based on the acquired information. The output to the output device 49 may be performed, for example, in accordance with a predefined schedule, or may be performed in response to a command which is given to the network monitoring device 40 from a user via an input device not illustrated in FIG. 7.

Any format for representing a result of packet analysis may be used according to an embodiment. For example, information itself of the analysis information table 48 may be included in a result of packet analysis. In addition, the output control unit 45 may perform an appropriate calculation on the basis of information acquired from the analysis information table 48, and may include the calculation result in a result of packet analysis. In either case, the output control unit 45 controls the output interface 46, thereby outputting a result of packet analysis to the output device 49.

The output interface 46 is an interface between the network monitoring device 40 and the output device 49.

For example, in a case where the network monitoring device 40 is a computer, and the output device 49 is a display, the output interface 46 may be implemented by a connection interface circuit between the computer and the display, a video random access memory (VRAM) for the display, and a display driver.

The output device 49 may be another computer (for example, a computer connected to the network monitoring device 40 via a network different from the network 33) which is different from the network monitoring device 40. In this case, the output interface 46 may be implemented by a wireless local area network (LAN) interface circuit or a wired LAN interface circuit.

Figure 8:
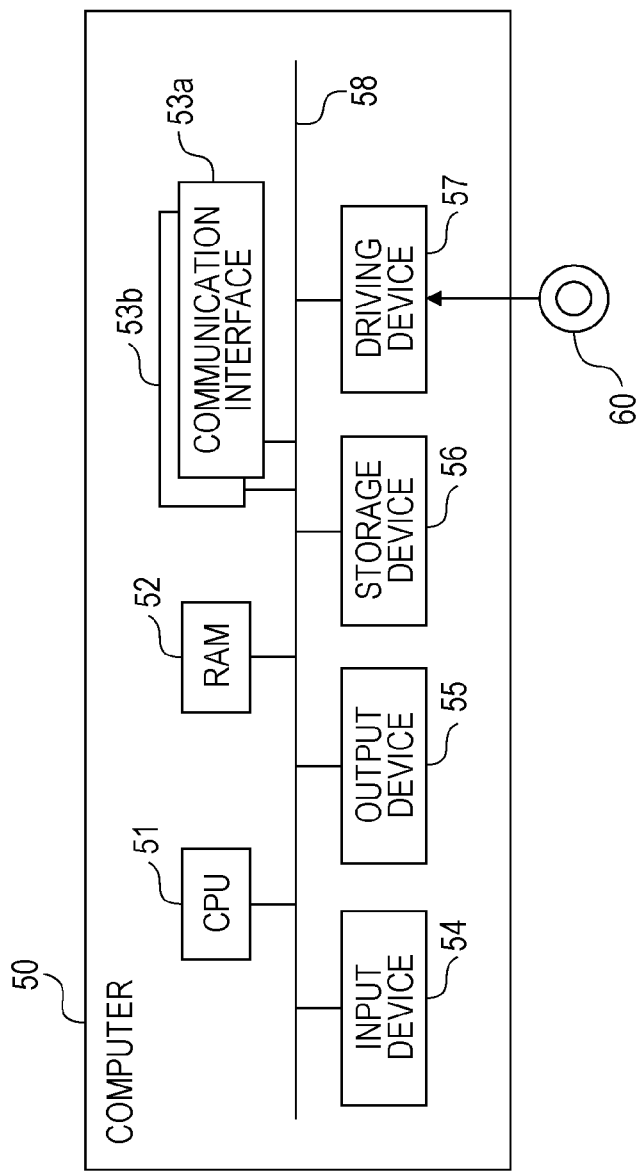
FIG. 8 is a diagram illustrating an example of a hardware configuration of a computer, according to an embodiment.

FIG. 8 is a diagram illustrating an example of a hardware configuration of a computer, according to an embodiment. The packet analysis device 3 of FIG. 1, the network monitoring devices 17*a* and 17*b* of FIG. 2, and the network monitoring device 40 of FIG. 7 may all be a computer 50 as illustrated in FIG. 8.

The computer 50 includes a central processing unit (CPU) 51, a random access memory (RAM) 52, and one or more communication interfaces. FIG. 8 illustrates two communication interfaces 53*a* and 53*b* as an example. The computer 50 further includes an input device 54, an output device 55, a storage device 56, and a driving device 57 of a computer readable storage medium 60. The components of the computer 50 are connected to each other via a bus 58.

The CPU 51 is an example of a single-core or a multi-core processor. The computer 50 may have a plurality of processors. The CPU 51 loads a program to the RAM 52, and executes the program while using the RAM 52 as a work area. In a case where the computer 50 is the network monitoring device 17*b*, the RAM 52 is further used as the buffer 18.

Each of the communication interfaces 53*a* and 53*b* may be a wireless LAN interface, and, more preferably, may be a wired LAN interface in order to capture a packet more reliability. The computer 50 is connected to the network device 13*a*, 13*b* or 37 via one or more communication interfaces.

For example, in a case where the computer 50 is the network monitoring device 17*a*, the computer 50 is connected to the port 16*a* of the network device 13*a* via the communication interface 53*a* and a cable.

In a case where the computer 50 is the network monitoring device 17*b*, the computer 50 is connected to the network device 13*b* via the communication interfaces 53*a* and 53*b*. Specifically, the communication interface 53*a* is connected to the port 16*b* via a cable, and the communication interface 53*b* is connected to the port 16*c* via another cable.

In a case where the computer 50 is the network monitoring device 40, the computer 50 is connected to the port 37 of the network device 34 via the communication interface 53*a* and a cable.

Each communication interface may be, specifically, an externally attached network interface card (NIC), or may be an on-board type network interface controller. Each communication interface may include a physical network port, a circuit called a "PHY chip" performing a process of a physical layer, and a circuit called a "MAC chip" performing a process of a media access control (MAC) sub-layer.

In addition, the computer 50 may be connected to the network device 13*a*, 13*b* or 34 and may be further connected to other network devices (for example, switches or routers) in order to capture a packet. The computer 50 may include a communication interface (for example, a wireless LAN interface, a wired LAN interface, or a combination thereof) for such connection. In this case, the computer 50 can download an appropriate program from an appropriate network. The downloaded program may be executed by the CPU 51.

The input device 54 is, for example, a keyboard, a pointing device, or a combination thereof. The pointing device may be, for example, a mouse, a touch pad, or a touch screen.

The output device 55 is a display, a speaker, or a combination thereof. The display may be a touch screen. In addition, in FIG. 7, the output device 49 is drawn outside the network monitoring device 40, but the network monitoring device 40 may have the output device 49 built therein. Conversely, in FIG. 8, the input device 54 and the output device 55 are illustrated inside the computer 50, but the input device 54 and the output device 55 may be located outside the computer 50 and may be connected to the computer 50.

The storage device 56 is, specifically, one or more nonvolatile storage devices. The storage device 56 may be, for example, a hard disk drive (HDD), a solid-state drive (SSD), or a combination thereof. Further, a read only memory (ROM) may be included as the storage device 56.

Examples of the storage medium 60 include an optical disc such as a compact disc (CD) or a digital versatile disc (DVD), a magneto-optical disc, a magnetic disk, a semiconductor memory card such as a flash memory, and the like. The driving device 57 of the storage medium 60 may be located outside the computer 50 and may be connected to the computer 50.

A program executed by the CPU 51 may be installed in the storage device 56 in advance. Alternatively, a program may be stored on the storage medium 60 so as to be provided, read from the storage medium 60 by the driving device 57, copied to the storage device 56, and then loaded to the RAM 52. Alternatively, a program may be downloaded as described above. In addition, the RAM 52, the storage device 56, and the storage medium 60 are all of computer readable type, that is, tangible media, and are not transitory media such as a signal carrier wave.

Here, in a case where the network monitoring device 40 of FIG. 7 is implemented by the computer 50 of FIG. 8, the communication interface 41 may be the communication interface 53a. In addition, in this case, the extraction unit 42, the management unit 43, the detection unit 44, and the output control unit 45 may be implemented by the CPU 51 which executes a program. The connection management table 47 and the analysis information table 48 may be stored in the RAM 52, or may be stored in the storage device 56. Further, examples of hardware which implements the output interface 46 are the same as described with reference to FIG. 7.

Here, FIG. 9 is a diagram illustrating an example of a connection management table, according to an embodiment. FIG. 9 exemplifies an example of a connection management table 47 of FIG. 7 and a change in content of an entry of the connection management table 47. Each entry of the connection management table 47 corresponds to each "sub-connection" as described below.

For example, a data stream in a first direction from the host 31 toward the host 32 and a data stream in a second direction from the host 32 toward the host 31 flow over a single connection between the hosts 31 and 32. For convenience, the management unit 43 manages a single connection between the hosts 31 and 32 which is divided into a sub-connection in the first direction and a sub-connection in the second direction.

The sub-connection in the first direction is, in other words, a sub-connection for a data stream in the first direction. Here, an ACK packet for a data packet which flows in the first direction flows in the second direction. Therefore, for convenience of description, hereinafter, the first direction in the sub-connection in the first direction is referred to as a "data direction", and the second direction in the sub-connection in the first direction is referred to as an "ACK direction".

In addition, the sub-connection in the second direction is, in other words, a sub-connection for a data stream in the second direction. Here, an ACK packet for a data packet which flows in the second direction flows in the first direction. Therefore, in the sub-connection in the second direction, the second direction is a "data direction", and the first direction is an "ACK direction".

In addition, a plurality of connections may be established between the hosts 31 and 32. Different connections can be identified using different port numbers.

Each entry of the connection management table 47 corresponds to a single sub-connection. In other words, a pair of two entries corresponds to a single connection. In FIG. 9, the name of each field is abbreviated due to limitation on the paper width and each entry has the following fields:

(1) A "connection ID" field (indicated by "Conn. ID" in FIG. 9) indicating identification information for identifying a sub-connection of a corresponding entry;

(2) A "transmission source IP address" field (indicated by "Src. IP Addr." In FIG. 9) indicating an IP address of a transmission side host in the data direction in a sub-connection of a corresponding entry;

(3) A "transmission source port number" field (indicated by "Src. Port" in FIG. 9) indicating a port number of a transmission side host in the data direction in the sub-connection of the corresponding entry;

(4) A "transmission destination IP address" field (indicated by "Dst. IP Addr." In FIG. 9) indicating an IP address of a reception side host in a data direction in the sub-connection of the corresponding entry;

(5) A "transmission destination port number" field (indicated by "Dst. Port" In FIG. 9) indicating a port number of a reception side host in the data direction in the sub-connection of the corresponding entry;

(6) A "maximum sequence number" field (indicated by "Max. Seq." in FIG. 9) indicating a maximum sequence number among data packets which have been transmitted and captured until now in the data direction in the sub-connection of the corresponding entry;

(7) An "ACK expected value" field (indicated by "Exp. Ack." In FIG. 9) indicating a minimum value which is expected as an ACK number of an ACK packet which is sent next in the ACK direction of the sub-connection of the corresponding entry;

(8) A "maximum ACK number" field (indicated by "Max. Ack." in FIG. 9) indicating a maximum ACK number among ACK packets which have been transmitted and captured until now in the ACK direction in the sub-connection of the corresponding entry;

(9) A "maximum length" field (indicated by "Max. Len." in FIG. 9) indicating a maximum TCP data length among data packets which have been transmitted and captured until now in the data direction in the sub-connection of the corresponding entry;

(10) A "provisional capture loss range" field (indicated by "Prov. Loss" in FIG. 9) indicating a range of octets for which there is provisionally judged a possibility of capture failure among octets of a data stream flowing over the sub-connection of the corresponding entry;

(11) An "inversion range" field (indicated by "Inv. Range" in FIG. 9) indicating a range in which inversion of capture order occurs between data packets and ACK packets which are respectively transmitted in the data direction and the ACK direction over the sub-connection of the corresponding entry; and

(12) An "IP-ID" field (indicated by "IP-ID" in FIG. 9) indicating an ID in an IP header of a data packet which is captured latest in the data direction in the sub-connection of the corresponding entry.

For example, it is assumed that an ID address of the host 31 is "10.25.1.3", and an IP address of the host 32 is "10.25.1.200." In addition, it is assumed that a connection is established between port 1501 of the host 31 and port 20 of the host 32. The first entry of the connection management table 47 of FIG. 9 corresponds to a sub-connection in a direction from the host 31 to the host 32 of the two sub-connections of the connection as described above. In addition, the second entry corresponds to a sub-connection in the opposite direction (a direction from the host 32 to the host 31).

A connection ID of the sub-connection corresponding to the first entry is "1-1" according to FIG. 9. In addition, a connection ID of the sub-connection corresponding to the second entry is "1-2" according to FIG. 9.

Here, a plurality of connections may be established between the host 31 and the host 32. In other words, the host 31 may use ports other than port 1501 and/or the host 32 may use ports other than port 20, thereby establishing other connections between the hosts 31 and 32. The connection management table 47 has two entries corresponding to two sub-connections of a corresponding connection for each connection between the hosts 31 and 32.

In addition, only three ports of the network device 34 are illustrated in FIG. 7, but the network device 34 may have more ports. Each port (not illustrated) of the network device 34 may be directly or indirectly connected to a host (not illustrated). In addition, the following packets may be output to the network monitoring device 40 via the port 37. In other words, the network monitoring device 40 may capture the following packets:

(1) Packets which are transmitted and received over a connection between two hosts (not illustrated) connected to two ports (not illustrated) of the network device 34;

(2) Packets which are transmitted and received over a connection between a single host (not illustrated) connected to a single port (not illustrated) of the network device 34 and the host 31; and (3) Packets which are transmitted and received over a connection between a single host (not illustrated) connected to a single port (not illustrated) of the network device 34 and the host 32.

For example, a host of which an IP address is "10.25.1.16" and a host of which an IP address is "10.25.1.210" may be further connected to the network device 34. In addition, a connection may be established between port 300 of the former host and port 45 of the latter host. The third entry of the connection management table 47 of FIG. 9 corresponds to a sub-connection in a direction from the former host to the latter host, of two sub-connections of the connection as described above. In addition, the fourth entry corresponds to a sub-connection in an opposite direction.

A connection ID of the sub-connection corresponding to the third entry is "2-1" according to FIG. 9. In addition, a connection ID of the sub-connection corresponding to the fourth entry is "2-2" according to FIG. 9.

In addition, in FIG. 9, the connection management table 47 which is updated in response to reception of packets at the respective time points T12 to T16 illustrated in FIGS. 4 and 6 is exemplified as connection management tables 47*a* to 47*e*. Specifically, FIG. 9 exemplifies changes of the entry with the connection ID of "1-1." Specific examples of the connection management tables 47*a* to 47*e* will be described later with reference to flowcharts of FIGS. 11 to 14.

Figure 10:
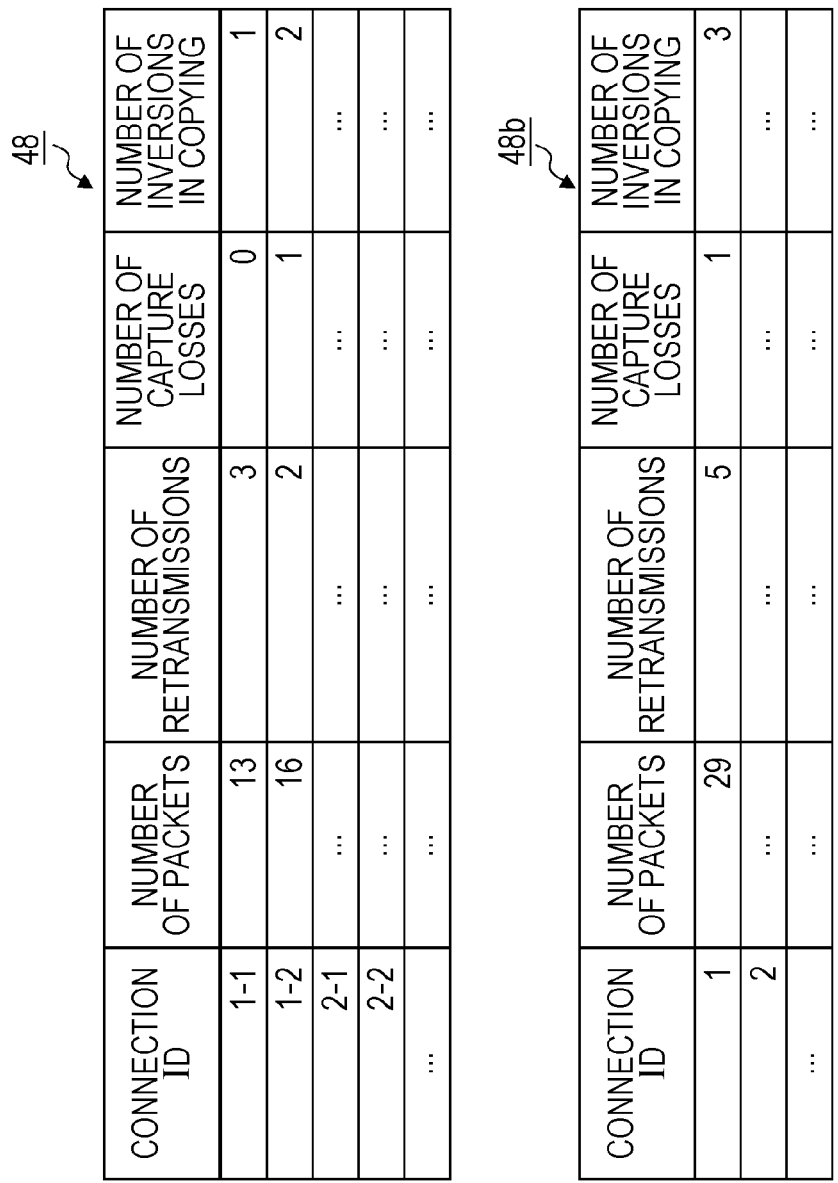
FIG. 10 is a diagram illustrating an example of an analysis information table, according to an embodiment.
Figure 11:
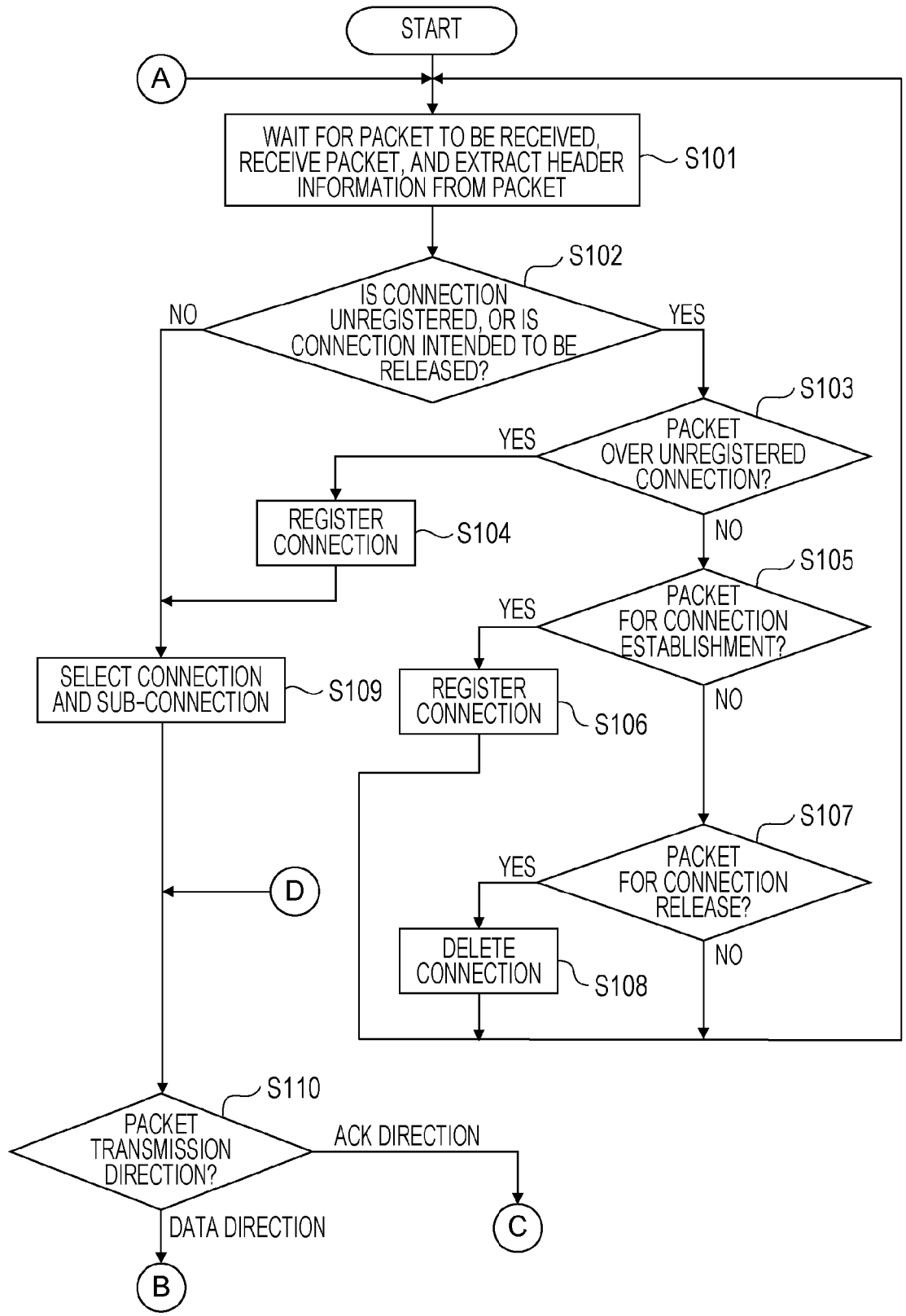
FIG. 11 is a diagram illustrating an example of an operational flowchart (first) for processes performed by a network monitoring device, according to an embodiment.

Meanwhile, FIG. 10 is a diagram illustrating an example of an analysis information table, according to an embodiment. FIG. 10 illustrates the analysis information table 48 of FIG. 7 as an example. Each entry of the analysis information table 48 also corresponds to a single sub-connection. Each entry of the analysis information table 48 has the following fields:

(1) A "connection ID" field indicating identification information for identifying a sub-connection of a corresponding entry;

(2) A "number of packets" field indicating the number of data packets which are estimated to have been transmitted until now in the data direction in the sub-connection of the corresponding entry;

(3) A "number of retransmissions" field indicating the number of data packets which are estimated to have been retransmitted until now in the data direction in the sub-connection of the corresponding entry;

(4) A "number of capture losses" field indicating the number of capture losses which are estimated to have occurred until now with regard to data packets which flow in the data direction over the sub-connection of the corresponding entry; and (5) A "number of inversions in copying" field indicating the number of inversions of capture order which are estimated to have occurred until now between data packets and ACK packets which are respectively transmitted in the data direction and the ACK direction over the sub-connection of the corresponding entry.

For example, according to FIG. 10, the first entry regarding a sub-connection identified by the connection ID "1-1" represents the following:

(1) It is estimated that thirteen data packets have been transmitted in the data direction until now over the sub-connection;

(2) It is estimated that three retransmissions of data packets have occurred until now over the sub-connection;

(3) It is estimated that no capture losses have occurred until now with regard to data packets which flow in the data direction over the sub-connection; and (4) It is estimated that one inversion of capture order has occurred until now between data packets and ACK packets transmitted over the sub-connection.

In addition, the network monitoring device 40 may have an analysis information table 48*b* including an entry for each connection instead of the above-described analysis information table 48 having an entry for each sub-connection. A single entry in the analysis information table 48*b* is obtained by aggregating two entries of the analysis information table 48 corresponding to two sub-connections forming a pair. A form of the analysis information table 48*b* is the same as the form of the analysis information table 48.

For example, in the analysis information table 48, two entries with the connection IDs "1-1" and "1-2" correspond to two sub-connections. A connection including the two sub-connections is identified by a connection ID "1" in the analysis information table 48*b*.

For example, a sum of the number of inversions in copying of two entries with the connection IDs "1-1" and "1-2" in the analysis information table 48 is 3 (=1+2). This numerical value 3 is stored as the number of inversions in copying of an entry with a connection ID "1" in the analysis information table 48*b*. Also in the same manner for the other fields, values of two entries forming a pair in the analysis information table 48 are aggregated as a single entry of the analysis information table 48*b*.

Next, processes performed by the network monitoring device 40 of FIG. 7 will be described with reference to the operational flowcharts of FIGS. 11 to 14. When the communication interface 41 is connected to the port 37 of the network device 34, and the network monitoring device 40 is powered on, the network monitoring device 40 becomes able to start processes in FIGS. 11 to 14. In addition, in the following, each step of FIGS. 11 to 14 will be described first, and, then, relationships between the specific examples illustrated in FIGS. 6 and 9 and the processes in FIGS. 11 to 14 will be described.

In step S101, the network monitoring device 40 waits until the communication interface 41 receives (that is, captures) a packet output from the port 37. In addition, hereinafter, for convenience of description, the packet received by the communication interface 41 in step S101 is also referred to as a "target packet."

When the communication interface 41 receives (that is, captures) the packet, the extraction unit 42 extracts header information from the received packet, and outputs the extracted header information. The header information includes, specifically, values of the following respective fields:

(1) An IHL, a total length, an ID, a transmission source IP address, and a transmission destination IP address of an IP header; and (2) A transmission source port number, a transmission destination port number, a sequence number, an ACK number, an ACK flag, a SYN flag, and a FIN flag of a TCP header.

Here, of course, the extraction unit 42 may further include values of other fields in an IP header and a TCP header, in the header information.

"Over which connection the target packet flows and is captured" may be identified by a combination of the transmission source IP address, the transmission source port number, the transmission destination IP address, and the transmission destination port number, extracted in this way.

In addition, in a case where a buffer in the communication interface 41 is overflowed, or the like, there may be a case where a packet is output from the port 37, but the communication interface 41 fails to receive (that is, capture) the packet. As above, in a case where capture losses occur in the communication interface 41, a packet is not normally received. Therefore, in a case where capture losses occur in the communication interface 41, the network monitoring device 40 waits in step S101 until another packet is successfully captured next by the communication interface 41.

Next, in step S102, the management unit 43 judges, based on the extracted header information, whether or not either of the following two conditions holds true:

(1) Information regarding the connection used for transmission of the target packet has not yet been registered in the connection management table 47; and (2) The target packet is a packet for releasing (that is, closing) the connection.

Specifically, the management unit 43 searches the connection management table 47 for two entries corresponding to the connection used for transmission of the target packet. As a search keyword, information (that is, the transmission source IP address, the transmission source port number, the transmission destination IP address, and the transmission destination port number of the target packet) for identifying the connection used for transmission of the target packet is used.

When two entries corresponding to the connection used for transmission of the target packet are found as a result of the search, it is determined that the information regarding the connection used for transmission of the target packet has been registered in the connection management table 47. Conversely, when entries are not found, it is determined that the information regarding the connection used for transmission of the target packet has not yet been registered in the connection management table 47.

In addition, the management unit 43 judges that "the target packet is a packet for releasing the connection" when a value of the FIN flag of the target packet is 1. Further, the management unit 43 judges that "the target packet is a packet for releasing the connection", also in a case where an ACK packet for a formerly captured FIN packet is captured in this step S101.

For example, a field indicating a state regarding establishment and release of a connection may be further included in the connection management table 47. The management unit 43 may judge "whether or not an ACK packet for a formerly captured FIN packet is captured in this step S101" by referring to the field. Of course, instead of the field of the connection management table 47, a temporary storage region may be used which stores information regarding a connection which is about to be newly established and information regarding an established connection which is about to be released.

In a case where either of the above-described two conditions holds true, an entry may be added to the connection management table 47 or may be deleted from the connection management table 47. Therefore, in a case where either of the conditions holds true, the management unit 43 makes judgment in step S103 next after step S102.

Conversely, a case where neither of the two conditions holds true is a case where a packet flowing over a connection corresponding to two existing entries registered in the connection management table 47 is captured this time. Therefore, in a case where neither of the two conditions holds true, the detection unit 44 performs processes in step S109 and subsequent steps.

Meanwhile, in step S103, the management unit 43 judges "whether or not the target packet is a normal packet (for example, a data packet, an ACK packet for a data packet, or the like) which flows over a connection which is not registered in the connection management table 47."

For example, there may be a case where a connection is established between the hosts 31 and 32, and then the network monitoring device 40 is connected to the port 37 such that the network monitoring device 40 starts the processes in FIGS. 11 to 14. In this case, the network monitoring device 40 may capture a normal packet before capturing a packet for connection establishment such as a SYN packet.

Specifically, in a case where it is judged that "the information regarding the connection used for transmission of the target packet is not registered in the connection management table 47" in step S102, the management unit 43 refers to the SYN flag of the target packet in step S103. When a value of the SYN flag is 1, the management unit 43 judges that "the target packet is not a normal packet." In addition, even if a value of the SYN flag of the target packet is 0, the management unit 43 judges that "the target packet is not a normal packet" in a case where the target packet is an ACK packet for a formerly captured SYN/ACK packet.

For example, as described above, a field (not illustrated) indicating a state regarding establishment and release of a connection may be included in the connection management table 47. The management unit 43 may judge "whether or not the target packet is an ACK packet for a formerly captured SYN/ACK packet" by referring to the field (or the above-described temporary storage region).

As a result of the above-described process, in a case where the management unit 43 judges that the target packet is "a normal packet flowing over the connection which is not registered in the connection management table 47", next, the management unit 43 performs a process in step S104.

Conversely, in a case where the management unit 43 judges that the target packet is "not a normal packet flowing over the connection which is not registered in the connection management table 47", next, the management unit 43 performs a process in step S105. In addition, also in a case where the management unit 43 judges that "the target packet is a packet for releasing the connection" in step S102, the management unit 43 performs the process in step S105 next after step S103.

In step S104, the management unit 43 registers information regarding the unregistered connection used for transmission of the target packet in the connection management table 47. Specifically, the management unit 43 issues two new connection IDs corresponding to two sub-connections of the unregistered connection used for transmission of the target packet. In addition, the management unit 43 adds two new entries corresponding to the two sub-connections to the connection management table 47. The management unit 43 sets the above-described issued values in the two respective new entries as connection IDs.

In addition, the management unit 43 sets the values extracted from the target packet in fields of a transmission source IP address, a transmission source port number, a transmission destination IP address and a transmission destination port number of either one of the two new entries. Further, in the other entry, the management unit 43 sets the transmission destination IP address and the transmission destination port number of the target packet as a transmission source IP address and a transmission source port number, and sets the transmission source IP address and the transmission source port number of the target packet as a transmission destination IP address and a transmission destination port number.

The management unit 43 preferably further sets appropriate dummy values in other fields of the connection management table 47 on the basis of the header information of the target packet. For example, when the TCP data length of the target packet is larger than 0, the management unit 43 may set the dummy values as follows. The following dummy values are an example of appropriate dummy values compatible with steps described later.

(1) A value obtained by subtracting 1 from the IP-ID of the target packet is set as a dummy value of an IP-ID field of an entry of a sub-connection which has a direction in which the target packet flows as a data direction.

(2) A value obtained by subtracting an appropriate value from the sequence number of the target packet is set as a dummy value of a maximum sequence number field of an entry of a sub-connection which has a direction in which the target packet flows as a data direction.

After two entries are added to the connection management table 47 in step S104, the processes in FIGS. 11 to 14 proceed to step S109.

Meanwhile, in step S105, the management unit 43 judges whether or not the target packet is a packet for connection establishment. Specifically, the management unit 43 refers to the SYN flag of the target packet. When a value of the SYN flag is 1, the management unit 43 judges that "the target packet is a SYN packet or a SYN/ACK packet and is thus a packet for connection establishment." In addition, even if a value of the SYN flag of the target packet is 0, the management unit 43 judges that "the target packet is a packet for connection establishment" in a case where the target packet is an ACK packet for a formerly captured SYN/ACK packet.

For example, as described above, a field (not illustrated) indicating a state regarding establishment and release of a connection may be included in the connection management table 47. The management unit 43 may judge "whether or not the target packet is an ACK packet for a formerly captured SYN/ACK packet" by referring to the field (or the above-described temporary storage region).

As a result of the above-described process, in a case where the management unit 43 judges that the target packet is "a packet for connection establishment", next, the management unit 43 performs a process in step S106. Conversely, in a case where the management unit 43 judges that the target packet is "not a packet for connection establishment", next, the management unit 43 performs a process in step S107.

In step S106, the management unit 43 performs a process for registering information regarding a new network connection in the connection management table 47.

Specifically, in a case where the target packet is a SYN packet, the management unit 43 issues two new connection IDs corresponding to two sub-connections of the connection which is about to be newly established, and adds two new entries to the connection management table 47. The addition of the two entries is the same as the addition in step S104.

The management unit 43 may set an appropriate dummy value corresponding to an initial sequence number (ISN) designated by the SYN packet in a field of the new entry. For example, a value obtained by subtracting 1 from the ISN may be set as a dummy value of a maximum sequence number of an entry of a sub-connection which has a direction in which the SYN packet is transmitted as a data direction.

In addition, in a case where the target packet is a SYN/ACK packet, the management unit 43 appropriately updates two entries added when a former SYN packet was received in relation to the connection which is about to be newly established. For example, as described above, a field (not illustrated) indicating a state regarding establishment and release of a connection may be included in the connection management table 47, and the management unit 43 may update the field. Further, the management unit 43 may set a value obtained by subtracting 1 from an ISN designated in the SYN/ACK packet as a dummy value of a maximum sequence number of an entry of a sub-connection which has a direction in which the SYN/ACK packet is transmitted as a data direction.

Alternatively, in a case where the target packet is an ACK packet for a formerly captured SYN/ACK packet, the management unit 43 appropriately updates two entries added when a former SYN packet was received in relation to the connection which is about to be newly established. For example, the management unit 43 may update a field (not illustrated) indicating a state regarding establishment and release of a connection.

When the update of the connection management table 47 in step S106 is completed, the processes in FIGS. 11 to 14 return to step S101. In addition, although, in the above description, a case where a field (not illustrated) indicating a state regarding establishment and release of a connection is included in the connection management table 47 has been described as an example, a temporary storage region may be used instead of the field. For example, in a case where the target packet is a SYN packet or in a case where the target packet is a SYN/ACK packet, the management unit 43 may just store information regarding two sub-connections of the new connection in the temporary storage region in step S106. Further, in a case where the target packet is an ACK packet for a formerly captured SYN/ACK packet, the management unit 43 may add two new entries to the connection management table 47 by referring to the above-described temporary storage region.

Meanwhile, in step S107, the management unit 43 judges "whether or not the target packet is a packet for releasing (that is, closing) the connection." Specifically, the management unit 43 refers to the FIN flag of the target packet. When a value of the FIN flag is 1, the management unit 43 judges that "the target packet is a packet for connection release."

In addition, also in a case where an ACK packet for a formerly captured FIN packet is captured in this step S101, the management unit 43 judges that "the target packet is a packet for connection release." For example, the management unit 43 may refer to the field (not illustrated) of the connection management table 47, indicating a state regarding establishment and release of a connection, or the temporary storage region storing a information regarding establishment and release of a connection. Accordingly, the management unit 43 may judge "whether or not the target packet is an ACK packet for a formerly captured FIN packet."

As a result of the above-described process, in a case where the management unit 43 judges that the target packet is "a packet for connection release", next, the management unit 43 performs a process in step S108. Conversely, in a case where the management unit 43 judges that the target packet is "not a packet for connection release", next, the processes in FIGS. 11 to 14 return to step S101.

In addition, as long as no error occurs, the management unit 43 does not judge that the target packet is "not a packet for connection release" in step S107. Therefore, in a case where the management unit 43 judges that the target packet is "not a packet for connection release" in step S107, an appropriate process on errors (not illustrated) may be performed between steps S107 and S101.

In step S108, the management unit 43 performs a process for deleting information regarding the connection which is about to be released, from the connection management table 47.

Specifically, in a case where the target packet is a FIN packet, the management unit 43 updates information indicating a state of a sub-connection which has a direction in which the FIN packet is transmitted as a data direction. In addition, as described above, the information indicating a state may be stored in the field (not illustrated) of the connection management table 47, or may be stored in the temporary storage region, for example. The update of the information indicating a state is a process of preparing for deletion of an entry from the connection management table 47 and is thus a kind of process for deletion. Further, in a case where the target packet is an ACK packet for a formerly captured FIN packet, the management unit 43 deletes an entry of a sub-connection which has a direction in which the ACK packet is transmitted as an ACK direction from the connection management table 47. After step S108 is completed, the processes in FIGS. 11 to 14 return to step S101.

Meanwhile, step S109 is performed when a data packet or an ACK packet transmitted over the established connection is received (that is, captured) in step S101. When step S109 is performed as a result of the search in step S102, or as a result of the registration in step S104, two entries of the connection management table 47 regarding the connection used for transmission of the target packet have already been specified. Therefore, in step S109, the detection unit 44 selects the connection and the sub-connections.

Specifically, the transmission source IP address, the transmission source port number, the transmission destination IP address, and the transmission destination port number of the target packet may be directly output to the detection unit 44 from the extraction unit 42, or may be output to the detection unit 44 from the extraction unit 42 via the management unit 43. In either case, the detection unit 44 may recognize the connection used for transmission of the target packet on the basis of the transmission source IP address, the transmission source port number, the transmission destination IP address, and the transmission destination port number of the target packet. Therefore, the detection unit 44 selects the recognized connection.

In addition, the selected connection includes two sub-connections. In step S109, the detection unit 44 selects one of the two sub-connections. Further, the other sub-connection is selected in step S123 described later. The detection unit 44 may first select either of the sub-connections in step S109.

Hereinafter, the connection selected in step S109 is referred to as a "selected connection". In addition, the sub-connection selected in step S109 or S123 is referred to as a "selected sub-connection".

After selection in step S109, in step S110, the detection unit 44 judges whether a direction in which the target packet is transmitted is the data direction in the selected sub-connection or the ACK direction in the selected sub-connection. The detection unit 44 may make the judgment in step S110 by comparing the transmission source IP address and the transmission destination IP address of the target packet with a transmission source IP address and a transmission destination IP address of an entry of the selected sub-connection in the connection management table 47.

Figure 12:
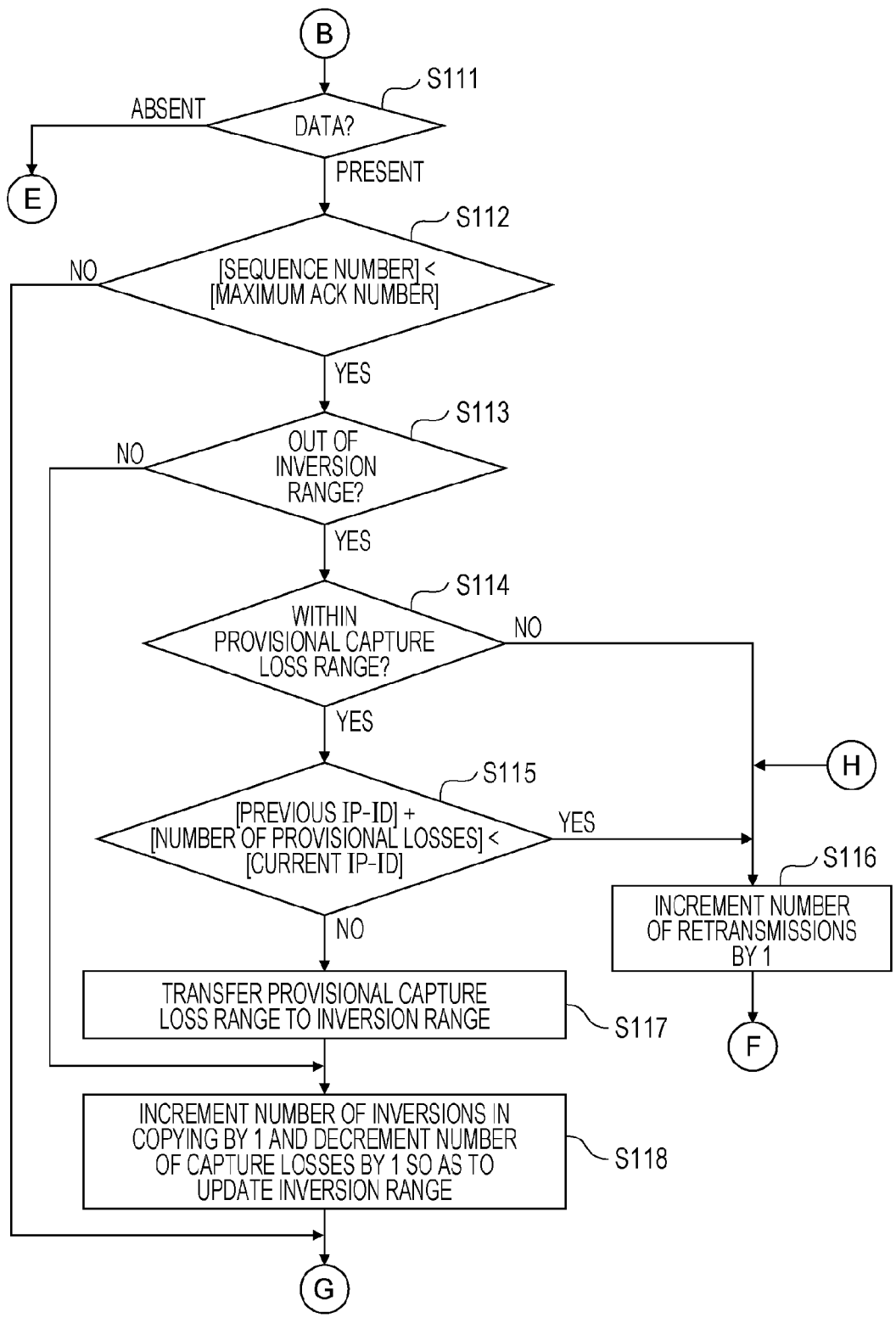
FIG. 12 is a diagram illustrating an example of an operational flowchart (second) for processes performed by the network monitoring device, according to an embodiment.

In a case where the direction in which the target packet is transmitted is the data direction in the selected sub-connection, next, the detection unit 44 makes judgment in step S111 of FIG. 12. Conversely, in a case where the direction in which the target packet is transmitted is the ACK direction in the selected sub-connection, next, the detection unit 44 makes judgment in step S124 of FIG. 14.

Meanwhile, in step S111, the detection unit 44 judges whether or not the target packet includes data. Specifically, the detection unit 44 calculates a TCP data length of the target packet from the total length field of the IP header, the IHL field of the IP header, and the data offset of the TCP header. When the TCP data length is 0, the target packet does not include data, and when the TCP data length is a positive value, the target packet includes data.

In a case where the target packet includes data (that is, in a case where a data packet which is transmitted in the data direction of the selected sub-connection is captured as the target packet in step S101), the detection unit 44 updates the number of packets field of the analysis information table 48 of FIG. 10, and then makes judgment in step S112. Conversely, in a case where the target packet does not include data, next, the detection unit 44 makes judgment in step S122 of FIG. 13.

The update of the number of packets field of the analysis information table 48 is, specifically, as follows. The detection unit 44 searches the analysis information table 48 for an entry with a connection ID of the selected sub-connection. In addition, the detection unit 44 increments a value of the number of packets field of the found entry by 1.

The analysis information table 48b may be used instead of the analysis information table 48 depending on an embodiment. In this case, the detection unit 44 searches the analysis information table 48b for an entry with a connection ID of the selected connection. In addition, the detection unit 44 increments a value of the number of packets field of the found entry by 1. In the example of FIG. 10, a connection including two sub-connections identified by connection IDs "j-1" and "j-2" for any j is identified by a connection ID "j."

In addition, it is noted that the data direction of the selected sub-connection is the ACK direction of a sub-connection in a direction opposite to the selected sub-connection. In other words, an ACK packet regarding a data stream which flows over the sub-connection in a direction opposite to the selected sub-connection is transmitted in the data direction of the selected sub-connection.

Figure 13:
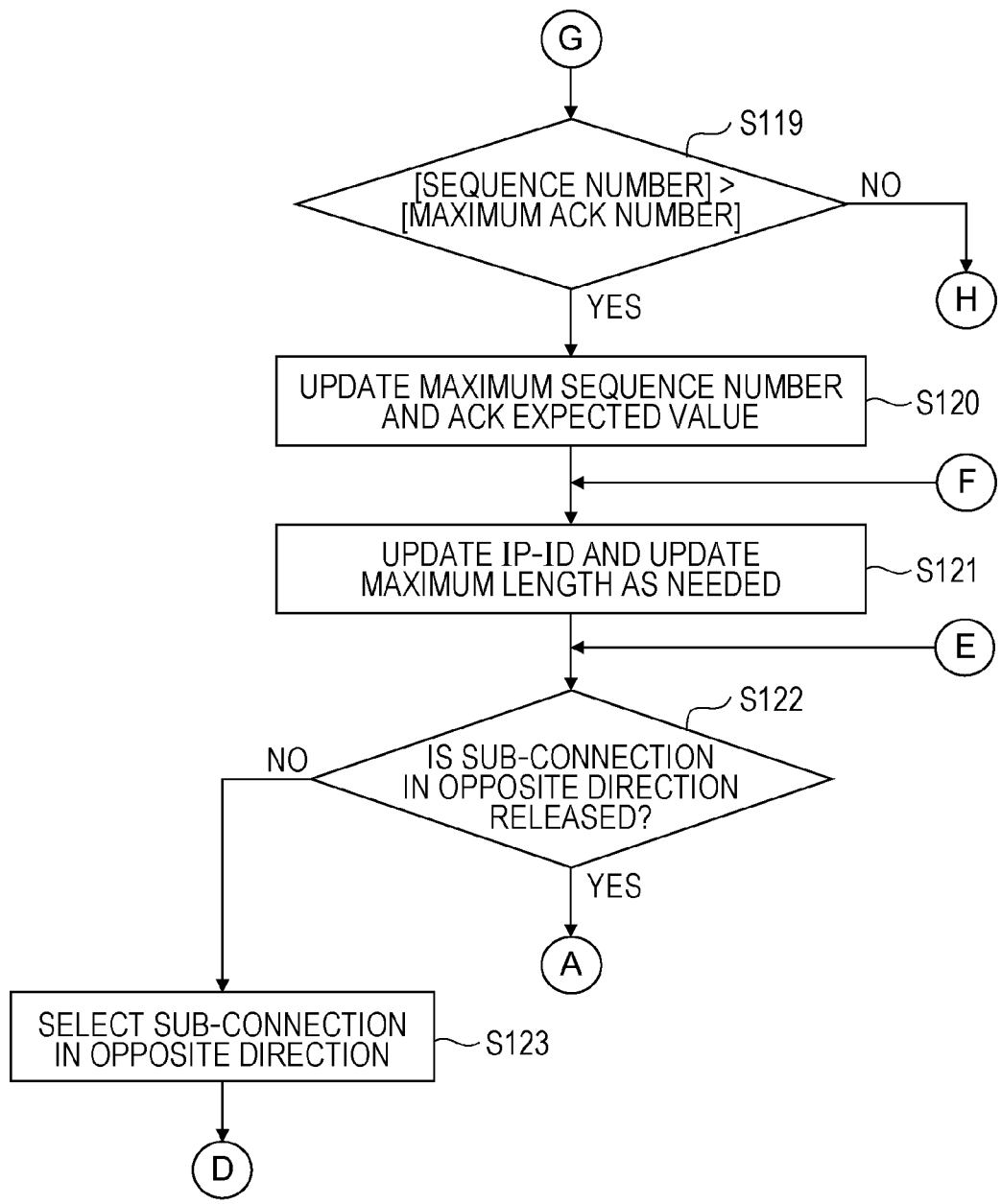
FIG. 13 is a diagram illustrating an example of an operational flowchart (third) for processes performed by the network monitoring device, according to an embodiment.
Figure 14:
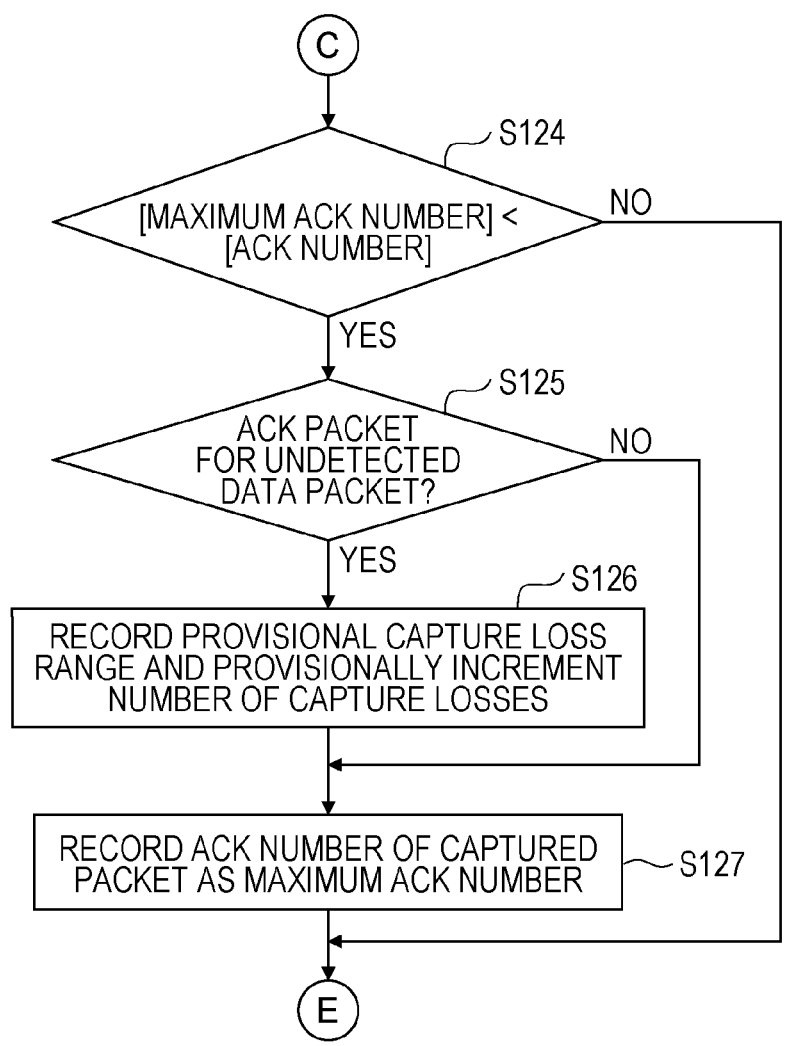
FIG. 14 is a diagram illustrating an example of an operational flowchart (fourth) for processes performed by the network monitoring device, according to an embodiment.

Specifically, in a case where the target packet is such an ACK packet, and is an ACK packet which is not piggy-backed, it is judged that "the target packet does not include data" in step S111. In this case, step S122 described later of FIG. 13 is performed next.

Meanwhile, in step S112, the detection unit 44 compares the sequence number of the TCP header of the target packet with the maximum ACK number of the entry of the selected sub-connection in the connection management table 47. In a case where the sequence number is less than the maximum ACK number (for example, in a case where the data packet D13 is captured as the target packet at the time point T15 of FIGS. 4 and 6), there are the following two possibilities:

(1) A possibility that the target packet is a retransmitted data packet; and (2) A possibility that the target packet is a data packet which is captured later than the ACK packet due to order inversion in the capture process.

Therefore, in a case where the sequence number is less than the maximum ACK number, next, the detection unit 44 makes judgment in step S113 in order to discriminate the two possibilities from each other. Conversely, in a case where the sequence number is equal to or more than the maximum ACK number, the detection unit 44 is not desired to take into consideration a possibility of order inversion between a data packet and an ACK packet in the capture process. Therefore, in a case where the sequence number is equal to or more than the maximum ACK number (for example, in a case where the data packet D15 is captured as the target packet at the time point T17 of FIG. 6, or the like), next, the detection unit 44 makes judgment in step S119 of FIG. 13.

Meanwhile, in step S113, the detection unit 44 refers to the inversion range field of the entry of the selected sub-connection in the connection management table 47. In addition, the detection unit 44 judges whether or not the sequence number of the target packet (that is, a data packet transmitted in the data direction of the selected sub-connection) is out of the inversion range.

When the inversion range field is blank, the sequence number of the target packet is out of the inversion range. Alternatively, there may be a case where a range of "SN1 or more and below SN2" is stored in the inversion range field. In this case, if the sequence number of the target packet is below SN1 or SN2 or more, the sequence number of the target packet is out of the inversion range. Conversely, when the sequence number of the target packet is SN1 or more and below SN2, the sequence number of the target packet is within the inversion range.

For example, in a case where the ACK packet A14 is captured at the time point T14 of FIG. 6, two data packets D13 and D14 are included in the inversion range 24. As above, there may be a case where the ACK packet for notification of reception of two or more data packets is captured before the two or more data packets are captured.

In this case, when a first data packet is captured among the two or more data packets, discrimination between retransmission and order inversion is performed. In addition, in a case where order inversion is judged, a range of the sequence numbers of the second and subsequent data packets which may be captured later than the ACK packet due to the order inversion is recorded in the inversion range field (refer to steps S117 and S118 described later with regard to details thereof).

Accordingly, when any data packet after the second data packet is captured in step S101 among the two or more data packets captured later than the ACK packet, it is judged that "the sequence number of the target packet is within the inversion range" in step S113. In addition, the upper limit sequence number SN2 of the inversion range is defined by an ACK number of the ACK packet captured earlier. Therefore, as is clear from a specific example described later with reference to FIG. 9, "out of the inversion range" is judged in step S113 in relation to subsequent data packets which are normally captured after the inversion range 24, such as the data packet D15 of FIG. 6.

In a case where the sequence number of the target packet is within the inversion range, judgment that "not retransmission but order inversion has occurred" has already been made. Therefore, in this case, next, the detection unit 44 performs a process regarding the detected order inversion in step S118.

Conversely, in a case where the sequence number of the target packet is out of the inversion range, order inversion has not yet been detected. Therefore, the detection unit 44 performs a process in step S114 next in order to examine a possibility of order inversion.

Specifically, in step S114, the detection unit 44 refers to the provisional capture loss range field of the entry of the selected sub-connection in the connection management table 47. In addition, the detection unit 44 judges whether or not the sequence number of the target packet (that is, a data packet transmitted in the data direction of the selected sub-connection) is within the provisional capture loss range.

When the provisional capture loss range field is blank, the sequence number of the target packet is out of the provisional capture loss range.

Alternatively, there may be a case where a range of "SN1 or more and below SN2 " is stored in the provisional capture loss range field. In this case, when the sequence number of the target packet is below SN1 or SN2 or more, the sequence number of the target packet is out of the provisional capture loss range. Conversely, when the sequence number of the target packet is SN1 or more and below SN2, the sequence number of the target packet is within the provisional capture loss range.

For example, when the ACK packet A14 is captured at the time point T14 of FIG. 6, the detection unit 44 detects the following two possibilities (refer to steps S125 and S126 described later with regard to details thereof):

(1) A possibility that one or more data packets which are not captured due to a capture loss are retransmitted for some reason, and the one or more retransmitted data packets may be captured later than (that is, in the future) an ACK packet captured this time; and (2) A possibility that order inversion in a capture process occurs between one or more data packets and an ACK packet for notification of reception of the one or more data packets, and thus the current ACK packet is received earlier than the data packets However, it is still unclear whether a capture loss and retransmission have occurred or order inversion has occurred in a stage in which the ACK packet is captured. On the other hand, a range in which the detection unit 44 recognizes that "a capture loss may have occurred" in the stage of capturing the ACK packet is the same as a range in which the detection unit 44 recognizes that "order inversion may have occurred" in the stage of capturing the ACK packet. Therefore, the range of a capture loss or order inversion is recorded in the provisional capture loss range field in the stage of capturing the ACK packet.

Therefore, in a case where retransmission has occurred after a capture loss, when the retransmitted data packet is captured in step S101 after the ACK packet, it is judged that "the sequence number of the target packet is within the provisional capture loss range" in step S114. In addition, there may be a case where one or more data packets are captured later than the ACK packet due to order inversion in the capture process. In this case, when the first data packet of the one or more data packets is captured in step S101, it is judged that "the sequence number of the target packet is within the provisional capture loss range" in step S114.

Of course, there may be a case where a data packet is retransmitted regardless of a capture loss. For example, the case is the following case.

A data packet of which a sequence number is 501 and a TCP data length is 100 is transmitted and is captured.

Thereafter, an ACK packet of which an ACK number is 601 is transmitted as an acknowledgment for the data packet and is captured.

However, the ACK packet is lost over a network after being captured.

As a result, a data packet of which a sequence number is 501 and a TCP data length is 100 is retransmitted, and the retransmitted data packet is captured.

For example, as in the above-described example, in a case where a data packet is retransmitted regardless of a capture loss, or the like, it is judged that "the sequence number of the target packet is out of the provisional capture loss range" in step S114. As above, in a case where the sequence number of the target packet is out of the provisional capture loss range, the detection unit 44 can exclude a possibility of order inversion.

In a case where it is judged that "the sequence number of the target packet is within the provisional capture loss range" in step S114, next, the detection unit 44 makes judgment in step S115 in order to discriminate whether a capture loss and retransmission have occurred or order inversion has occurred. Conversely, in a case where it is judged that "the sequence number of the target packet is out of the provisional capture loss range" in step S114, next, the detection unit 44 performs a process in step S116.

Meanwhile, in step S115, the detection unit 44 reads a value of the IP-ID field of the entry of the selected sub-connection in the connection management table 47. The value read in this way is the IP-ID of a "previous data packet" described with reference to FIG. 1. This is because the IP-ID field is updated in step S121 described later.

The previous data packet is a data packet which is captured latest among data packets captured earlier than the ACK packet which causes the detection unit 44 to detect that "a capture loss and retransmission have occurred or order inversion in the capture process has occurred." In some of the following expressions, the IP-ID of the previous data packet may be indicated by "Prev."

In addition, in step S115, the detection unit 44 calculates the number of data packets which have failed to be captured by the network monitoring device 40 in a case where it is assumed that "a capture loss and retransmission have occurred." Hereinafter, this number is referred to as the "number of provisional losses" and is indicated by "Loss" in some cases.

Specifically, the detection unit 44 reads values of the provisional capture loss range field and the maximum length field from the entry of the selected sub-connection in the connection management table 47. For convenience of description, it is assumed that a range stored in the provisional capture loss range field is "SN1 or more and below SN2", and a length stored in the maximum length field is "MaxLen". In this case, the detection unit 44 calculates the number of provisional losses as in Expression (1). In addition, ceil(x) is an integer which is equal to or more than the argument x and is the closest to the argument x.

$$\text{Loss} = \text{ceil}((\text{SN2} - \text{SN1})/\text{MaxLen}) \quad (1)$$

The number of provisional losses calculated based on the maximum length as in Expression (1) is a minimum estimated value of the number of capture losses. As described with reference to FIG. 1, using a minimum estimated value as an estimated value of the number of capture losses has an effect of suppressing side effects and is thus preferable.

In addition, in step S115, the detection unit 44 judges "whether or not Expression (2) holds true" based on the read IP-ID of the previous data packet, the calculated number of provisional losses, and the IP-ID of the target packet. In addition, in Expression (2), the IP-ID (that is, an IP-ID of a data packet captured this time) of the target packet is indicated by "Cur".

$$\text{Prev} + \text{Loss} < \text{Cur} \quad (2)$$

In a case where Expression (2) holds true, the detection unit 44 judges that "a capture loss and retransmission have occurred." This is because, after an IP-ID is issued to the previous data packet by the transmission source host, the number of IP-IDs consumed for packets up to the target packet by the transmission source host is larger than the number of provisional losses which is a threshold value. For this reason, in a case where Expression (2) holds true, the detection unit 44 performs a process in step S116 next.

Conversely, in a case where Expression (2) does not hold true, the detection unit 44 judges that "order inversion in the capture process has occurred between data packets and an ACK packet." In other words, in this case, the detection unit 44 detects order inversion. More specifically, the detection unit 44 judges that "order inversion has occurred between one or more data packets and an ACK packet for notification of reception of the one or more data packets, and the target packet is the first data packet among the one or more data packets." In this case, the detection unit 44 performs a process in step S117 next.

In addition, Expression (2) is equivalent to Expression (3). In other words, when a difference between the IP-ID of the target packet captured this time and the IP-ID of the previous data packet is larger than the number of provisional losses which is a threshold value, the detection unit 44 judges that "a capture loss and retransmission have occurred." Conversely, when a difference between the IP-ID of the target packet captured this time and the IP-ID of the previous data packet is equal to or smaller than the number of provisional losses which is a threshold value, the detection unit 44 judges that "order inversion has occurred."

$$\text{Loss} < \text{Cur} - \text{Prev} \quad (3)$$

In addition, "Cur", "Prey", and "Loss" of Expression (3) are examples of the "third numerical value", the "fourth numerical value", and the "threshold value" described with reference to FIG. 1. In addition, with reference to FIG. 1, a description has been made of a case where the "threshold value" is based on the "first numerical value", the "fifth numerical value", the "size of the previous data packet", and the "size value". Expression (1) represents an example of a method of calculating the "threshold value". In other words, the "SN2" of Expression (1) is an example of the "first numerical value", the "SN1" of Expression (1) corresponds to a sum of the "fifth numerical value" and the "size of the previous data packet", and "MaxLen" of Expression (1) is an example of the "size value".

Meanwhile, in a case where retransmission is detected, in step S116, the detection unit 44 increments the number of retransmissions of the entry of the selected sub-connection in the analysis information table 48 by 1. Alternatively, the detection unit 44 may increment the number of retransmissions of the entry of the selected connection in the analysis information table 48b by 1. In addition, the processes in FIGS. 11 to 14 proceed to step S121.

On the other hand, in a case where order inversion is detected, in step S117, the detection unit 44 updates the entry of the selected sub-connection in the connection management table 47. Specifically, the detection unit 44 transfers the value of the provisional capture loss range field to the inversion range field so as to clear the provisional capture loss range. Step S117 is performed in order to prepare for capture of the second and subsequent data packets in a case where two or more data packets are captured later than the ACK packet due to the order inversion in the capture process. The detection unit 44 performs step S118 next after step S117.

Step S118 is performed in a case where order inversion is detected in step S115, and step S117 is performed, or in a case where it is judged that "the sequence number of the target packet is within the inversion range" in step S113. The latter case is, in other words, a case where the second and subsequent data packets related to the detected order inversion are captured in step S101. In other words, step S118 is performed in a case where the target packet is any data packet which is captured later than the ACK packet due to the order inversion in the capture process.

Specifically, in step S118, the detection unit 44 increments the number of inversions in copying of the entry of the selected sub-connection in the analysis information table 48 by 1. Alternatively, the detection unit 44 may increment the number of inversions in copying of the entry of the selected connection in the analysis information table 48b by 1.

In addition, in step S118, the detection unit 44 decrements the number of capture losses of the entry of the selected sub-connection in the analysis information table 48 by 1. Alternatively, the detection unit 44 may decrement the number of capture losses of the entry of the selected connection in the analysis information table 48b by 1. The decrement of the number of capture losses is performed in order to cancel out influence of the increment (details thereof will be described later along with step S126) of the number of capture losses which is previously provisionally performed when the ACK packet is captured.

In addition, in step S118, the detection unit 44 updates the inversion range field of the entry of selected sub-connection in the connection management table 47. Specifically, the detection unit 44 calculates a sum of the sequence number of the target packet and the TCP data length of the target packet. Further, when the calculated sum is equal to or more than the upper limit of the inversion range, the detection unit 44 clears the inversion range field. Conversely, when the calculated sum is smaller than the upper limit of the inversion range, the detection unit 44 updates the lower limit of the inversion range to the calculated sum. The inversion range is updated in this way, and thus the detection unit 44 may appropriately recognize a range of octets corresponding to uncaptured data packets among one or more data packets which are estimated to be captured later than the ACK packet due to the order inversion.

After the analysis information table 48 and the connection management table 47 are updated in the above step S118, step S119 of FIG. 13 is performed.

As can be seen from FIGS. 12 and 13, step S119 is performed in a case where it is judged that "the sequence number of the target packet is equal to or more than the maximum ACK number of the entry of the selected sub-connection" in step S112. In addition, step S119 is also performed in a case where it is judged that "the sequence number of the target packet is less than the maximum ACK number of the entry of the selected sub-connection" in step S112, and then it is judged that "the target packet is not a retransmitted data packet".

Specifically, in step S119, the detection unit 44 compares the sequence number of the target packet with the maximum sequence number of the entry of the selected sub-connection in the connection management table 47.

In a case where the sequence number of the target packet is larger than the maximum sequence number, it is estimated that "the target packet is not a retransmitted data packet." Therefore, in this case, the detection unit 44 performs step S120 next.

Conversely, in a case where the sequence number of the target packet is equal to or less than the maximum sequence number, it is estimated that "the target packet is a retransmitted data packet." Therefore, in this case, the detection unit 44 performs the above step S116 next.

In step S120, the detection unit 44 updates the maximum sequence number and the ACK expected value of the entry of the selected sub-connection in the connection management table 47. Specifically, the detection unit 44 stores the sequence number of the target packet in the maximum sequence number field. In addition, the detection unit 44 stores a sum of the sequence number of the target packet and the TCP data length of the target packet in the ACK expected value field.

In addition, after performing step S120 or S116, the detection unit 44 performs a process in step S121.

Specifically, the detection unit 44 updates a value of the IP-ID field of the selected sub-connection in the connection management table 47 to the IP–ID of the target packet.

In addition, in step S121, the detection unit 44 updates the maximum length field of the selected sub-connection in the connection management table 47 as appropriate. In other words, the detection unit 44 compares a value of the maximum length field with the TCP data length of the target packet, and sets the TCP data length of the target packet in the maximum length field when the TCP data length of the target packet is larger than the current value of the maximum length field.

Next, in step S122, the detection unit 44 judges whether or not the selected sub-connection and the sub-connection in the opposite direction have been analyzed. In other words, the detection unit 44 judges whether or not the processes in step S110 and the subsequent steps have been performed on both of the two sub-connections of the selected connection in step S109.

In a case where the processes in step S110 and the subsequent steps have been performed on the two sub-connections, the process regarding the target packet is completed. Therefore, in this case, the processes in FIGS. 11 to 14 return to step S101, and the network monitoring device 40 waits for the next packet.

Conversely, in a case where the processes in step S110 and the subsequent steps are not performed on either one of the two sub-connections, the detection unit 44 performs step S123 next. In other words, the detection unit 44 selects the sub-connection in a direction opposite to a direction of the current selected sub-connection. In addition, the detection unit 44 performs the processes in step S110 and the subsequent steps on the newly selected sub-connection.

Meanwhile, step S124 is performed in a case where it is judged that "a direction in which the target packet is transmitted is the ACK direction in the selected sub-connection" in step S110.

In the description hitherto, the term "ACK packet" has been used for simplification of the description, but there may be a case where an ACK for a certain data packet is piggy-backed in another data packet which is transmitted in an opposite direction. In other words, there may be an ACK packet having a TCP data payload. Of course, in a case where there is no data transmitted in the opposite direction, or the like, there may be a case where an ACK packet having no TCP data payload is transmitted.

In addition, an ACK flag is set at 1 in any packet transmitted after a TCP connection is established. In other words, the ACK number field is valid in any packet transmitted after the TCP connection is established. Therefore, a notification of an identical ACK number may be repeatedly sent several times, for example, in the following case.

A certain data packet is transmitted from the host 31 to the host 32 over a connection.

The host 32 returns an ACK packet for the data packet to the host 31. This ACK packet may have the TCP data payload or may not have the TCP data payload.

For the time being thereafter, there is no target data which is transmitted to the host 32 in the host 31. For this reason, during that period, the host 31 does not transmit a data packet to the host 32.

However, during that period, there is target data which is transmitted to the host 31 in the host 32. For this reason, during that period, the host 32 transmits several data packets to the host 31. An ACK number of the data packet is the same as the ACK number of the ACK packet described above.

As can be seen from the above description, the packet which is transmitted in the ACK direction of the selected sub-connection may have a TCP data payload and may not have a TCP data payload. In either case, the ACK number field is valid in any packet transmitted in the ACK direction of the selected sub-connection.

However, an ACK number may not be different for each packet. For example, a plurality of packets having the same ACK number may be transmitted as in the above-described example (or due to a network loss of a data packet).

Therefore, in a case where a direction in which the target packet is transmitted is the ACK direction of the selected sub-connection, in step S124, first, the detection unit 44 judges "whether or not a notification of the same ACK number as an ACK number of which a notification was sent in the past is sent again by the target packet." In other words, the detection unit 44 compares a value of the maximum ACK number field of the entry of the selected sub-connection in the connection management table 47 with a value of the ACK number field of the target packet.

When the maximum ACK number is less than the ACK number of the target packet, no packet captured in the past has notified of the ACK number of which a notification is sent by the target packet. Therefore, in this case, the detection unit 44 performs step S125 next.

Conversely, when the maximum ACK number is equal to or more than the ACK number of the target packet, any packet captured in the past has already notified of the ACK number of which a notification is sent by the target packet. Therefore, in this case, the detection unit 44 disregards the target packet which is an ACK packet. Specifically, in this case, the detection unit 44 does not perform steps S125 to S127, and makes the judgment in the above step S122 next.

Meanwhile, in step S125, the detection unit 44 judges "whether or not the target packet is an ACK packet for an undetected data packet (that is, an uncaptured data packet)." Specifically, the detection unit 44 refers to the ACK expected value field of the entry of the selected sub-connection in the connection management table 47. In addition, the detection unit 44 compares the ACK expected value with the ACK number of the target packet.

In a case where the ACK number is larger than the ACK expected value, the detection unit 44 judges that "the target packet is an ACK packet for an undetected data packet." In this case, there is a possibility that a capture loss of the data packet has occurred and a possibility that the ACK packet is captured earlier than the data packet due to order inversion in the capture process. Therefore, in a case where the ACK number is larger than the ACK expected value, the detection unit 44 makes preparations to discriminate the two possibilities from each other when a data packet is captured next. In other words, in this case, the detection unit 44 performs step S126 next after step S125.

Conversely, in a case where the ACK number is equal to or less than the ACK expected value, the detection unit 44 judges that "the target packet is an ACK packet for a detected data packet." In this case, the detection unit 44 performs step S127 next after step S125.

Meanwhile, in step S126, the detection unit 44 updates the provisional capture loss range field of the entry of the selected sub-connection in the connection management table 47. Specifically, the detection unit 44 sets the ACK expected value which is referred to in step S126 as a lower limit of the provisional capture loss range, and sets the ACK number of the target packet as an upper limit of the provisional capture loss range.

For example, it is assumed that values of the lower limit and the upper limit set in the above-described way are SN1 and SN2. In a data stream transmitted in the data direction over the selected sub-connection, octets from an octet indicated by the numerical value SN1 to an octet indicated by the numerical value (SN2-1) may disappear in the capture process or may be captured late.

In step S126, the detection unit 44 further provisionally increments the number of capture losses of the entry of the selected sub-connection in the analysis information table 48. Specifically, the detection unit 44 estimates the number of data packets of which capture losses may occur using Expression (4).

$$\text{Loss}=\text{ceil}((SN2-SN1)/\text{MaxLen}) \tag{4}$$

In addition, it is assumed that a provisional capture loss range field of "SN1 or more and below SN2" is recorded in step S126 as described above. In addition, a value of the maximum length field of the entry of the selected sub-connection in the connection management table 47 is assumed to be "MaxLen". "Loss" of Expression (4) is the number of data packets for which it is estimated there is a possibility of capture losses, that is, the number of provisional losses. Expression (4) is the same as Expression (1) which is referred to with regard to calculation of the number of provisional losses in step S115.

The detection unit 44 increments a value of the number of capture losses field of the entry of the selected sub-connection in the analysis information table 48 by the number of provisional losses estimated using Expression (4). In addition, in an embodiment in which the analysis information table 48*b* is used instead of the analysis information table 48, the detection unit 44 increments a value of the number of capture losses field of the entry of the selected connection in the analysis information table 48*b* by the number of provisional losses.

After the provisional capture loss range and the number of capture losses are updated as described above, the detection unit 44 performs step S127.

In addition, the number of capture losses which is provisionally incremented as above in step S126 remains as it is, in a case where it is judged that "a capture loss and retransmission have occurred" in the future. In other words, the number of capture losses is not updated in step S116, and thus the number of capture losses is fixed.

Conversely, in a case where it is judged that "order inversion has occurred" in the future, the number of capture losses is decremented in the above step S118. Accordingly, influence of the provisional increment in step S126 is canceled out.

Of course, the detection unit 44 may use, for example, an appropriate temporary storage region on the RAM 52 instead of the provisional increment in step S126 and the decrement in step S118. In other words, the detection unit 44 may store the number of provisional losses estimated using Expression (4) in the temporary storage region in step S126. In addition, when a data packet which is transmitted in the data direction of the current selected sub-connection is captured next, if step S115 is performed and thus it is judged that "Expression (2) holds true", the detection unit 44 may increment the number of capture losses. In other words, the detection unit 44 may increment for the first time the number of capture losses by the number of provisional losses stored in the temporary storage region after a capture loss and retransmission are detected.

Meanwhile, in step S127, the detection unit 44 records the ACK number of the target packet captured in step S101 as a maximum ACK number of the entry of the selected sub-connection in the connection management table 47. In addition, the detection unit 44 performs the above step S122 next.

According to the processes in FIGS. 11 to 14 described above, it is possible to avoid misjudgment concerning retransmission as exemplified in FIG. 5, for example, and thus appropriate judgment is made as exemplified in FIG. 6, for example. As a result, accuracy of packet analysis is improved.

In addition, in the processes in FIGS. 11 to 14, a property is used in which order inversion in a capture process does not occur between packets transmitted in one direction (therefore, IP-IDs or ACK numbers monotonously increase). Details thereof are as follows.

There is a possibility that order between a data packet transmitted from the host 31 toward the host 32 over a single connection between the hosts 31 and 32 and an ACK packet transmitted from the host 32 toward the host 31 over the connection is inverted in a capture process. Similarly, there is also a possibility that order between a data packet transmitted from the host 32 toward the host 31 over the connection and an ACK packet transmitted from the host 31 toward the host 32 over the connection is inverted in a capture process. This order inversion may occur in both directions in a process of aggregating a packet flowing in a certain direction and a packet flowing in a direction opposite thereto at a single exit (for example, an aggregation port such as the port 16*a* or the port 37, the buffer 18, or the like).

However, order among a plurality of packets flowing in one direction is maintained even if the packets undergo a capture process. In other words, order among a plurality of packets transmitted from the host 31 toward the host 32 over a single connection between the hosts 31 and 32 is maintained even after capture thereof. Similarly, order among a plurality of packets transmitted from the host 32 toward the host 31 over the connection is also maintained even after capture thereof.

In addition, there may be a case where order inversion among a plurality of packets occurs due to the plurality of packets being routed along a different path over a network. However, hereinafter, for simplification of description, it is assumed that there is no influence of such a type of inversion (or influence of such a type of inversion is appropriately canceled out). In order to detect order inversion among a plurality of packets which travel along a plurality of paths, for example, an existing packet analysis algorithm may be used.

In other words, order among a plurality of data packets transmitted over the connection by the host 31 is maintained ever after capture thereof. Therefore, IP-IDs monotonously increase in a narrow sense among a plurality of data packets which are transmitted from the host 31 over the connection and are captured by the network monitoring device 40. In addition, order among a plurality of ACK packets transmitted by the host 32 over the connection is also maintained. Further, an ACK number in a cumulative acknowledgment scheme is used in TCP. Therefore, ACK numbers monotonously increase in a broad sense among a plurality of ACK packets which are transmitted from the host 32 over the connection and are captured by the network monitoring device 40.

Similarly, order among a plurality of data packets transmitted by the host 32 over the connection is maintained, and order among a plurality of ACK packets transmitted by the host 31 over the connection is also maintained. Therefore, IP-IDs monotonously increase in a narrow sense among a plurality of data packets which are transmitted from the host 32 over the connection and are captured by the network monitoring device 40. In addition, ACK numbers monotonously increase in a broad sense among a plurality of ACK packets which are transmitted from the host 31 over the connection and are captured by the network monitoring device 40.

In the processes in FIGS. 11 to 14, the above-described monotonicity of an IP-ID and an ACK number is used in, for example, steps S115, S121, S124, S127, and the like.

In addition, the processes in FIGS. 11 to 14 are processes related to a case where IP fragmentation does not occur. Since a notification of an appropriate maximum segment size (MSS) is often sent when a connection is established in communication using TCP, an assumption that "IP fragmentation does not occur" is a practical assumption.

In a case where the IP fragmentation does not occur, a single TCP segment is carried by a single IP packet, and thus any IP packet used to carry a TCP segment includes a TCP header. In addition, in a case where the IP fragmentation does not occur, IP-IDs of two or more IP packets are different from each other. In the processes (for example, the extraction of header information in step S101, the processes in steps S115 and S121 related to an IP-ID, and the like) in FIGS. 11 to 14, this property in a case where the IP fragmentation does not occur is used.

Next, the processes described with reference to FIGS. 11 to 14 will be further described using the specific examples illustrated in FIGS. 6 and 9. In addition, FIG. 6 illustrates an example of transmission and reception of packets between the hosts 21 and 22 as in FIG. 3, and FIG. 9 exemplifies information regarding connections between the hosts 31 and 32 of FIG. 7. Here, as described above, since the host 21 may be, specifically, the host 31, and the host 22 may be, specifically, the host 32, hereinafter, it is assumed that the host 21 is the host 31, and the host 22 is the host 32.

In the connection management table 47 of FIG. 9, two entries with connection IDs of "1-1" and "1-2" may be registered in step S106 at the time of 3-way handshake for establishing a connection, performed before the time point T11 of FIG. 6. Alternatively, in a case where the network monitoring device 40 starts capturing a packet after a connection is established, the two entries may be registered in step S104 when the network monitoring device 40 captures a packet for the first time.

When the data packet D11 is captured at the time point T11 of FIG. 6 in step S101, next, steps S102 and S109 are performed. For convenience of description, it is assumed that the sub-connection with a connection ID of "1-1" is selected in step S109.

Then, a transmission direction of the data packet D11 is the data direction in the selected sub-connection, and thus step S111 is performed. In addition, the data packet D11 includes a data payload, and thus step S112 is performed next.

Although not illustrated in FIG. 6, for convenience of description, it is assumed that an ACK packet (specifically, an ACK packet of which an ACK number is 801) is normally captured before the time point T11. Therefore, an ACK number of the ACK packet which is formerly normally captured is stored as a maximum ACK number in the connection management table 47. For this reason, the sequence number 801 of the data packet D11 is judged as being equal to or more than the maximum ACK number. As a result, step S119 is performed after step S112.

In addition, it is assumed that the data packet D11 is not a retransmission packet. Then, a sequence number of the data packet D11 is larger than the maximum sequence number stored in the connection management table 47. For this reason, step S120 is performed next.

In addition, in step S120, the value 801 which is a sequence number of the data packet D11 is stored as a maximum sequence number. In step S120, the value 901 (=801+100) which is a sum of the sequence number and the TCP data length of the data packet D11 is further stored as an ACK expected value.

In addition, in step S121, the value 99 which is an IP-ID of the data packet D11 is stored as an IP-ID in the entry with the connection ID of "1-1". In addition, when the TCP data length of the data packet D11 is larger than the maximum length, the value 100 which is the TCP data length of the data packet D11 is stored as a maximum length, and when the TCP data length of the data packet D1 is equal to or less than the maximum length, the maximum length is not updated. In either case, in the examples of FIGS. 6 and 9, the maximum length is assumed to be 100.

Next, in step S122, it is judged that "the sub-connection in the opposite direction has not been analyzed", and, in step S123, the sub-connection with the connection ID "1-2" is selected. Then, since a transmission direction of the data packet D11 is the ACK direction in the selected sub-connection, step S124 is performed.

Although not illustrated in FIG. 6, a value of the ACK flag is also 1 in the data packet D11, and the ACK number is valid. Therefore, the processes in step S124 and the subsequent steps are appropriately performed in accordance with the ACK number of the data packet D11. In addition, in a case where the ACK number of the data packet D11 is equal to or less than the maximum ACK number in step S124, step S122 is performed again after step S124, and, in a case where the ACK number of the data packet D11 is larger than the maximum ACK number, step S122 is performed again after step S127. Since it is judged this time that "the sub-connection in the opposite direction has been analyzed", the network monitoring device 40 waits for a packet to be received in step S101 again.

Then, the data packet D12 is captured at the time point T12, and, subsequently, steps S102 and S109 are performed. For convenience of description, it is assumed that the sub-connection with the connection ID "1-1" is selected in step S109.

Then, a transmission direction of the data packet D12 is the data direction in the selected sub-connection, and thus step S111 is performed. In addition, the data packet D12 includes a data payload, and thus step S112 is performed next.

Here, as described in relation to the data packet D11, it is assumed that a maximum ACK number stored in the entry with the connection ID "1-1" is 801. The value 901 which is a sequence number of the data packet D12 is equal to or more than the maximum ACK number 801. Therefore, step S119 is performed after step S112.

In addition, as described in relation to the data packet D11, the maximum sequence number stored in the entry with the connection ID "1-1" is 801. The value 901 which is a sequence number of the data packet D12 is larger than the maximum sequence number. For this reason, step S120 is performed next.

In addition, in step S120, the value 901 which is a sequence number of the data packet D12 is stored as a maximum sequence number. In step S120, the value 1001 (=901+100) which is a sum of the sequence number and the TCP data length of the data packet D12 is further stored as an ACK expected value.

Further, in step S121, the value 100 which is an IP-ID of the data packet D12 is stored as an IP-ID in the entry with the connection ID of "1-1". In addition, the TCP data length of the data packet D12 is less than the stored maximum length 100, and thus the maximum length is not updated.

The entry with the connection ID "1-1", illustrated in a connection management table 47a of FIG. 9, indicates a state after the processes are performed up to step S121 in the above-described way due to the capture of the data packet D12 at the time point T12.

In addition, successively, in step S122, it is judged that "the sub-connection in the opposite direction has not been analyzed", and, in step S123, the sub-connection with the connection ID "1-2" is selected. Further, the processes in step S124 and the subsequent steps are appropriately performed in accordance with the ACK number of the data packet D12, and the network monitoring device 40 waits for a packet to be received in step S101 again.

Then, the ACK packet A12 is captured at the time point T13, and, subsequently, steps S102 and S109 are performed. For convenience of description, it is assumed that the sub-connection with the connection ID "1-1" is selected in step S109.

Then, a transmission direction of the ACK packet A12 is the ACK direction in the selected sub-connection, and thus step S124 is performed. As illustrated in the connection management table 47a, the stored maximum ACK number is 801, and, as illustrated in FIG. 6, the ACK number of the ACK packet A12 is 1001. Since 801<1001, next, step S125 is performed.

As illustrated in the connection management table 47a, the stored ACK expected value is 1001. Therefore, the ACK number of the ACK packet A12 is equal to or less than the ACK expected value. Accordingly, the detection unit 44 judges that the ACK packet A12 is "an ACK packet for the captured data packet". As can be seen from FIGS. 3, 4 and 6, the ACK packet A12 is an ACK packet for the data packets D11 and D12, and thus this judgment is correct.

When the judgment is made as above, next, step S127 is performed. In other words, the value 1001 which is an ACK number of the ACK packet A12 is set in the maximum ACK number field of the entry with the connection ID "1-1".

The entry with the connection ID "1-1", illustrated in a connection management table 47b of FIG. 9, indicates a state after the processes are performed up to step S127 in the above-described way due to the capture of the ACK packet A12 at the time point T13.

In addition, successively, in step S122, it is judged that "the sub-connection in the opposite direction has not been analyzed", and, in step S123, the sub-connection with the connection ID "1-2" is selected. When the ACK packet A12 is a piggy-back ACK packet, the processes in step S112 and the subsequent steps are appropriately performed, and, then, the processes return to step S101 from step S122. Conversely, when the ACK packet A12 does not have a TCP data payload, step S122 is performed after step S111, and the processes return to step S101.

When the network monitoring device 40 waits for a packet to be received in step S101, the ACK packet A14 is captured at the time point T14 of FIG. 6. In addition, steps S102 and S109 are performed. For convenience of description, it is assumed that the sub-connection with the connection ID "1-1" is selected in step S109.

Then, a transmission direction of the ACK packet A14 is the ACK direction in the selected sub-connection, and thus step S124 is performed. As illustrated in the connection management table 47b, the stored maximum ACK number is 1001, and, as illustrated in FIG. 6, the ACK number of the ACK packet A14 is 1201. Since 1001<1201, next, step S125 is performed.

As illustrated in the connection management table 47b, the stored ACK expected value is 1001. Therefore, the ACK number of the ACK packet A14 is larger than the ACK expected value. Accordingly, the detection unit 44 judges that the ACK packet A14 is "an ACK packet for an uncaptured data packet". As can be seen from FIGS. 3 and 6, the ACK packet A14 is an ACK packet for the data packets D13 and D14, and thus this judgment is correct.

In addition, in a case where an ACK packet for an uncaptured data packet is captured, there is a possibility that a capture loss of a data packet has occurred and a possibility that order inversion in the capture process has occurred. Discrimination between the two possibilities is performed when a data packet which flows in the data direction of the sub-connection with the connection ID "1-1" is captured next. In a stage in which the ACK packet A14 is captured, the provisional capture loss range and the number of capture losses are updated in step S126 after the judgment in step S125.

Specifically, the current ACK expected value is 1001, and the ACK number of the ACK packet A14 is 1201. Therefore, a range of "1001 or more and below 1201" is set in the provisional capture loss range field.

In addition, as illustrated in the connection management table 47b, the maximum length is 100. Therefore, the number of provisional losses estimated by Expression (4) is 2 (=ceil((1201−1001)/100)). Accordingly, the number of capture losses of the entry with the connection ID "1-1" in the analysis information table 48 is provisionally incremented by 2.

In addition, in step S127, the value 1201 which is an ACK number of the ACK packet A14 is set in the maximum ACK number field of the entry with the connection ID "1-1".

The entry with the connection ID "1-1", illustrated in a connection management table 47c of FIG. 9, indicates a state after the processes are performed up to step S127 in the above-described way due to the capture of the ACK packet A14 at the time point T14.

In addition, successively, in step S122, it is judged that "the sub-connection in the opposite direction has not been analyzed", and, in step S123, the sub-connection with the connection ID "1-2" is selected. If the ACK packet A14 is a piggy-back ACK packet, the processes in step S112 and the subsequent steps are appropriately performed, and, then, the processes return to step S101 from step S122. Conversely, if the ACK packet A14 does not have a TCP data payload, step S122 is performed after step S111, and the processes return to step S101.

In addition, when the network monitoring device 40 waits for a packet to be received in step S101, the data packet D13 is captured at the time point T15 of FIG. 6. In addition, steps S102 and S109 are performed. For convenience of description, it is assumed that the sub-connection with the connection ID "1-1" is selected in step S109.

Then, a transmission direction of the data packet D13 is the data direction in the selected sub-connection, and thus step S111 is performed. In addition, the data packet D13 includes a data payload, and thus step S112 is performed next.

Here, as illustrated in the connection management table 47c, the maximum ACK number stored in the entry with the connection ID "1-1" is 1201. In addition, as illustrated in FIG. 6, the sequence number of the data packet D13 is 1001. Since 1001<1201, next, step S113 is performed.

Here, as illustrated in the connection management table 47c, the inversion range field in the entry with the connection ID "1-1" is blank. Therefore, in step S113, it is judged that "the sequence number 1001 is out of the inversion range."

For this reason, next, step S114 is performed. As illustrated in the connection management table 47c, the range of "1001 or more and below 1201" is stored in the provisional capture loss range field of the entry with the connection ID "1-1". Therefore, in step S114, it is judged that "the sequence number 1001 is within the provisional capture loss range."

Accordingly, next, step S115 is performed. Here, the data packet D12 is a data packet which is captured last among the data packets which are transmitted in the data direction over the sub-connection with the connection ID of "1-1" and are captured before the ACK packet A14. The IP-ID of the data packet D12 is 100 as illustrated in FIG. 6, and the IP-ID 100 is stored in the entry with the connection ID "1-1" as illustrated in the connection management table 47c.

In addition, according to the connection management table 47c, the maximum length is 100, and the provisional capture loss range is a range of "1001 or more and below 1201". Therefore, in step S115, the number of provisional losses is calculated as 2 (=ceil((1201−1001)/100)) by Expression (1).

Further, as illustrated in FIG. 6, the IP-ID of the data packet D13 is 101. Therefore, a sum of the IP-ID of the previous data packet and the number of provisional losses is 102 (=100+2), and this value 102 is equal to or more than the value 101 which is the IP-ID of the data packet D13 captured this time. Thus, in step S115, Expression (2) does not hold true (in other words, Expression (3) does not hold true). That is, in step S115, it is judged that "order inversion in the capture process has occurred between the data packet and the ACK packet."

As a result, step S117 is performed. Specifically, the current value of the provisional capture loss range field in the entry with the connection ID "1-1" is transferred to the inversion range field. In other words, the range of "1001 or more and below 1201" is stored in the inversion range field. In addition, the provisional capture loss range field is cleared.

Next, in step S118, the entry with the connection ID "1-1" in the analysis information table 48 is updated. Specifically, the number of inversions in copying is incremented by 1. In addition, the number of capture losses which was incremented provisionally by 2 in step S126 as described above when the ACK packet A14 was captured is decremented by 1 here.

Further, the reason why the number of capture losses is decremented not by 2 but by 1 is that step S118 is performed once for each data packet which is captured later than the ACK packet due to the order inversion. A combination of the increment in step S126 and the decrement in step S118 is an example of a method for reflecting the number of capture losses detected by the detection unit 44 in the number of capture losses field of the analysis information table 48. The number of capture losses detected by the detection unit 44 is, in other words, a number in which a difference between the IP-ID of the data packet captured this time and the IP-ID of the "previous data packet" described with reference to FIG. 1 is larger than a threshold value.

Further, in step S118, the inversion range of the entry with the connection ID "1-1" in the connection management table 47 is also updated. Specifically, the lower limit of the range of "1001 or more and below 1201" which is transferred from the provisional capture loss range field in step S117 as described above is updated from 1001 to 1101 (=1001+100).

This is because octets in the range of "1001 or more and below 1101" of the range of "1001 or more and below 1201" are included in the data packet D13 captured this time. Therefore, one or more data packets which are predicted to be captured in the future due to the order inversion are, specifically, one or more data packets which include octets in the range of remaining "1101 or more and below 1201" in a data payload.

Therefore, the lower limit of the inversion range of the entry with the connection ID "1-1" in the connection management table 47 is updated to the value 1101 which is a sum of the sequence number and the TCP data length of the data packet D13 as described above. As a result, the range of "1101 or more and below 1201" is recorded in the inversion range field.

Meanwhile, after step S118 as described above is performed, step S119 is performed. Here, the sequence number of the data packet D13 is 1001 as illustrated in FIG. 6. In addition, as illustrated in the connection management table 47c, the maximum sequence number is 901. Since 1001>901, next, step S120 is performed.

In addition, in step S120, the value 1001 which is a sequence number of the data packet D13 is stored as a maximum sequence number. In step S120, the value 1101 (=1001+100) which is a sum of the sequence number and the TCP data length of the data packet D13 is further stored as an ACK expected value.

Further, in step S121, the value 101 which is an IP-ID of the data packet D13 is stored as an IP-ID in the entry with the connection ID of "1-1". In addition, the TCP data length of the data packet D13 is less than the stored maximum length 100, and thus the maximum length is not updated.

The entry with the connection ID "1-1", illustrated in a connection management table 47d of FIG. 9, indicates a state after the processes are performed up to step S121 in the above-described way due to the capture of the data packet D13 at the time point T15.

In addition, successively, in step S122, it is judged that "the sub-connection in the opposite direction has not been analyzed", and, in step S123, the sub-connection with the connection ID "1-2" is selected. Further, the processes in step S124 and the subsequent steps are appropriately performed in accordance with the ACK number of the data packet D13, and the network monitoring device 40 waits for a packet to be received in step S101 again.

Then, the data packet D14 is captured at the time point T16, and, subsequently, steps S102 and S109 are performed. For convenience of description, it is assumed that the sub-connection with the connection ID "1-1" is selected in step S109.

Then, a transmission direction of the data packet D14 is the data direction in the selected sub-connection, and thus step S111 is performed. In addition, the data packet D14 includes a data payload, and thus step S112 is performed next.

Here, as illustrated in the connection management table 47d, the maximum ACK number stored in the entry with the connection ID "1-1" is 1201. In addition, as illustrated in FIG. 6, the sequence number of the data packet D14 is 1101. Since 1101<1201, next, step S113 is performed.

Here, as illustrated in the connection management table 47d, the range of "1101 or more and below 1201" is stored in the inversion range field of the entry with the connection ID "1-1". Therefore, in step S113, it is judged that "the sequence number 1101 is within the inversion range." In other words, it is judged that "the data packet D14 with the sequence number 1101 is included in the detected inversion range."

As a result, step S118 is performed next. Specifically, the number of inversions in copying is incremented by 1 and the number of capture losses is decremented by 1 in the entry with the connection ID "1-1" of the analysis information table 48. Therefore, influence of the provisional increment in step S126 when the ACK packet A14 was captured is removed.

In addition, in step S118, the inversion range of the entry with the connection ID "1-1" in the connection management table 47 is also updated. Specifically, the inversion range field is cleared.

This is because octets in the range of "1101 or more and below 1201" which are currently stored in the inversion range field are all included in the data packet D14 captured this time. This is clear from the sequence number and the TCP data length of the data packet D14.

In addition, after step S118 as described above is performed, step S119 is performed. Here, the sequence number of the data packet D14 is 1101 as illustrated in FIG. 6. In addition, as illustrated in the connection management table 47d, the maximum sequence number is 1001. Since 1101>1001, next, step S120 is performed.

In addition, in step S120, the value 1101 which is a sequence number of the data packet D14 is stored as a maximum sequence number. In step S120, the value 1201 (=1101+100) which is a sum of the sequence number and the TCP data length of the data packet D14 is further stored as an ACK expected value.

Further, in step S121, the value 102 which is an IP-ID of the data packet D14 is stored as an IP-ID in the entry with the connection ID of "1-1". In addition, the TCP data length of the data packet D14 is equal to or less than the stored maximum length 100, and thus the maximum length is not updated.

The entry with the connection ID "1-1", illustrated in a connection management table 47e of FIG. 9, indicates a state after the processes are performed up to step S121 in the above-described way due to the capture of the data packet D14 at the time point T16.

In addition, successively, in step S122, it is judged that "the sub-connection in the opposite direction has not been analyzed", and, in step S123, the sub-connection with the connection ID "1-2" is selected. Further, the processes in step S124 and the subsequent steps are appropriately performed in accordance with the ACK number of the data packet D14, and the network monitoring device 40 waits for a packet to be received in step S101 again.

Then, the data packet D15 is captured at the time point T17, and, subsequently, steps S102 and S109 are performed. For convenience of description, it is assumed that the sub-connection with the connection ID "1-1" is selected in step S109.

Then, a transmission direction of the data packet D15 is the data direction in the selected sub-connection, and thus step S111 is performed. In addition, the data packet D15 includes a data payload, and thus step S112 is performed next.

Here, as illustrated in the connection management table 47e, the maximum ACK number stored in the entry with the connection ID "1-1" is 1201. In addition, as illustrated in FIG. 6, the sequence number of the data packet D15 is 1201. Since the sequence number is equal to or more than the maximum ACK number, step S119 is performed after step S112.

Here, as illustrated in the connection management table 47e, the maximum sequence number stored in the entry with the connection ID "1-1" is 1101. Therefore, the value 1201 which is a sequence number of the data packet D15 is larger than the maximum sequence number. For this reason, step S120 is performed next.

In addition, in step S120, the value 1201 which is a sequence number of the data packet D15 is stored as a maximum sequence number. In step S120, the value 1301 (=1201+100) which is a sum of the sequence number and the TCP data length of the data packet D15 is further stored as an ACK expected value.

Further, in step S121, the value 103 which is an IP-ID of the data packet D15 is stored as an IP-ID in the entry with the connection ID of "1-1". In addition, the TCP data length of the data packet D15 is equal to or less than the stored maximum length 100, and thus the maximum length is not updated.

Successively, in step S122, it is judged that "the sub-connection in the opposite direction has not been analyzed", and, in step S123, the sub-connection with the connection ID "1-2" is selected. Further, the processes in step S124 and the subsequent steps are appropriately performed in accordance with the ACK number of the data packet D15, and the network monitoring device 40 waits for a packet to be received in step S101 again.

As described above, according to the processes in FIGS. 11 to 14, the connection management table 47 of FIG. 9 is appropriately updated for each capture of a packet, and thus appropriate judgment as in FIG. 6 is made. For this reason, various counted values which are counted using a variety of fields of the analysis information table 48 of FIG. 10 have high reliability, and thus accuracy of packet analysis is high.

In addition, according to the processes in FIGS. 11 to 14, it is possible to manage each data stream by using two entries for two data streams which flow in directions opposite to each other over a single connection. In other words, it is possible to manage each sub-connection by using two entries for two sub-connections included in a single connection. That is, according to the processes in FIGS. 11 to 14, even if order inversion occurs in relation to either one of two data streams, the detection unit 44 can make appropriate judgment.

Meanwhile, although the various steps related to discrimination between a case where a capture loss and retransmission have occurred and a case where order inversion has occurred are exemplified in the flowcharts of FIGS. 11 to 14, the network monitoring device 40 may further perform other processes. For example, the network monitoring device 40 may include an analysis unit (not illustrated), and the analysis unit may estimate the number of network losses, a network loss rate, or the like on the basis of the analysis information table 48. The detection unit 44 may be, specifically, a module in the analysis unit.

Alternatively, not the analysis unit but the detection unit 44 may further estimate the number of network losses, a network loss rate, or the like. For this reason, a field of the number of network losses may be added to the analysis information table 48.

For example, in a case where it is judged that "the maximum ACK number is equal to or more than the ACK number of the target packet" in step S124, the detection unit 44 may check "whether or not two or more ACK packets with an identical ACK number are transmitted in a duplicate manner" before performing step S122. Specifically, if the maximum ACK number is the same as the ACK number of the target packet, the detection unit 44 may detect that "duplicate ACK packets have been transmitted", and may record an ACK number of the detected duplicate ACK packet.

For example, a field (hereinafter, referred to as a "duplicate ACK number field") for recording an ACK number of a duplicate ACK packet may be further added to each entry of the connection management table 47. The duplicate ACK number field may be cleared between steps S124 and S125.

In addition, in a case where it is judged that "the sequence number of the target packet is equal to or more than the maximum ACK number" in step S112, the detection unit 44 may refer to the duplicate ACK number field of the entry of the selected sub-connection before performing step S119. Further, in a case where a duplicate ACK number is stored in the duplicate ACK number field, the detection unit 44 compares the stored duplicate ACK number with the sequence number of the target packet.

In a case where the sequence number of the target packet is the same as the duplicate ACK number, the detection unit 44 may judge that "retransmission caused by network losses has occurred." More specifically, the detection unit 44 may judge that "a data packet with the same sequence number as a sequence number of the current target packet was formerly lost over a network, thus a duplicate ACK packet was transmitted, and the data packet has been retransmitted in response to the duplicate ACK packet."

In addition, in a case where it is judged that "the sequence number of the target packet is equal to or more than the maximum ACK number" in step S112, the detection unit 44 may further make the following judgment regarding retransmission without referring to the value of the duplicate ACK number field. Specifically, the detection unit 44 may judge whether or not the sequence number of the target packet is the same as the maximum ACK number. In a case where both of the two are the same as each other, the detection unit 44 may further judge whether or not a network loss and retransmission due to time-out resulting therefrom have occurred.

Specifically, the detection unit 44 may estimate whether or not the following conditions also hold true:

(1) A data packet with the same sequence number as the sequence number of the target packet has been formerly transmitted; and (2) An interval between a time point when the data packet with the same sequence number as the sequence number of the target packet was transmitted for the first time and a time point when the target packet was transmitted is equal to or more than retransmission time-out (RTO).

The detection unit 44 may judge whether or not the former condition holds true by referring to the maximum sequence number field of the connection management table 47. In a case where it is judged that the former condition holds true, the detection unit 44 may further judge whether or not the latter condition holds true.

For example, the detection unit 44 may measure the following two time intervals so as to estimate RTT between the hosts 31 and 32 on the basis of the measurement result.

(1) A time interval between a time point when a data packet transmitted from the host 31 to the host 32 is captured and a time point when an ACK packet for the data packet is captured.

(2) A time interval between a time point when a data packet transmitted from the host 32 to the host 31 is captured and a time point when an ACK packet for the data packet is captured.

In addition, the network monitoring device 40 does not actually transmit a packet to the host 31 or the host 32. However, the detection unit 44 may spuriously estimate RTT between the host 31 and the network monitoring device 40, RTT between the network monitoring device 40 and the host 32, or the like. For example, for the above two time intervals, the former time interval may be estimated as spurious RTT between the network monitoring device 40 and the host 32. Similarly, the latter time interval may be estimated as spurious RTT between the network monitoring device 40 and the host 31.

The detection unit 44 may temporarily store a capture time of each packet in the RAM 52 or the like in order to estimate RTT as described above. The detection unit 44 may estimate a time point when a data packet with the same sequence number as the sequence number of the target packet was transmitted for the first time on the basis of the estimated spurious RTT and the capture time. Similarly, the detection unit 44 may estimate a time point when the target packet was transmitted.

In addition, a sum of a value which is four times larger than RTT between the hosts 31 and 32 and an appropriate value (for example, standard deviation of RTT) is often used as RTO. Therefore, the detection unit 44 may estimate RTO from the estimated RTT.

By the use of the various estimated values, the detection unit 44 may estimate "whether or not an interval between a time point when a data packet with the same sequence number as the sequence number of the target packet was transmitted for the first time and a time point when the target packet was transmitted is equal to or more than RTO." In a case where the interval is equal to or more than RTO, the detection unit 44 may judge that "retransmission has occurred due to a network loss and time-out."

For example, as exemplified above, in a case where it is judged that "the sequence number of the target packet is equal to or more than the maximum ACK number" in step S112, the detection unit 44 may judge "whether or not retransmission has occurred due to a network loss." In addition, in a case where it is judged that "retransmission has occurred due to a network loss", the detection unit 44 may increment the number of retransmissions by 1 and may increment the number of network losses by 1 in the entry of the selected sub-connection of the analysis information table 48.

For example, the number of retransmissions or the number of network losses may be estimated in the above-described way.

Meanwhile, the disclosure is not limited to the above-described embodiment. Although some modifications have also been described in the above description, the embodiment may be variously further modified, for example, from the following viewpoints. Any combinations of the above-described and following modifications may be employed as long as they are not incompatible with each other.

For example, the processes in FIGS. 11 to 14 may be combined with other appropriate algorithms for packet analysis, or may be appropriately modified depending on a combination. For example, a step of estimating a retransmission rate or a network loss rate may be added to the processes in FIGS. 11 to 14. In addition, outputting from the output control unit 45 to the output device 49 via the output interface 46 may be performed at a timing independent from the processes in FIGS. 11 to 14, or may be performed, for example, once for each capture of a predetermined number of packets.

The maximum length field is in the connection management table 47 of FIG. 9, and the maximum length field is updated in step S121 as appropriate. Therefore, for example, a maximum value of TCP data lengths of all data packets which have been transmitted until now in the data direction of the sub-connection with the connection ID "1-1" is recorded in the maximum length field of the entry with the connection ID "1-1".

However, a statistical value other than the maximum value may be used. For example, the management unit 43 or the detection unit 44 may create a TCP data length histogram of all data packets which have been transmitted until now in the data direction of the sub-connection with the connection ID "1-1". In addition, a statistical value such as "a length within top X1% in order of a long payload" or "a length within top X2 in order of a long payload" may be used (where X1 and X2 are predefined values).

Alternatively, the dynamic update of the maximum length field in step S121 may be omitted. Alternatively, a value of the MSS of which a notification is sent by negotiation when a connection is established may be extracted from a TCP header in step S101 by the extraction unit 42 when a SYN packet or a SYN/ACK packet is captured. The value of the MSS extracted in this way may be set in the maximum length field in step S106 by the management unit 43. In addition, the maximum length (that is, the MSS) which is statically set in this way may be used in the calculation of the number of provisional losses in step S115 or S126.

Meanwhile, an ACK number of TCP is a number according to the cumulative acknowledgment scheme. However, a selective acknowledgment (SACK) may be optionally used depending on installation of TCP in addition to a typical ACK number according to the cumulative acknowledgment scheme. If the SACK is used, the processes in FIGS. 11 to 14 and the connection management table 47 may be appropriately modified.

For example, a field (hereinafter, referred to as a "SACK range field") for storing a range which is larger than a maximum ACK number among ranges of which notifications have been sent until now using the SACK option may be added to the connection management table 47. The SACK range field of the connection management table 47 may be blank, or may have one or more octet ranges listed therein. For example, the detection unit 44 may appropriately update the SACK range field, between steps S127 and S122, on the basis of the following information:

(1) A current value of the maximum ACK number field of the connection management table 47;

(2) Current content of the SACK range field of the connection management table 47 (that is, a blank list, or a list of one or more octet ranges); and (3) Content of which a notification is sent using the SACK option in the TCP header of the target packet (that is, a blank list, or a list of one or more octet ranges).

In a case where the SACK option is used, steps S112, S124 and S125 may be modified in the processes in FIGS. 11 to 14.

Specifically, in a case where either of the following two conditions which are exclusive of each other holds true in step S112, step S113 may be performed next. Conversely, in a case where neither of the two conditions holds true in step S112, step S119 may be performed next.

(1) The SACK range field of the connection management table 47 is blank, and the sequence number of the target packet is smaller than the maximum ACK number.

(2) One or more octet ranges are listed in the SACK range field of the connection management table 47, and the sequence number of the target packet is smaller than a numerical value indicating the last octet position therein.

In addition, in a case where at least one of the following two conditions holds true in step S124, step S125 may be performed next. Conversely, in a case where neither of the two conditions holds true in step S124, step S122 may be performed next.

(1) The ACK number of the target packet is larger than the maximum ACK number.

(2) One or more ranges which are not recorded in the SACK range field of the connection management table 47 are designated in an option field using the SACK option in the target packet.

In addition, in a case where at least one of the following two conditions holds true in step S125, the detection unit 44 may judge that "a notification of an ACK and/or a SACK for an uncaptured data packet has been sent." As a result, step S126 may be performed next. Conversely, in a case where neither of the two conditions holds true in step S125, the detection unit 44 may judge that "the ACK and/or the SACK of which a notification is sent this time corresponds to some captured data packets." As a result, step S127 may be performed next.

(1) The ACK number of the target packet is larger than the ACK expected value of the connection management table 47.

(2) A range of numbers larger than the ACK expected value of the connection management table 47 is designated in an option field using the SACK option in the target packet.

In addition, in a case where the SACK option is used as described above, if the current maximum ACK number is equal to or more than the ACK number of the target packet, updating of the maximum ACK number is omitted in step S127.

Meanwhile, comparison using a number in the TCP header is performed in the above steps S112, S113, S114, S119, S124 and S125. In the description concerning FIGS. 11 to 14, for simplification of the description, a simple expression such as, for example, "the sequence number is less than the maximum ACK number" is used, but, actually, wrap-around of a number may occur.

Therefore, comparison is performed in consideration of wrap-around in comparison using a number in the TCP header. Similarly, an IP-ID may also be wrapped around. Therefore, wrap-around is also taken into consideration in comparison using an IP-ID in step S115.

In order to take wrap-around into consideration, for example, a time stamp included in the option field of the TCP header may be used. In addition, in order to perform comparison taking wrap-around into consideration, a time point when each packet is captured may be used.

In addition, the capture time of a packet may be used to make more accurate judgment in step S115. Here, order inversion in a capture process occurs in a case where the capture time of a data packet is close to the capture time of an ACK packet. Therefore, for example, only in a case where a difference between the capture time of a data packet and the capture time of an ACK packet is shorter than a predetermined threshold value, and Expression (2) does not hold true, may the detection unit 44 judge that "order inversion has occurred."

Meanwhile, the connection management tables 47 and 47a to 47e are exemplified in a table form in FIG. 9, and the analysis information table 48 and 48b are exemplified in a table form in FIG. 10. However, data forms other than a table may be used.

In addition, in the above description, a case where the first communication protocol is IP version 4 and the second communication protocol is TCP has been described in more detail. However, as is clear from the description concerning FIG. 1, other connectionless communication protocols which assign a numerical value for identification to each packet may be used as the first communication protocol instead of IP version 4. Similarly, other connection-oriented protocols which are defined in a layer higher than the first communication protocol and have a retransmission procedure may be used as the second communication protocol instead of TCP.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process comprising:

capturing packets that are transmitted between first and second devices in accordance with first and second communication protocols, the second communication protocol being connection-oriented and defined in a layer higher than a layer in which the first communication protocol is defined, the first protocol assigning a numerical value for identifying each of packets that are transmitted between first and second devices according to the first communication protocol, the second communication protocol assigning a numerical value for identifying each of data packets that are transmitted from the first device to the second device according to the second communication protocol, an acknowledgement packet being transmitted from the second device to the first device in response to the data packet, the acknowledgement packet including a first numerical value that is assigned by the second communication protocol to a data packet which is expected to be received next by the second device from the first device over a connection established based on the second communication protocol; and in a state in which a first data packet transmitted from the first device to the second device has not been captured yet at a time point of capturing an acknowledgment packet responsive to the first data packet, upon capturing a second data packet including a second numerical value indicating order earlier than the first numerical value included in the captured acknowledgment packet, determining whether the captured second data packet is the first data packet which is captured later than the acknowledgment packet, based on a difference between a third numerical value that is assigned to the second data packet by the first communication protocol and a fourth numerical value that is assigned by the first communication protocol to a previous data packet that is captured latest among data packets that are transmitted from the first device and captured earlier than the acknowledgment packet.

2. The non-transitory computer-readable recording medium of claim 1, wherein
the determining determines that the captured second data packet is the first data packet which is captured later than the acknowledgment packet, in a case where the difference is equal to or less than a threshold value that is defined based on the first numerical value and a fifth numerical value included in the previous data packet, the fifth numerical value being assigned by the second communication protocol and identifying the previous data packet over the connection established based on the second communication protocol.

3. The non-transitory computer-readable recording medium of claim 2, wherein
the determining determines that the captured second data packet is a retransmission data packet that is retransmitted by the first device in accordance with a retransmission procedure based on the second communication protocol, in a case where the difference is larger than the threshold value, the retransmission data packet including a numerical value that is assigned by the second communication protocol and equal to a numerical value included in the first data packet.

4. The non-transitory computer-readable recording medium of claim 2, wherein
the threshold value is determined based on the first numerical value, the fifth numerical value, a size of the previous data packet, and a size value regarding sizes of a plurality of data packets transmitted from the first device to the second device over the connection.

5. The non-transitory computer-readable recording medium of claim 4, wherein
the size value is a payload length that is equal to or greater than a predetermined reference in relative comparison between the plurality of data packets transmitted from the first device to the second device over the connection.

6. The non-transitory computer-readable recording medium of claim 5, wherein
the size value is a payload length that is largest among the plurality of data packets transmitted from the first device to the second device over the connection.

7. The non-transitory computer-readable recording medium of claim 2, wherein
the acknowledgment packet indicates that the second device has received one or more first data packets from the first device; and
the threshold value is an estimated value of a number of data packets that have failed to be captured by the computer among the one or more first data packets.

8. The non-transitory computer-readable recording medium of claim 2, wherein
the process further includes incrementing, in a case where the difference is equal to or less than the threshold value, an inversion count value for counting a first inversion number that is a number of order inversions occurring in a capture process between a data packet transmitted from the first device toward the second device over the connection and an acknowledgment packet transmitted from the second device to the first device over the connection, or for counting a sum of the first inversion number and a second inversion number, the second inversion number being a number of order inversions occurring in a capture process between a data packet transmitted from the second device toward the first device over the connection and an acknowledgment packet transmitted from the first device to the second device over the connection.

9. The non-transitory computer-readable recording medium of claim 2, wherein
the process further includes reflecting a number of times in which the difference between the third numerical value and the fourth numerical value is greater than the threshold value, in a loss count value for counting a number of data packets that have been transmitted in a direction from the first device to the second device over the connection and have failed to be captured by the computer, or for counting a number of data packets that have been transmitted over the connection but have failed to be captured by the computer, regardless of a direction of transmission.

10. The non-transitory computer-readable recording medium of claim 2, wherein
the process further includes incrementing, in a case where the difference between the third numerical value and the fourth numerical value is larger than the threshold value, a retransmission count value for counting a number of retransmissions having occurred in a direction from the first device to the second device over the connection, or for counting a number of retransmissions over the connection, regardless of a direction of transmission.

11. The non-transitory computer-readable recording medium of claim 1, wherein
the first communication protocol is the Internet Protocol, and the second communication protocol is the Transmission Control Protocol.

12. A method comprising:
capturing packets that are transmitted between first and second devices in accordance with first and second communication protocols, the second communication protocol being connection-oriented and defined in a layer higher than a layer in which the first communication protocol is defined, the first protocol assigning a numerical value for identifying each of packets that are transmitted between first and second devices according to the first communication protocol, the second communication protocol assigning a numerical value for identifying each of data packets that are transmitted from the first device to the second device according to the second communication protocol, an acknowledgement packet being transmitted from the second device to the first device in response to the data packet, the acknowledgement packet including a first numerical value that is assigned by the second communication protocol to a data packet which is expected to be received next by the second device from the first device over a connection established based on the second communication protocol; and
in a state in which a first data packet transmitted from the first device to the second device has not been captured yet at a time point of capturing an acknowledgment packet responsive to the first data packet, upon capturing a second data packet including a second numerical value indicating order earlier than the first numerical value included in the captured acknowledgment packet, determining whether the captured second data packet is the first data packet which is captured later than the acknowledgment packet, based on a difference between a third numerical value that is assigned to the second data packet by the first communication protocol and a fourth numerical value that is assigned by the first communication protocol to a previous data packet which is captured latest among data packets that are transmitted from the first device and captured earlier than the acknowledgment packet.

13. An apparatus for capturing and analyzing packets transmitted between first and second devices, the apparatus comprising:
- a memory configured to store information on packets that are transmitted between first and second devices in accordance with first and second communication protocols, the second communication protocol being connection-oriented and defined in a layer higher than a layer in which the first communication protocol is defined, the first protocol assigning a numerical value for identifying each of packets that are transmitted between first and second devices according to the first communication protocol, the second communication protocol assigning a numerical value for identifying each of data packets that are transmitted from the first device to the second device according to the second communication protocol, an acknowledgement packet being transmitted from the second device to the first device in response to the data packet, the acknowledgement packet including a first numerical value that is assigned by the second communication protocol to a data packet which is expected to be received next by the second device from the first device over a connection established based on the second communication protocol; and
- a processor configure to determine, in a state in which a first data packet transmitted from the first device to the second device has not been captured yet at a time point of capturing an acknowledgment packet responsive to the first data packet, upon capturing a second data packet including a second numerical value indicating order earlier than the first numerical value included in the captured acknowledgment packet, whether the captured second data packet is the first data packet which is captured later than the acknowledgment packet, based on a difference between a third numerical value that is assigned to the second data packet by the first communication protocol and a fourth numerical value that is assigned by the first communication protocol to a previous data packet which is captured latest among data packets that are transmitted from the first device and captured earlier than the acknowledgment packet.

14. A system comprising:
- a network device configured to extract a packet transmitted between first and second devices, from a midway point of a communication path between the first and second devices, the second communication protocol being connection-oriented and defined in a layer higher than a layer in which the first communication protocol is defined, the first protocol assigning a numerical value for identifying each of packets that are transmitted between first and second devices according to the first communication protocol, the second communication protocol assigning a numerical value for identifying each of data packets that are transmitted from the first device to the second device according to the second communication protocol, an acknowledgement packet being transmitted from the second device to the first device in response to the data packet, the acknowledgement packet including a first numerical value that is assigned by the second communication protocol to a data packet which is expected to be received next by the second device from the first device over a connection established based on the second communication protocol; and
- a packet analysis device, connected to the network device, configured to determine, in a state in which a first data packet transmitted from the first device to the second device has not been captured yet at a time point of capturing an acknowledgment packet responsive to the first data packet, upon capturing a second data packet including a second numerical value indicating order earlier than the first numerical value included in the captured acknowledgment packet, whether the captured second data packet is the first data packet that is captured later than the acknowledgment packet, based on a difference between a third numerical value that is assigned to the second data packet by the first communication protocol and a fourth numerical value that is assigned by the first communication protocol to a previous data packet that is captured latest among data packets that are transmitted from the first device and captured earlier than the acknowledgment packet.

15. The system of claim 14, wherein
the network device is a network tap including a monitor port connected to the packet analysis device, or a switch or a router including a mirror port connected to the packet analysis device.

16. The system of claim 14, wherein
the packet analysis device includes:
- a first communication interface configured to receive a packet that is transmitted from the first device toward the second device, from the network device;
- a second communication interface configured to receive a packet that is transmitted from the second device toward the first device, from the network device; and
- a memory configured to store packets received by the first and second communication interfaces.

17. The system of claim 14, wherein
the packet analysis device includes a communication interface configured to receive, from the network device, both a packet that is transmitted from the first device toward the second device and a packet that is transmitted from the second device toward the first device.

* * * * *